(12) United States Patent
McKendrick

(10) Patent No.: US 9,939,245 B1
(45) Date of Patent: Apr. 10, 2018

(54) CHECKING GAUGE HAVING INTEGRATED TOLERANCE VISUALIZATION

(71) Applicant: Blair T. McKendrick, Bloomfield Hills, MI (US)

(72) Inventor: Blair T. McKendrick, Bloomfield Hills, MI (US)

(*) Notice: Subject to any disclaimer, the term of this patent is extended or adjusted under 35 U.S.C. 154(b) by 0 days.

(21) Appl. No.: 15/393,667

(22) Filed: Dec. 29, 2016

Related U.S. Application Data

(63) Continuation-in-part of application No. 14/986,705, filed on Jan. 3, 2016, which is a continuation of application No. 13/672,672, filed on Nov. 8, 2012, now Pat. No. 9,230,044.

(60) Provisional application No. 62/274,275, filed on Jan. 2, 2016.

(51) Int. Cl.
*G01B 5/00* (2006.01)

(52) U.S. Cl.
CPC ................. *G01B 5/0004* (2013.01)

(58) Field of Classification Search
CPC ........ G01B 3/14; G01B 5/207; G01B 5/0004; G01B 5/20; G01B 21/04; G01B 21/16; G01B 5/0025
USPC ........................................................ 33/551
See application file for complete search history.

(56) References Cited

U.S. PATENT DOCUMENTS

| | | | |
|---|---|---|---|
| 3,203,100 A | 8/1965 | Hegedus | |
| 4,232,068 A | 11/1980 | Hoh et al. | |
| 4,258,474 A * | 3/1981 | DuMez | G01B 21/20 33/503 |
| 4,593,476 A | 6/1986 | Clark et al. | |
| 4,604,813 A * | 8/1986 | Kawanami | G01B 5/24 33/529 |
| 4,689,891 A * | 9/1987 | Clark | G01B 3/14 33/529 |
| 5,208,995 A | 5/1993 | McKendrick | |
| 5,400,517 A | 3/1995 | McKendrick | |
| 5,412,877 A | 5/1995 | McKendrick | |
| 5,624,724 A | 4/1997 | Relly | |
| 6,029,333 A | 2/2000 | Sapienza | |
| 6,145,212 A | 11/2000 | Geise et al. | |
| 6,571,484 B2 | 6/2003 | Hastilow | |
| 7,103,985 B1 | 9/2006 | Phillips et al. | |
| 7,243,438 B2 | 7/2007 | Jaubert | |
| 7,310,916 B2 | 12/2007 | Gorman | |
| 7,676,944 B2 | 3/2010 | Kato | |
| 9,230,044 B1 | 1/2016 | McKendrick | |
| 2001/0023543 A1 | 9/2001 | Hastilow | |
| 2005/0120648 A1 | 6/2005 | Gorman | |
| 2014/0157610 A1 | 6/2014 | Garvey et al. | |

* cited by examiner

*Primary Examiner* — Yaritza Guadalupe-McCall
(74) *Attorney, Agent, or Firm* — Thomas K. Ziegler

(57) ABSTRACT

A gauge for checking tolerances of a bent tube includes a gauge block having a channel in which the tube is placed for checking. Viewing windows in the side of the gauge block permit the bottom of the tube to be viewed within the channel. The viewing windows are sized to match a preselected tolerance.

20 Claims, 51 Drawing Sheets

CHECKING GAUGE HAVING INTEGRATED TOLERANCE VISUALIZATION

CROSS REFERENCE TO RELATED APPLICATIONS

This application claims the benefit of Provisional U.S. Patent Application No. 62/274,275 filed Jan. 2, 2016, and is a continuation-in-part of co-pending U.S. patent application Ser. No. 14/986,705 filed Jan. 3, 2016 which is a continuation of U.S. patent application Ser. No. 13/672,672 filed Nov. 8, 2012, the entire content of all of which is incorporated by reference herein.

BACKGROUND INFORMATION

1. Field

This disclosure generally relates to gauges and checking fixtures, and deals more particularly with checking gauge that allows tolerances of a bent tube to be checked visually.

2. Background

Fixture type gauges may be used to determine the conformance of mass-produced parts with one or more reference standards. For example, metal or plastic tubes used as fuel, hydraulic or pneumatic lines on vehicles may include a number of bends and turns that must be manufactured within certain tolerances in order to assure that the tubes can achieve proper fitment on the vehicle. Fixture gauges, sometimes referred to as checking fixtures or checking gauges, may be used to check whether such tubes have been manufactured to within the required tolerances.

In the past, checking gauges of the type mentioned above included gauge blocks provided with a channel within which a tube was placed for checking the tube's tolerances. However, the person checking the tube had difficulty visually determining whether a tube or similar part was out of tolerance. This is because the gauge covered or masked the areas of the tube that may be out of tolerance, preventing the user from seeing the locations at which the tube was out of tolerance. Additionally, the gauge did not allow the person to determine the exact amount that the tube was out of tolerance.

SUMMARY

The disclosed embodiments relate to checking gauges, and more particularly to a gauge for checking manufacturing tolerances of a bent tube, such as a metal fuel line.

According to one embodiment, a gauge is provided for checking a tolerance of a tube. The gauge includes at least one gauge block having a channel in which the tube may be placed for checking the tolerance. The gauge block also includes at least one opening in a side thereof allowing the position of the tube within the channel to be viewed, wherein the opening has a dimension representing the tolerance.

According to another embodiment, a gauge is provided for checking a tolerance of tube against a reference standard. The gauge includes at least one gauge block having two opposite sides, and a channel between the two opposite sides in which the tube may be placed. At least one of the two opposite sides includes a viewing window that is positioned to allow viewing of the bottom of the tube within the channel.

According to still another embodiment, a gauge is provided for checking conformance of a bent tube with a reference standard. The gauge comprises at least one gauge block having a channel therein in which the tube may be placed for checking. A viewing window is provided in the gauge block that is aligned with the bottom of the channel and is configured to allow viewing a gap between the bottom of the tube and the bottom of the channel.

One of the advantages of the checking gauge is that a user may quickly visually determine whether a bent tube has features that are outside of desired manufacturing tolerances. Another advantage of the gauge is that viewing windows are provided in the gauge which allow any gaps to be seen between the bottom of the tube and the bottom of a channel in which the tube is supported. A further advantage of the gauge is that the viewing window is sized to match a specified maximum tolerance for the tube. Another advantage of the gauge is that the viewing windows have graduations that allow a user to determine the degree to which features of the tube are within or outside of prescribed tolerances. Still another advantage of the gauge is that end fittings are provided which accurately support and releasably hold the ends of the tube at desired locations in three-dimensional space.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
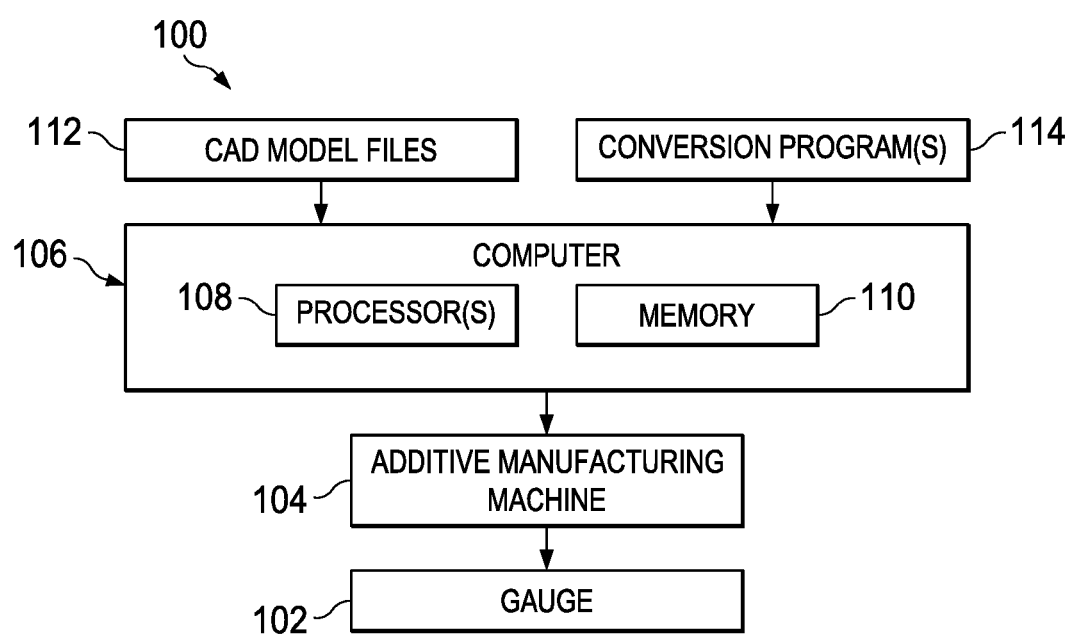
FIG. 1 is an overall block diagram of a system for automatically fabricating a checking gauge according to the disclosed embodiments.

Referring first to FIG. 1, the disclosed embodiments relate to a method of fabricating a gauge 102 which may be employed to check a part (not shown) against a reference standard. For example, the gauge 102 may be employed to check whether a bent tube has been manufactured to within one or more tolerances. As will be discussed below in more detail, the method may include a form of digital manufacturing that allows fabrication of the gauge 102 using additive manufacturing techniques in order to integrate features of the gauge in precise locations within a common reference coordinate system.

The method employs a manufacturing system 100 broadly comprising an additive manufacturing machine 104 controlled by a computer 106. The additive manufacturing machine 104 may comprise a commercially available machine that uses one or more known, additive manufacturing techniques such as, without limitation, fused deposition modeling (FDM), stereolithography (SLA), selective laser sintering (SLS) and three dimensional printing (3DP), to name only a few. Each of these processes may be used to build a three dimensional gauge 102, layer-by-layer, by locally fusing or curing building materials that may be in powder or liquid form. For example, FDM works on an "additive" principle by laying down material in layers. A plastic filament is unwound from a coil and supplies material to an extrusion nozzle which can turn the flow on and off. The nozzle is heated to melt the material and can be moved in both horizontal and vertical directions by a numerically controlled mechanism (not shown), directly controlled by the computer 106. The gauge 102 is produced by extruding small beads of thermoplastic material to form layers as the material hardens immediately after extrusion from the nozzle.

The computer 106 may include one or more processors 108, and memory 110. The computer 106 may have access to one or more CAD (computer aided drawings) model files 112 which are digital representations of parts such as tubes which are to be checked with the gauge 102. As will be discussed below in more detail, the computer 106 may also have access to conversion programs 114 which may include a commercially available software packages employed for data conversion. The computer 106 may retrieve one or more CAD model files 112 defining a part to be checked and may use conversion programs 114 to convert the CAD model files 112 into STL files capable of controlling the additive manufacturing machine 104. The computer 106 is used to create files that digitally define a 3-D model of the gauge 102, including the size and location of critical features, including tolerances, used to check the part. The computer 106 digitally integrates all of the features of the gauge 0102 into a common reference system 121 (FIG. 2) in order to eliminate assembly error and speed the fabrication process.

Figure 2:
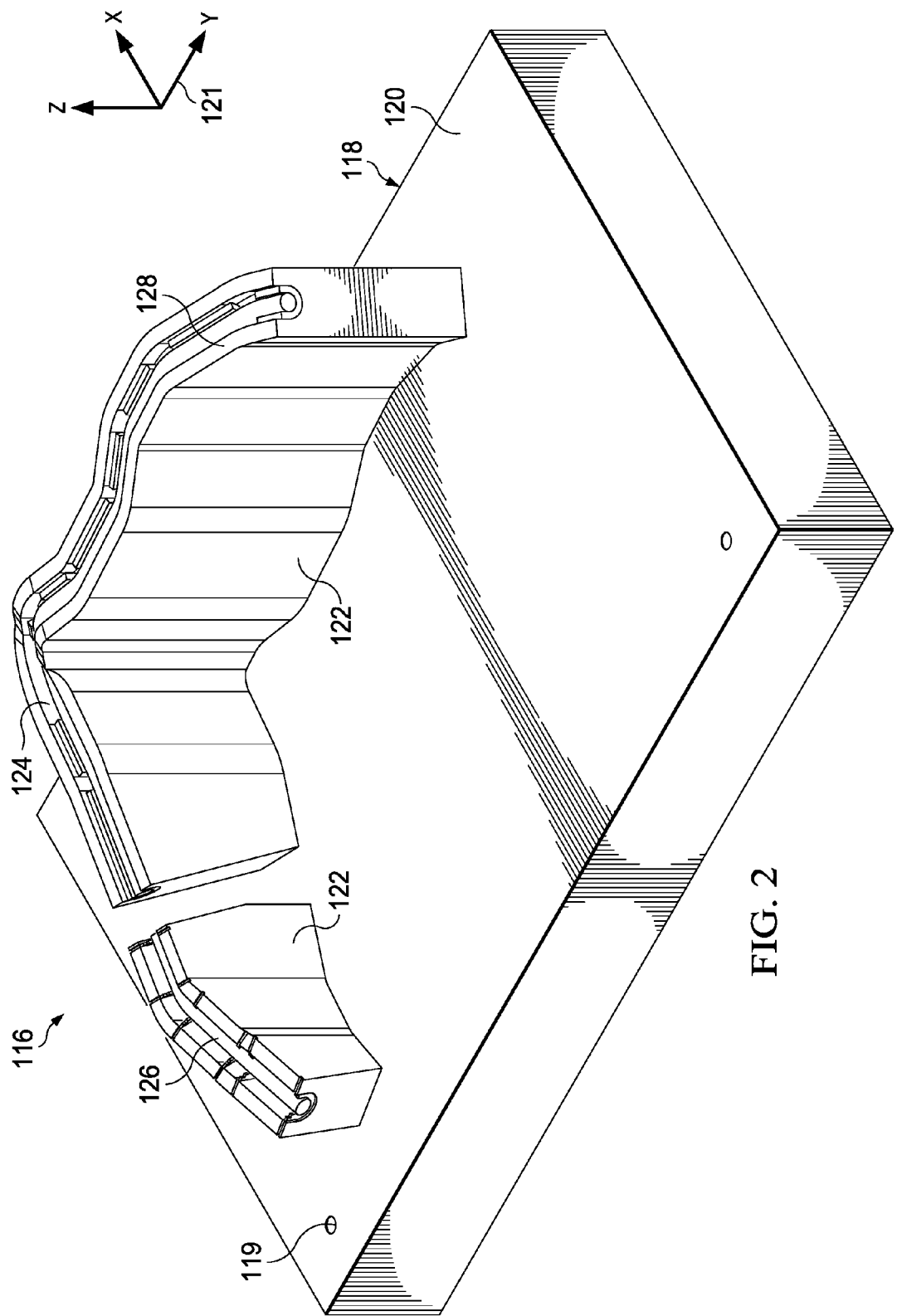
FIG. 2 is a perspective view of the gauge showing gauge blocks with portions a tube shown within tube tolerance channels, other features of the tube not shown.
Figure 3:
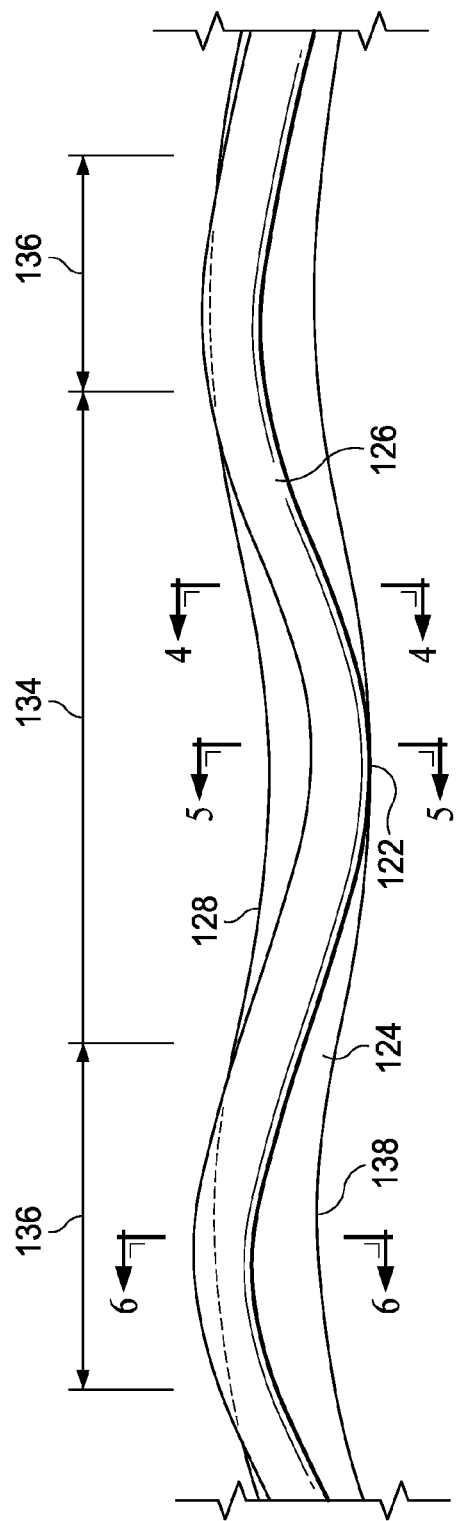
FIG. 3 is a longitudinal sectional view, showing a portion of a tube disposed within the tube tolerance channel.
Figure 6:
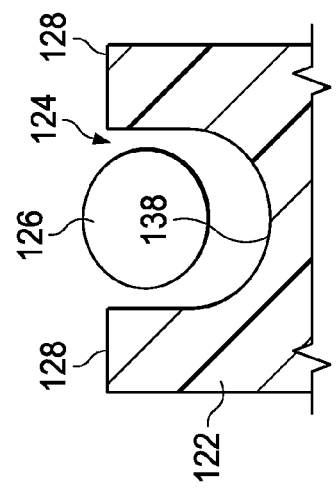
FIG. 6 is a sectional view taken along the line 6-6 in FIG. 3.
Figure 5:
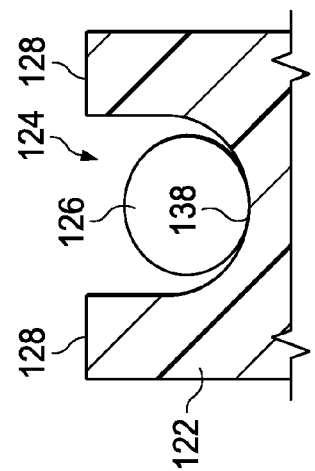
FIG. 5 is a sectional view taken along the line 5-5 in FIG. 3.

Attention is now directed to FIG. 2 which illustrates a typical gauge 116 according to the disclosed embodiments, certain features not being shown for clarity. The gauge 116 may include one or more tube channel segment blocks 122, sometimes also referred to here as gauge blocks 122, supported on the surface 120 of a base 118. In the embodiment shown in FIG. 2, the gauge blocks 122 are employed to check features of a bent tube 126 which may be removably placed in a radiused tube channel 124 formed in the top of the gauge blocks 122. The radius of the tube channel 124 will depend upon the radius of the tube being checked and the tolerances that are allowed for the tube 126. The embodiment of the gauge 116 shown in FIG. 2 employs optional shims (discussed later in more detail) in order to adjust the checking tolerance of the gauge 116. The tube channel 24 follows the sweep or curve of the tube 126. The gauge blocks 122 include adjacent, spaced apart upper surfaces 128 which define a plane 123 (FIG. 4) below which all areas of the tube 126 must be located in order for the tube 126 to be within tolerance, as will be explained below in more detail. CMM (coordinate measuring machine) alignment and origin holes 119 may be provided in the base 118 which serve as reference points to establish the three dimensional coordinate system 121 in which all the features of the gauge 116 are located.

Figure 4:
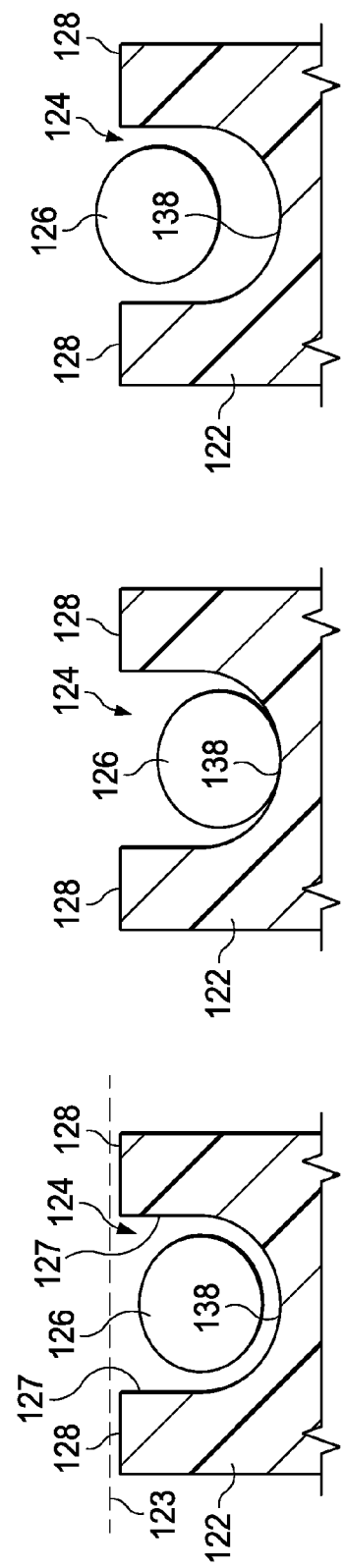
FIG. 4 is a sectional view taken along the line 4-4 in FIG. 3.

Attention is now directed to FIGS. 3-6 which illustrate how the tube channel 124 may be used by an inspector to quickly visually determine whether a particular tube 126 has been manufactured to within preselected tolerances. As previously mentioned, the upper tube channel surfaces 128 form a sweeping plane 123 that corresponds to the upper limit of the tolerance allowed at the top of the tube 126. Thus, along two stretches 136 of the tube 126 in his example, it may be seen that the top of the tube 126 is above the upper surfaces 128 (plane 123) and therefore is "out of tolerance", whereas the top of the tube 126 is below the upper surfaces 128 along a central stretch 134 and is thus within tolerance in this area. As shown in FIG. 4, the sides 248 of the tube channel 124 define it the lateral tolerance boundaries, and the bottom 138 of the tube channel 124 defines the bottom of the tolerance boundary for a tube 126 that has been manufactured to within the allowed tolerances.

Figure 7:
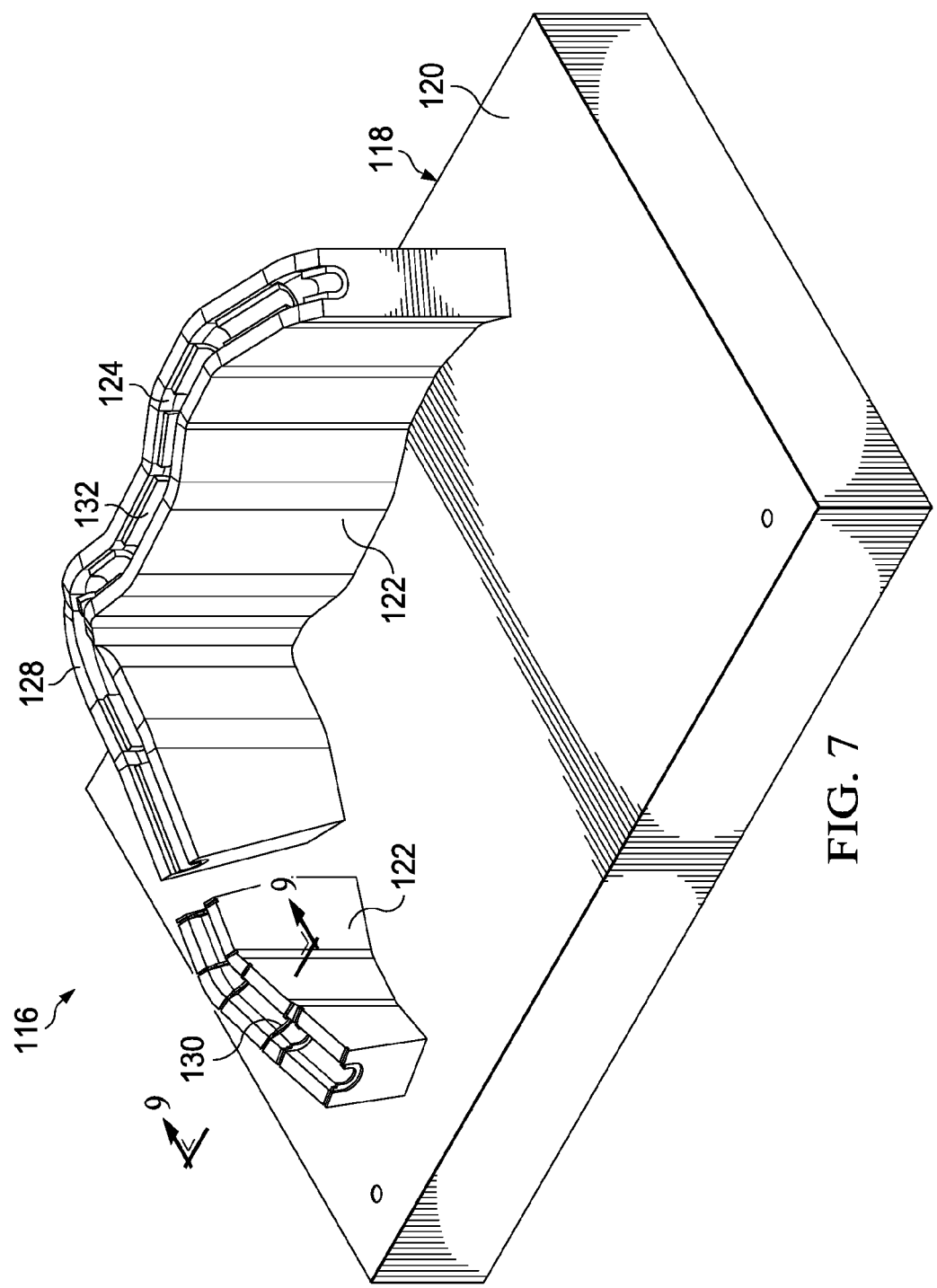
FIG. 7 is a perspective view similar to FIG. 2, with the tube having been removed.
Figure 8:
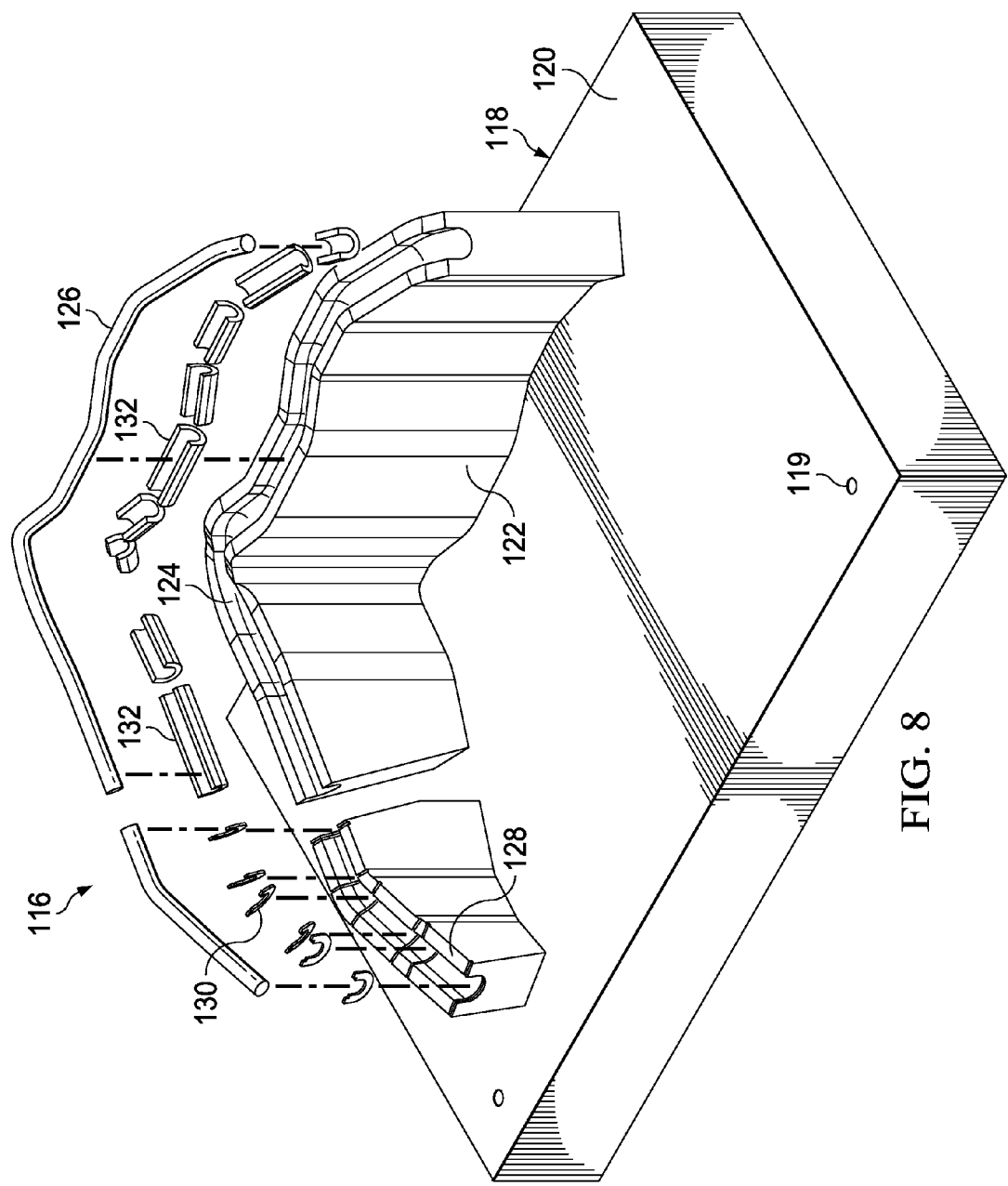
FIG. 8 is a perspective view similar to FIG. 2, but showing the shims in exploded form.

Referring now to FIGS. 7 and 8, in one optional embodiment, shims 130, 132 may be installed into the tube channel 124 in order to alter the tolerance boundaries at one or more locations along the tube channel 124. For example, in some applications, one of the shims 130, 132 may be placed near a bend in the tube 126 where it may be important that the tube 126 be within closer tolerances compared to other areas of the tube 126. In some embodiments, the shims 30 may be of a type that are recessed into the gauge blocks 122, while in other embodiments, shims 132 may be located and held entirely within the tube channel 124 by any suitable means.

Figure 9:
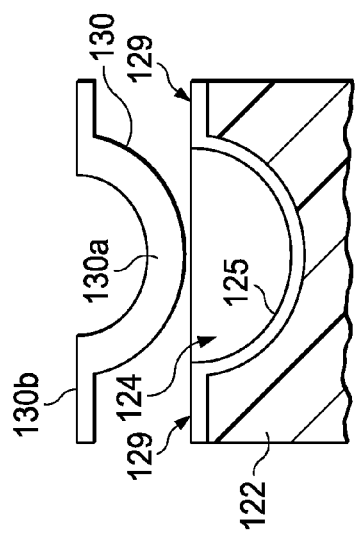
FIG. 9 is a sectional view taken along the line 9-9 in FIG. 7, one of the shims having been removed to a position above the tube tolerance channel in which it is normally installed.
Figure 10:
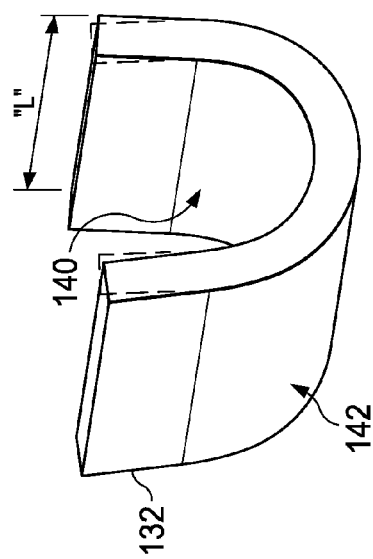
FIG. 10 is a perspective view of an alternate embodiment of a shim, a flexed condition of the shim indicated by broken lines.
Figure 13:
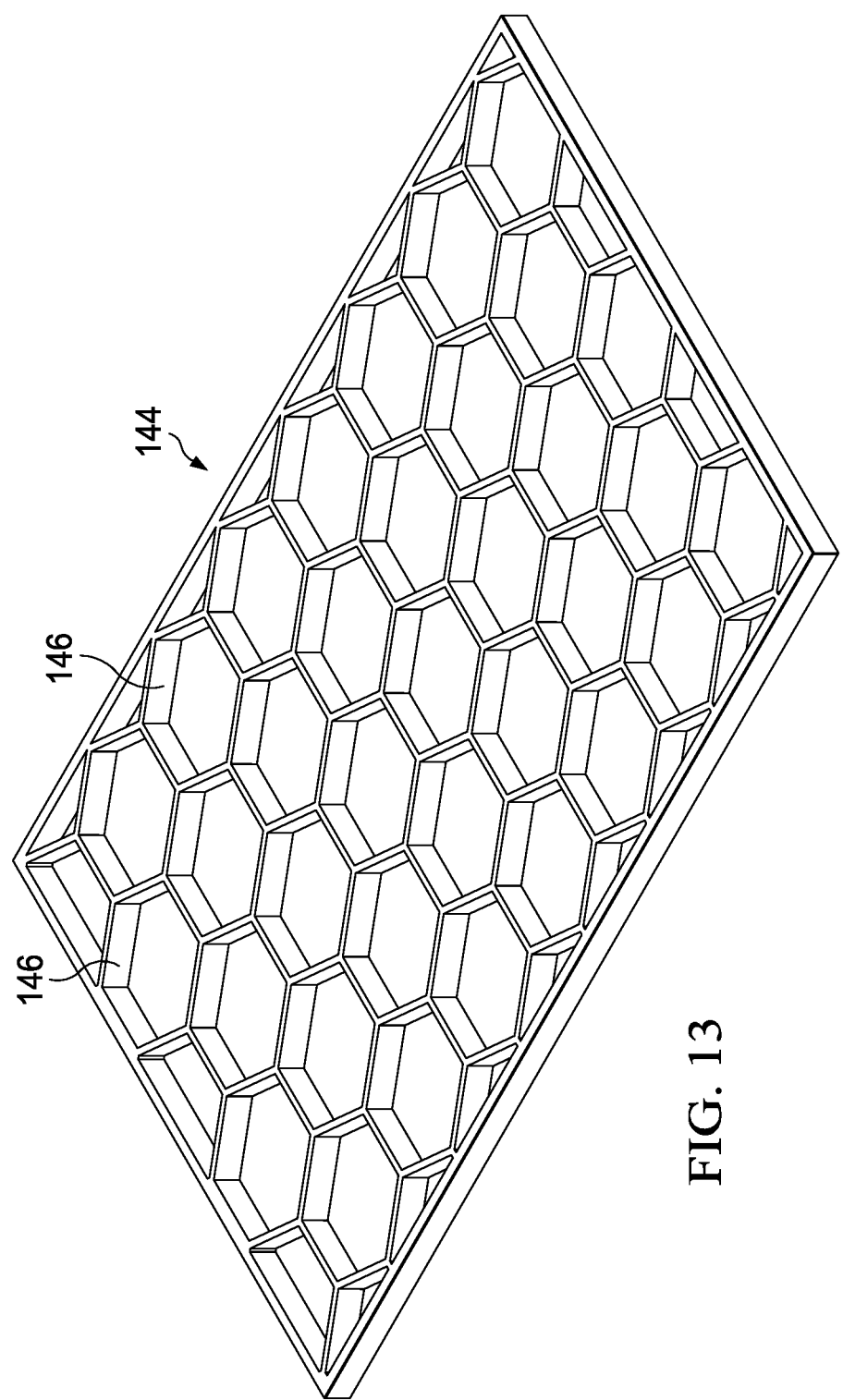
FIG. 13-24 are perspective views showing progressive stages of manufacturing the gauge shown in FIG. 2 using additive manufacturing.
Figure 14:
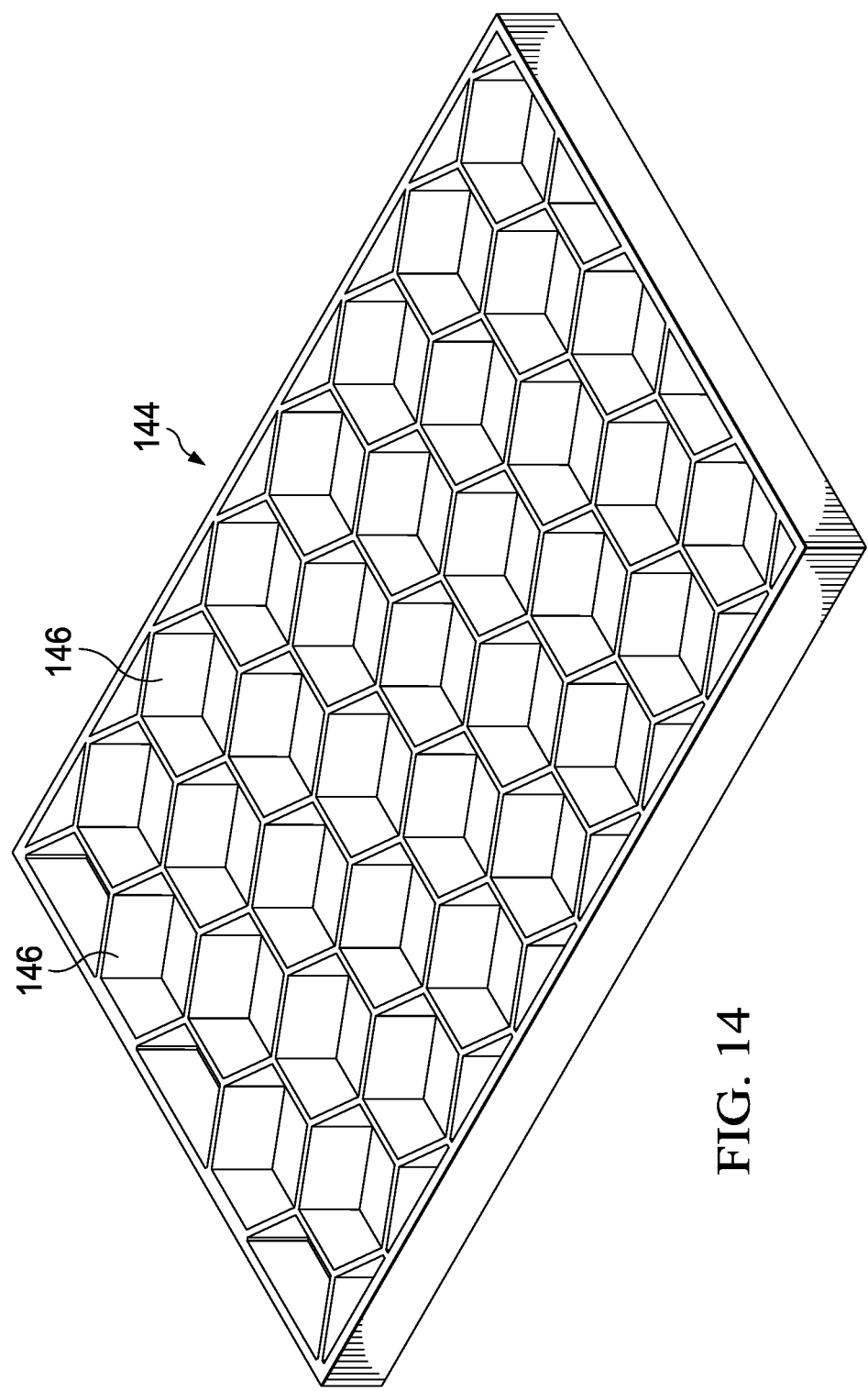
Figure 15:
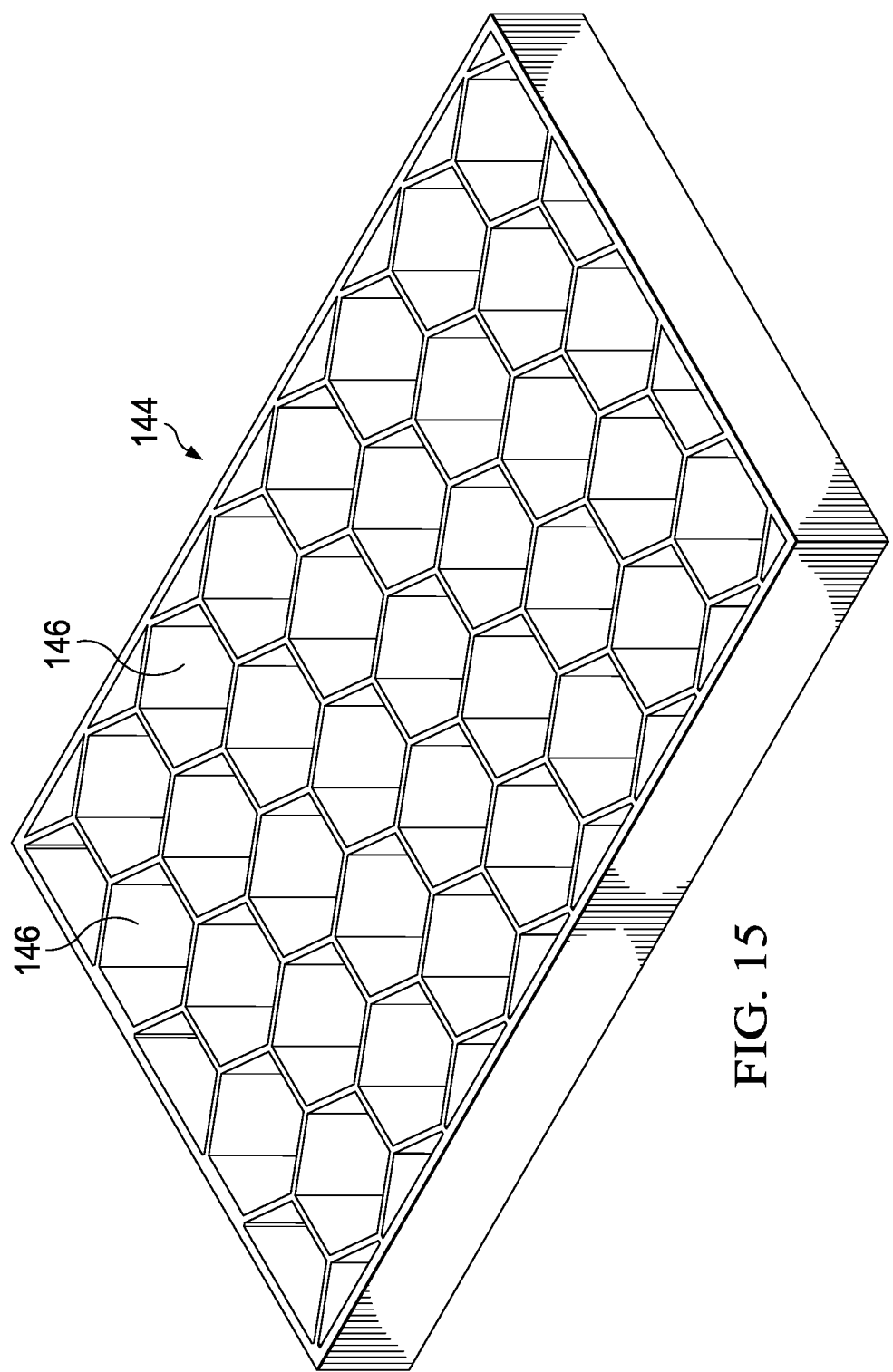

FIG. 9 illustrates one of the recessed type shims 130 having a curved portion 130a and a pair of arms 130b. The gauge block 122 includes a recess 125 having shoulders 129 which respectively receive the curved portion 130a and the arms 130b of the shim 130 in order to retain the shim 130 within the tube channel 124. It may be seen that the thickness of the curved portion 130a of the shim 130 is greater than the thickness of the recess 125, thus changing the tolerance boundary used to gauge the tube 126. Referring to FIG. 10, the shims 132 which rest entirely within the tube channel 124 may be made of a flexible material, such as nylon. The outer surfaces 142 of the shims 132 frictionally engage the sidewalls 127 (FIG. 4) within the tube channels 124 to retain the shims 132. The inside surfaces 140 of the shims 132 are adapted to engage the tube 126 and define the sides and bottom of the tolerance boundaries. The length "L" of the shim 132 will depend upon the application, including the shape and configuration of the tube 126.

Figure 11:
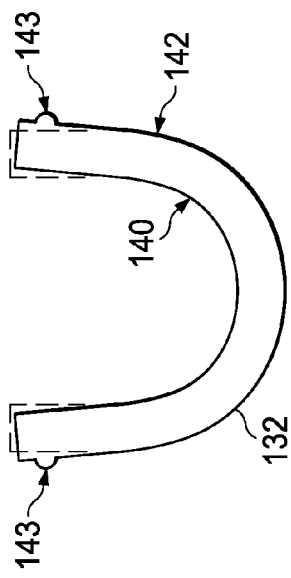
FIG. 11 is an end view of another of another embodiment of a shim, a flexed condition of the shim indicated by broken lines.
Figure 12:
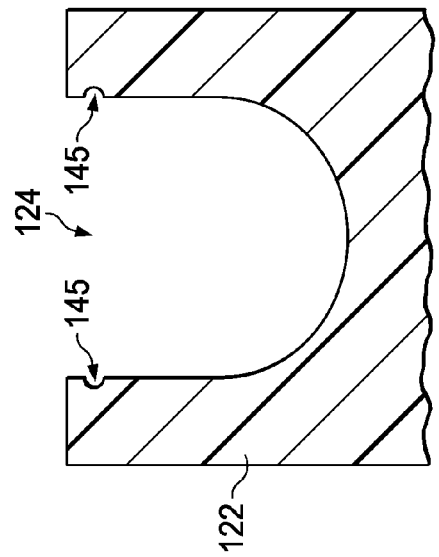
FIG. 12 is a cross-sectional view showing a tube tolerance channel having a groove adapted to receive the shim shown in FIG. 11 in snap fit relationship.

FIGS. 11 and 12 illustrate another technique for retaining the shims 132 within the tube channel 124. In this embodiment, the outer surfaces 142 of the shims 132 may include longitudinally extending nubs or ribs 143 which are received in snap fit relationship within grooves 145 formed in the inner side walls 127 of the tube channel 124.

Referring now to FIGS. 13-24, the gauge 116 is automatically fabricated, digitally, using the additive manufacturing machine 104 (FIG. 1), layer-by-layer using programmed instructions generated by the computer 106 which are based on a CAD file 112 that digitally defines the tube 126. In this example, a pair of gauge blocks 122 is formed integral with a base 118 as the gauge 116 is built layer-by-layer. The base 118 of the gauge 116 is formed by laying down a series of base layers 144 on top of each other, including a series of layers which form the base surface 120. As the base layers 144 are laid down, openings 146, herein shown as hexagonal in shape, may be formed within each of the base layers 144 in order to both speed the fabrication process and reduce material usage.

Figure 16:
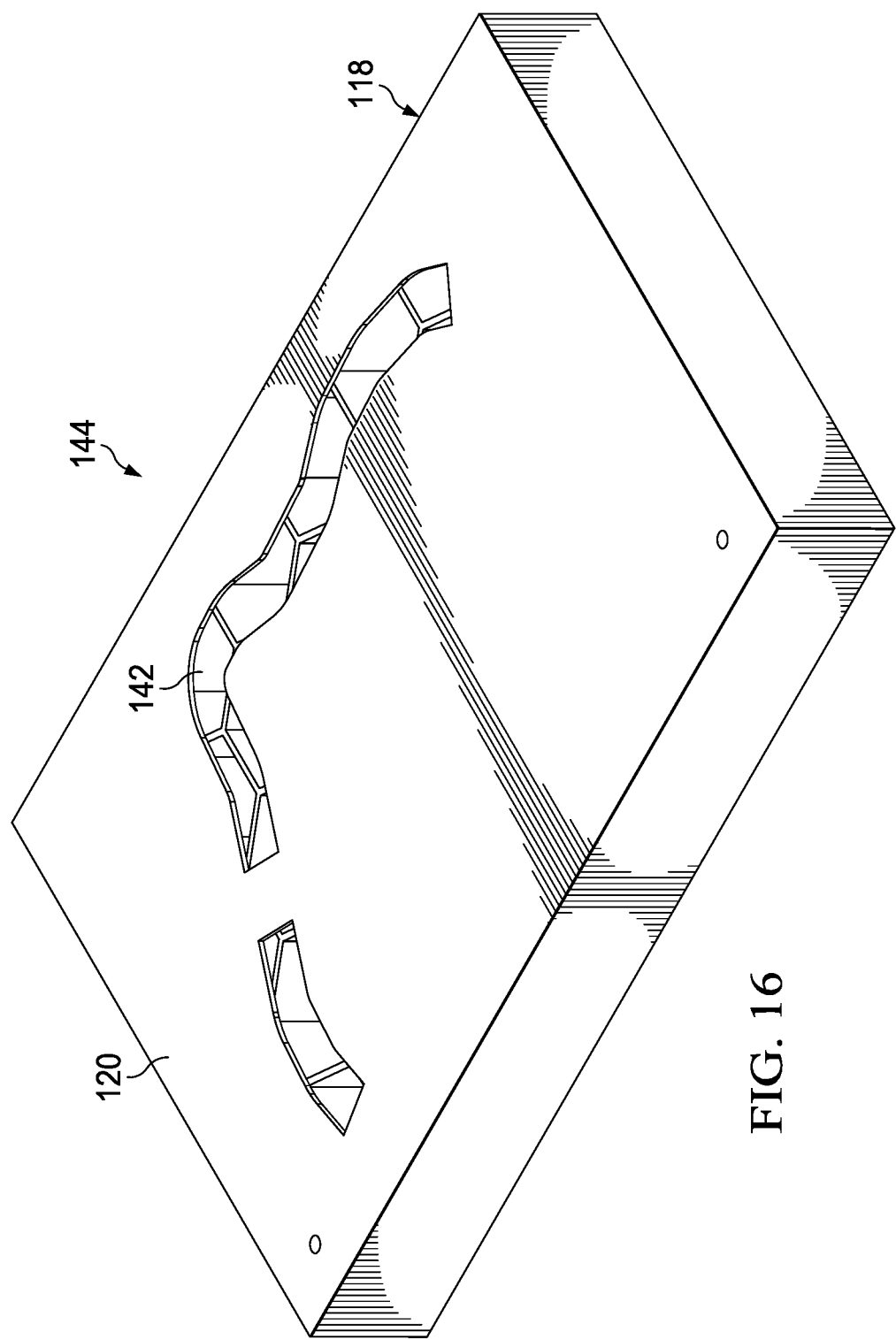
Figure 17:
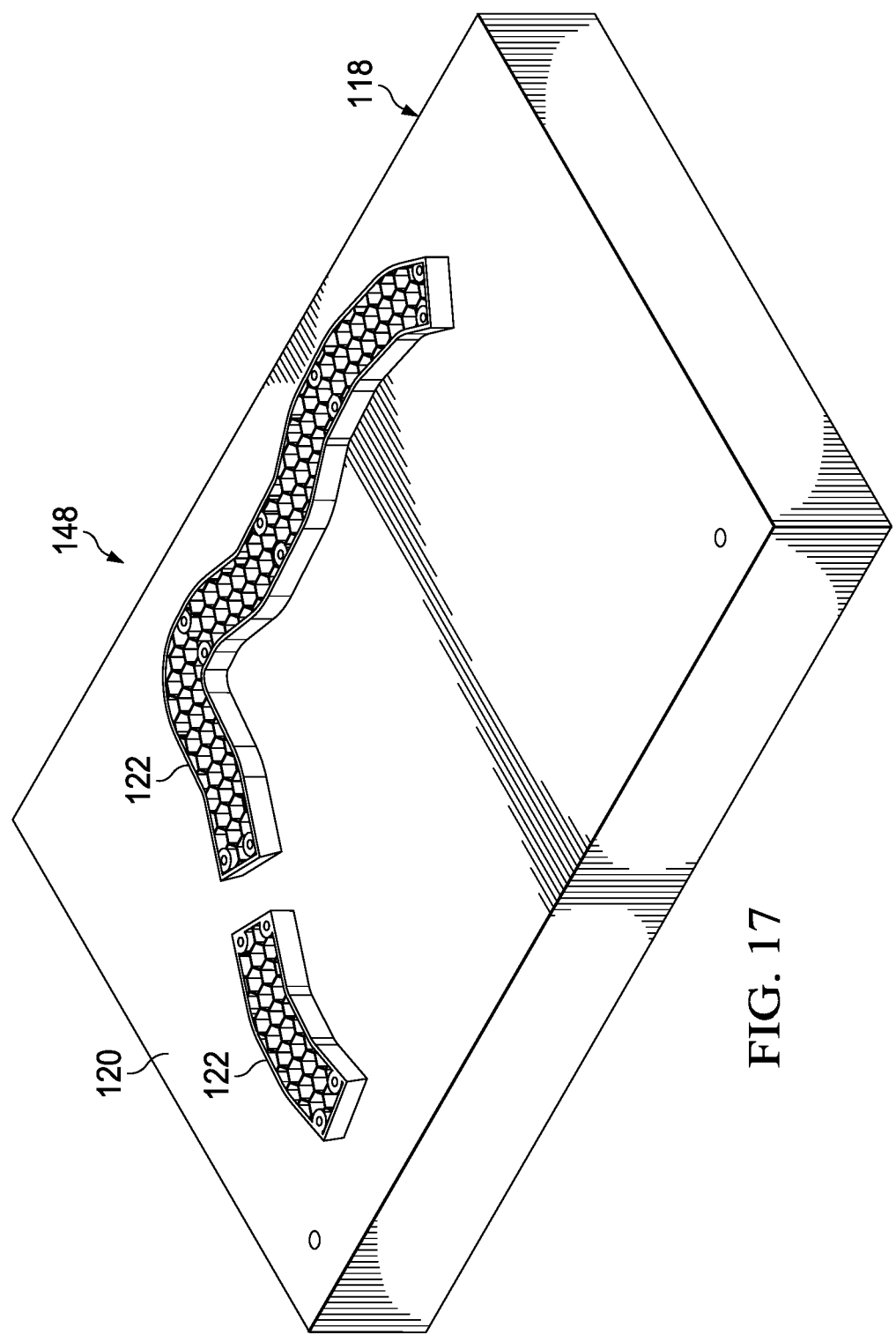
Figure 18:
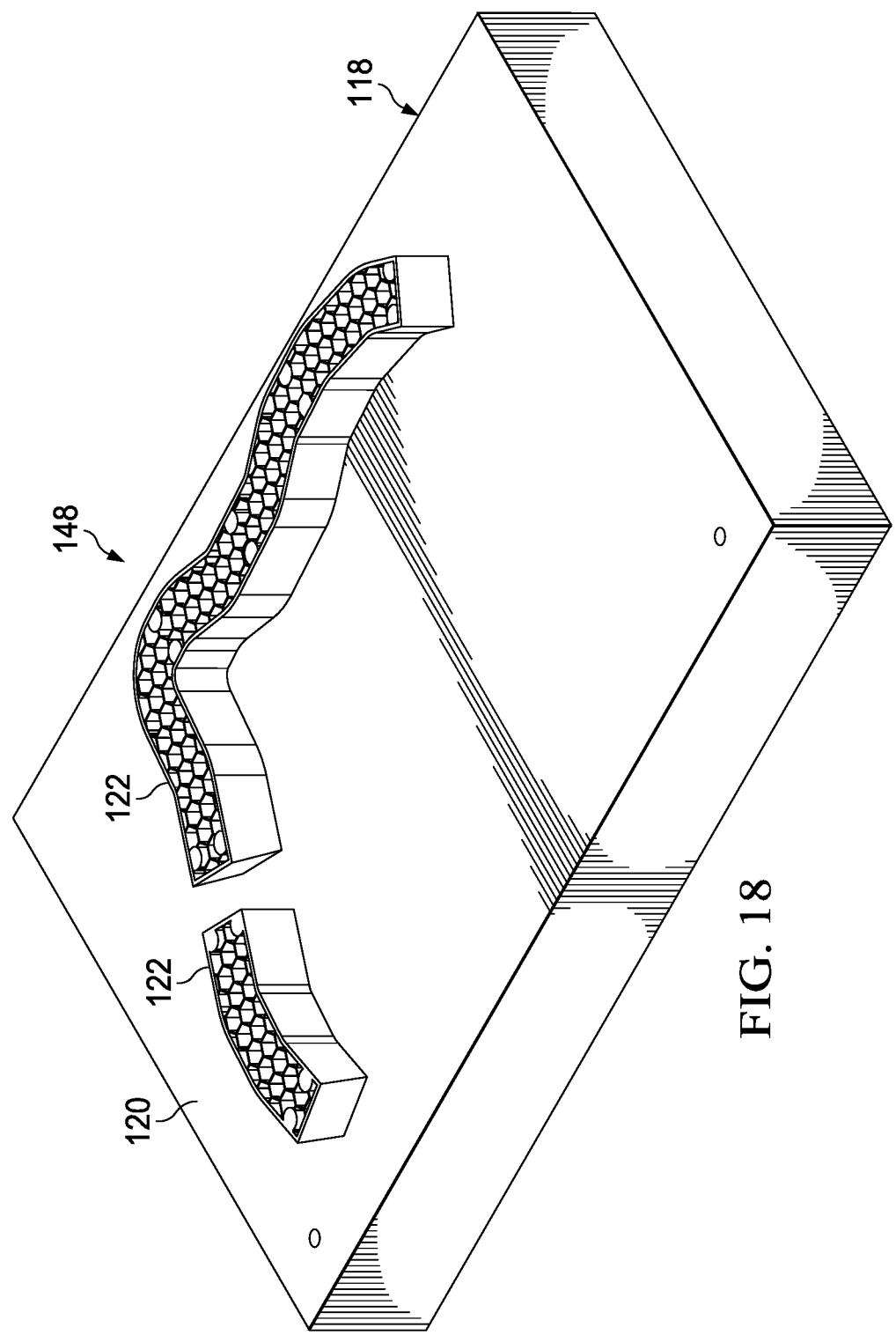
Figure 19:
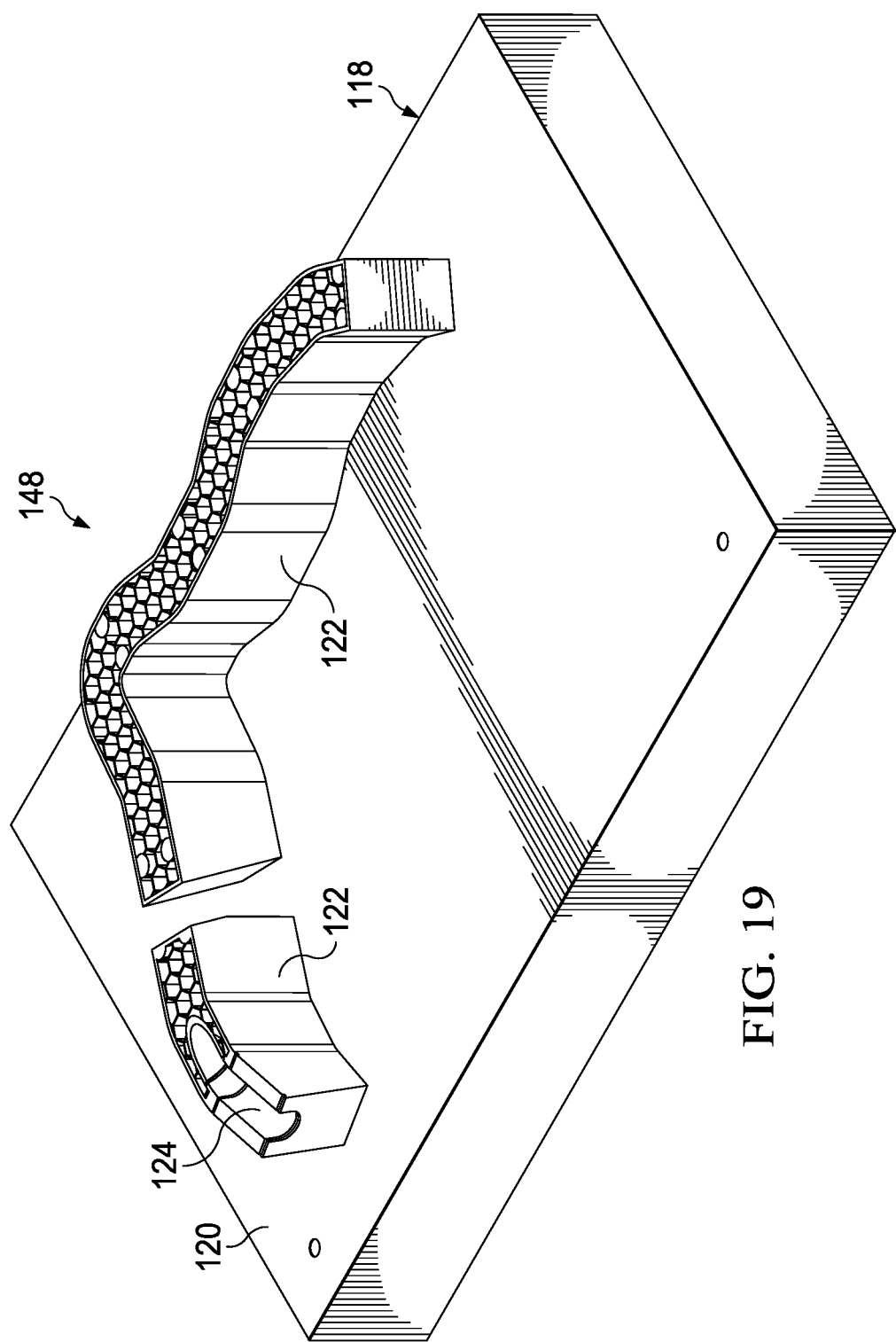
Figure 20:
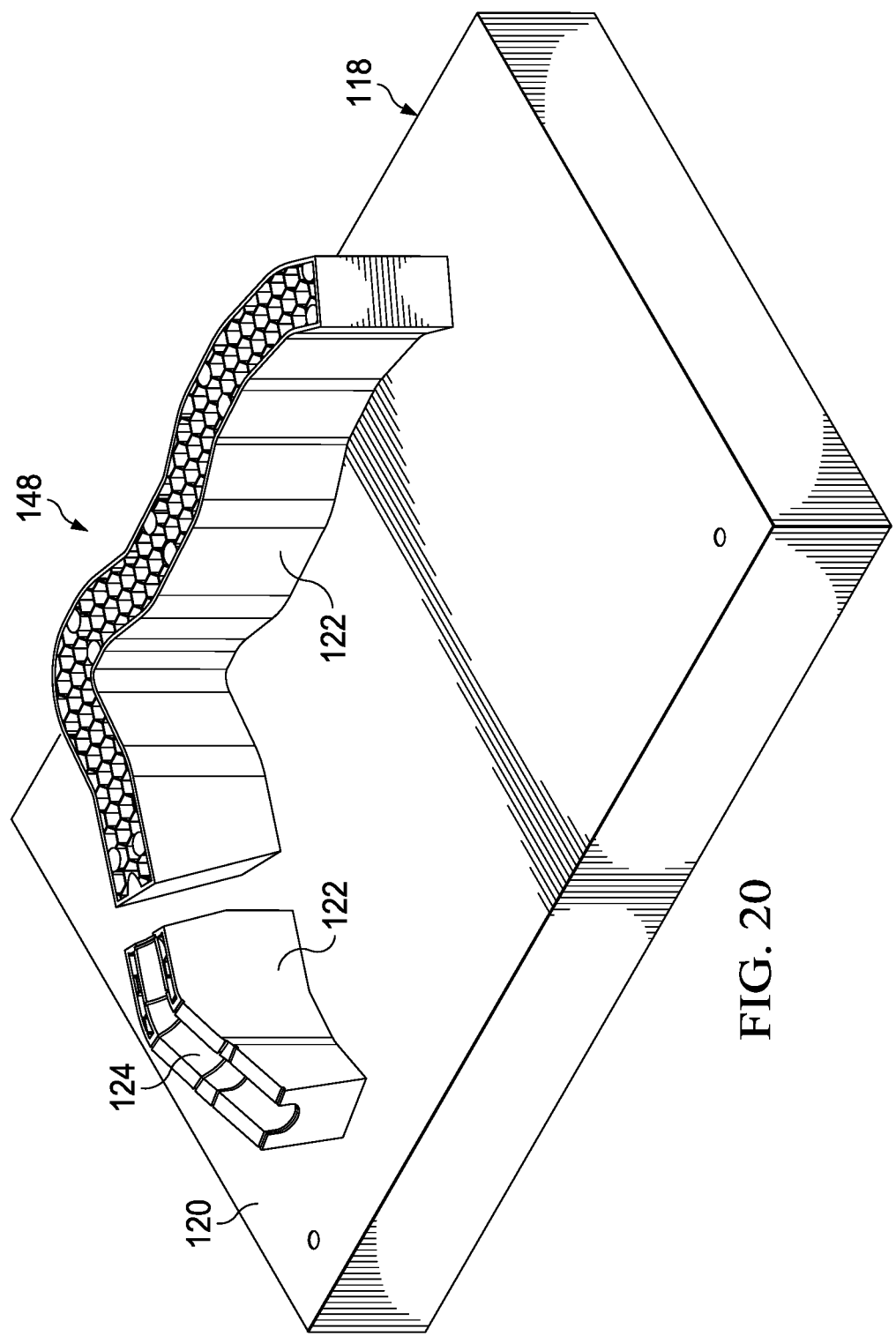
Figure 21:
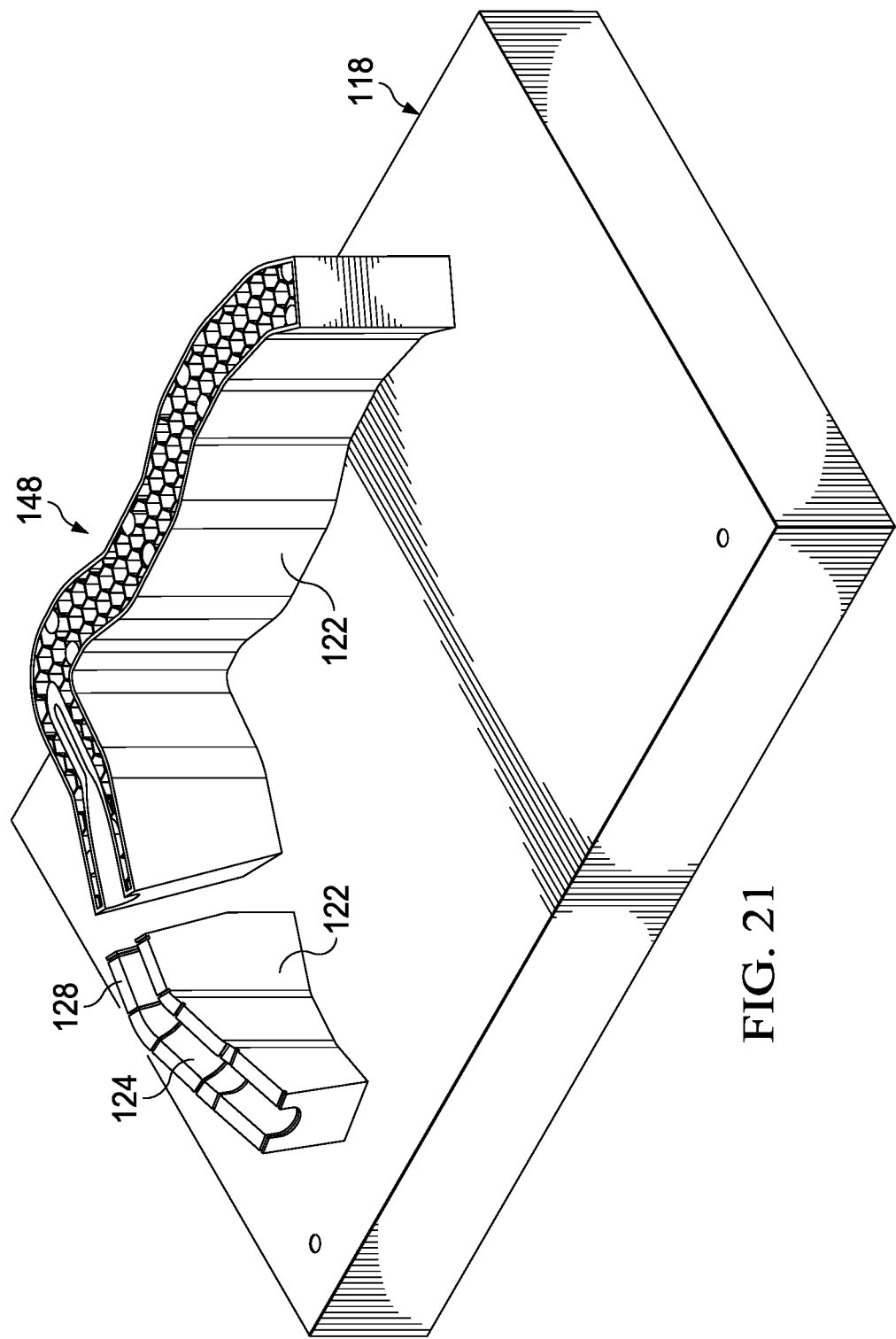
Figure 22:
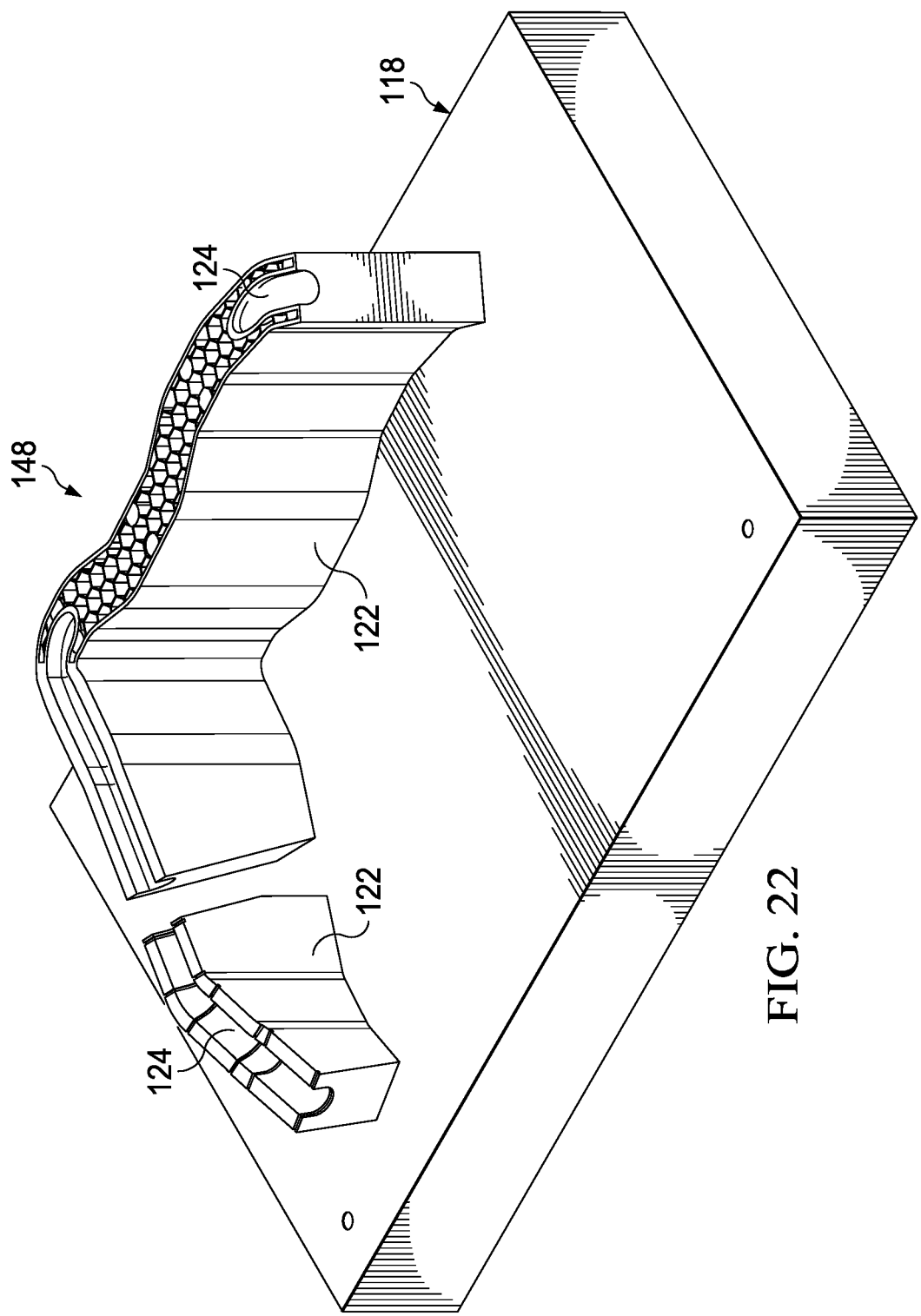
Figure 23:
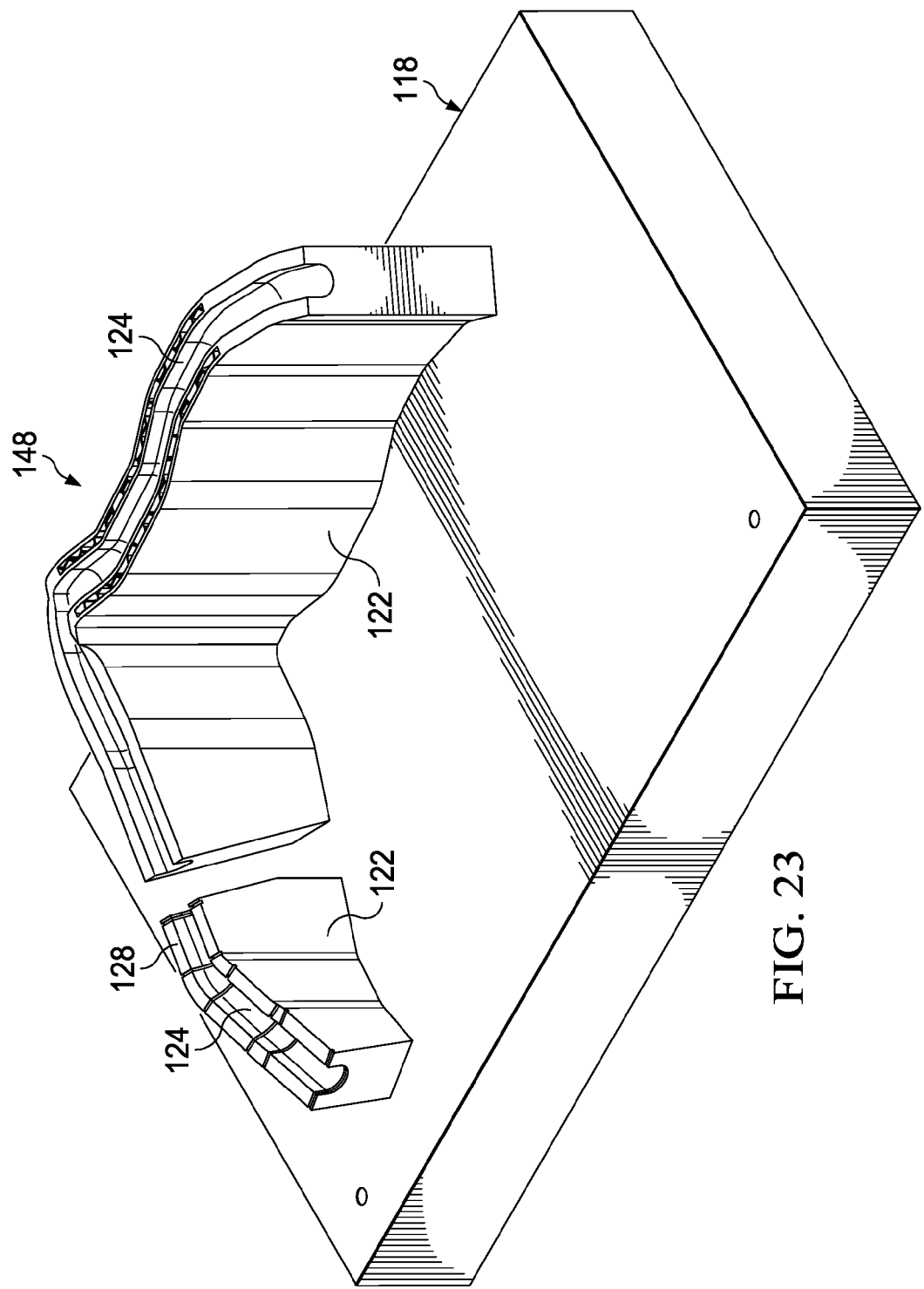
Figure 24:
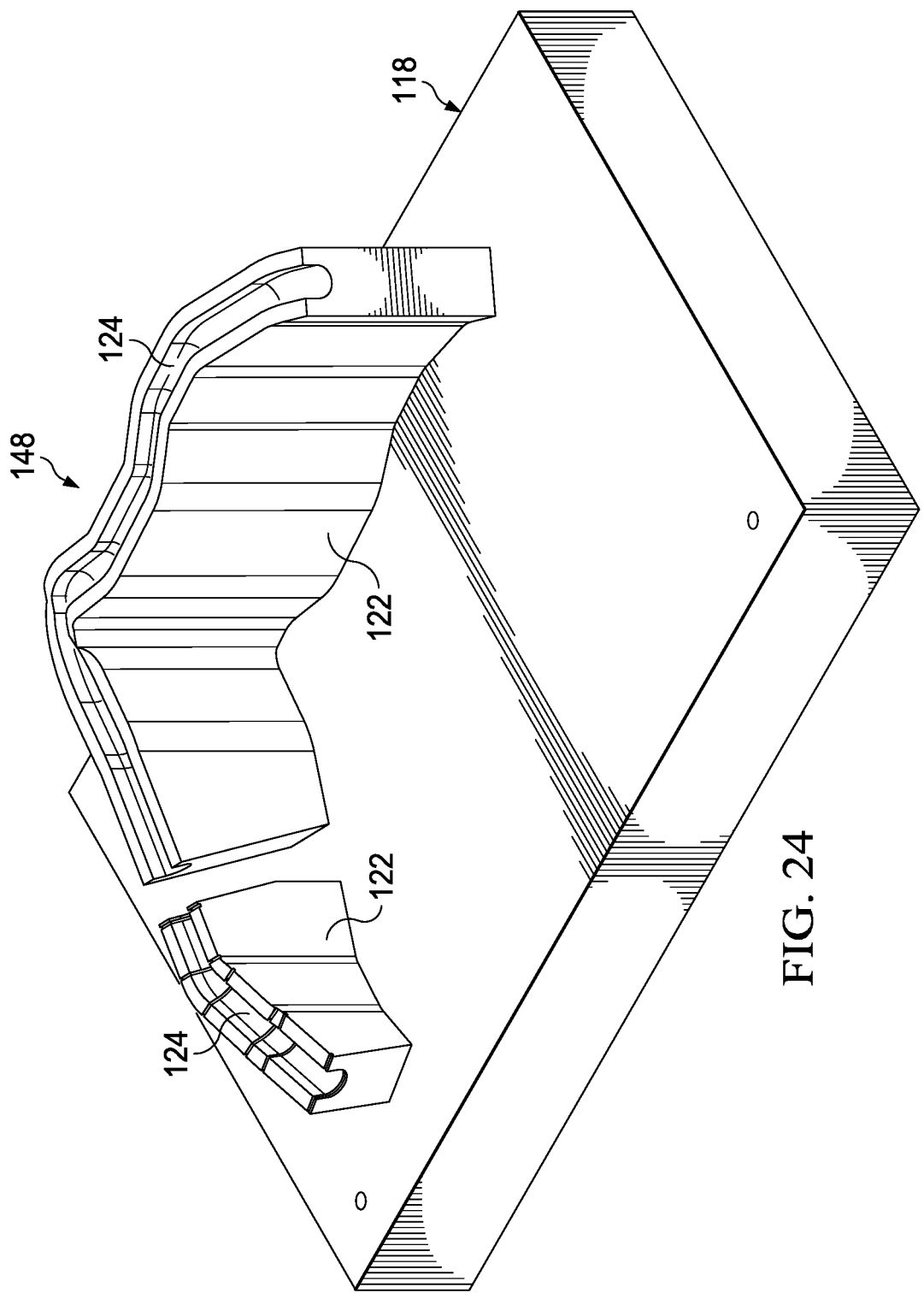
Figure 25:
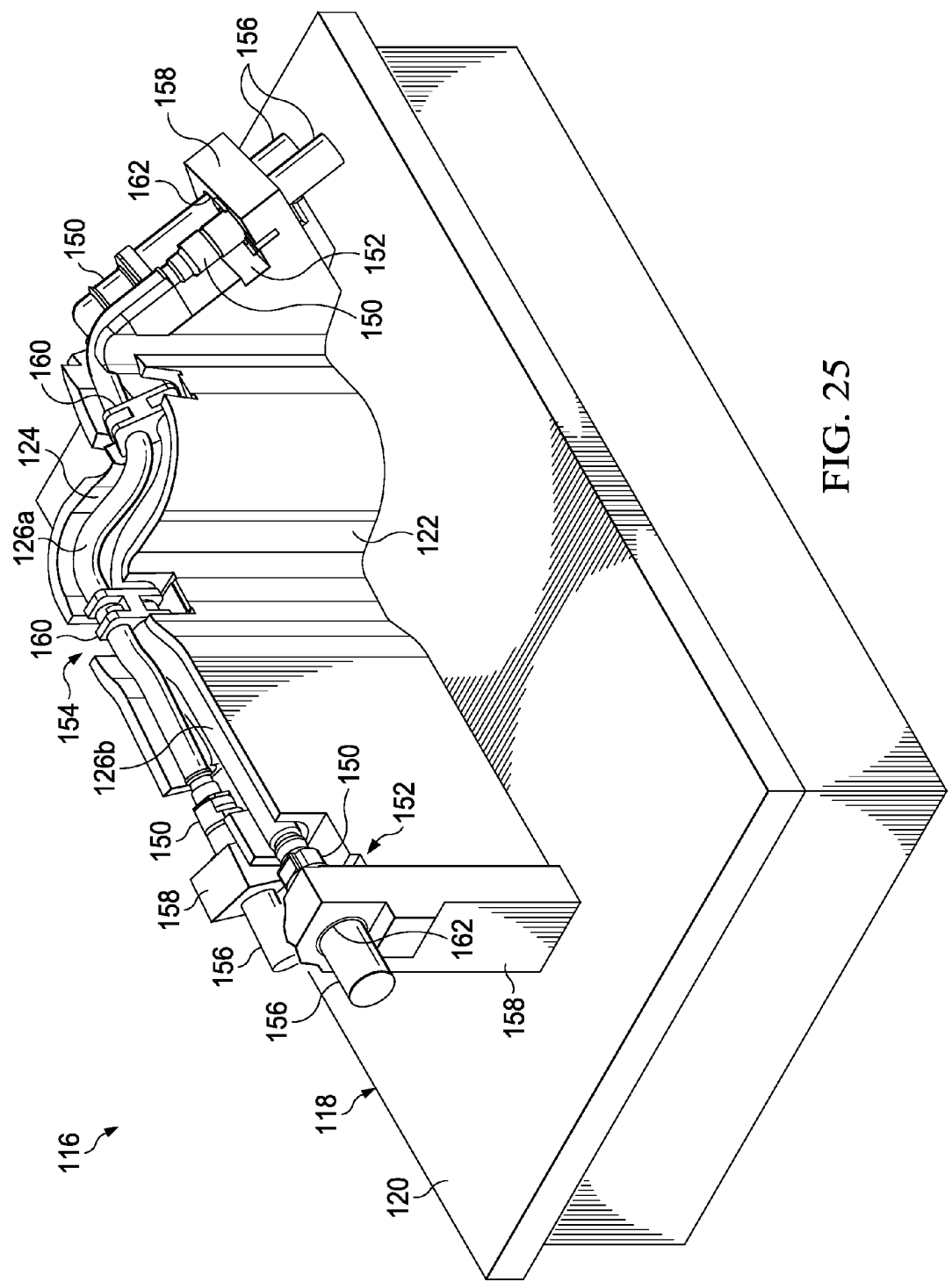
FIGS. 25 and 26 are perspective views of a gauge for checking a 2 tube assembly, showing the position of the tube in the gauge.
Figure 26:
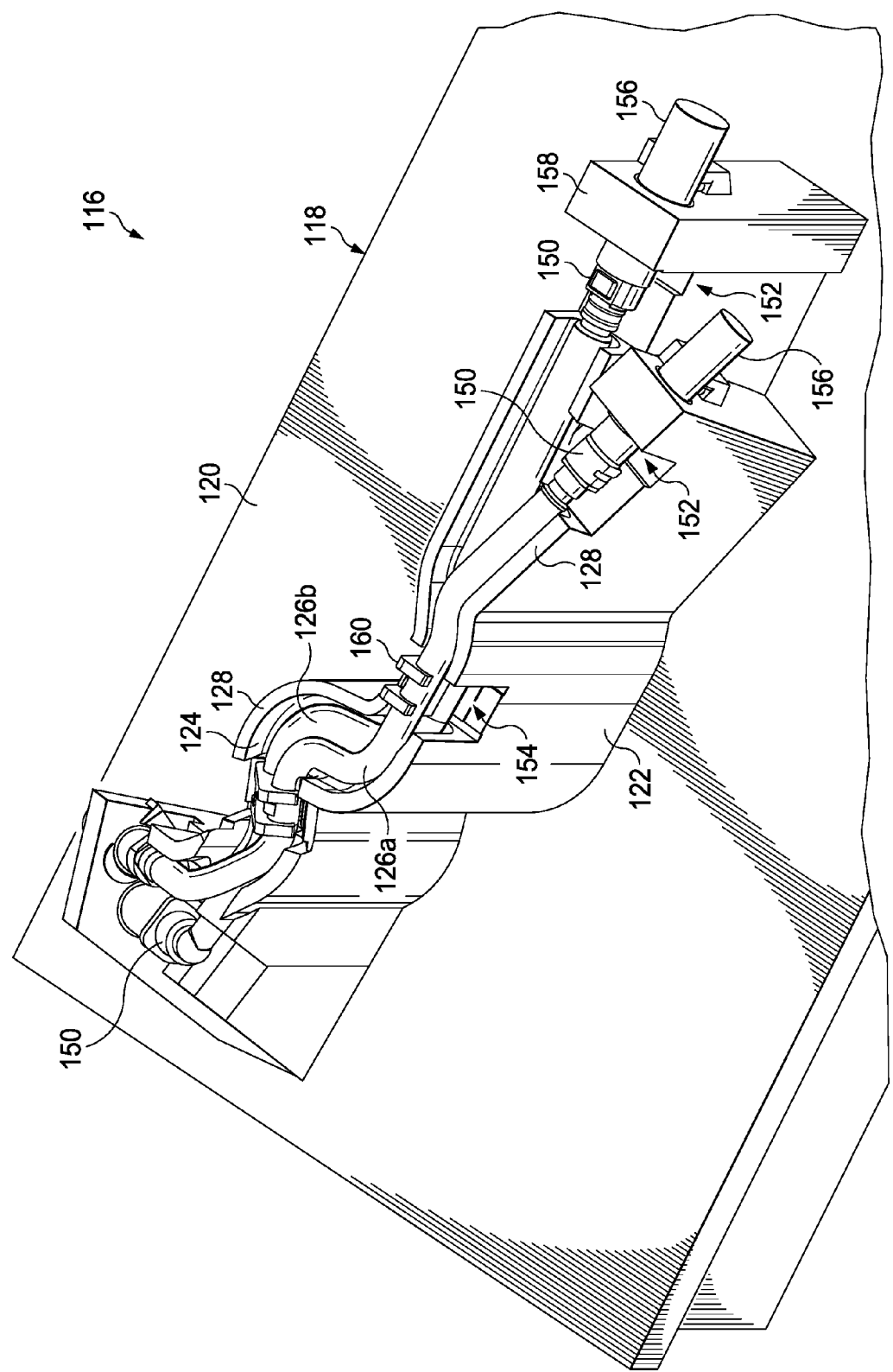
Figure 27:
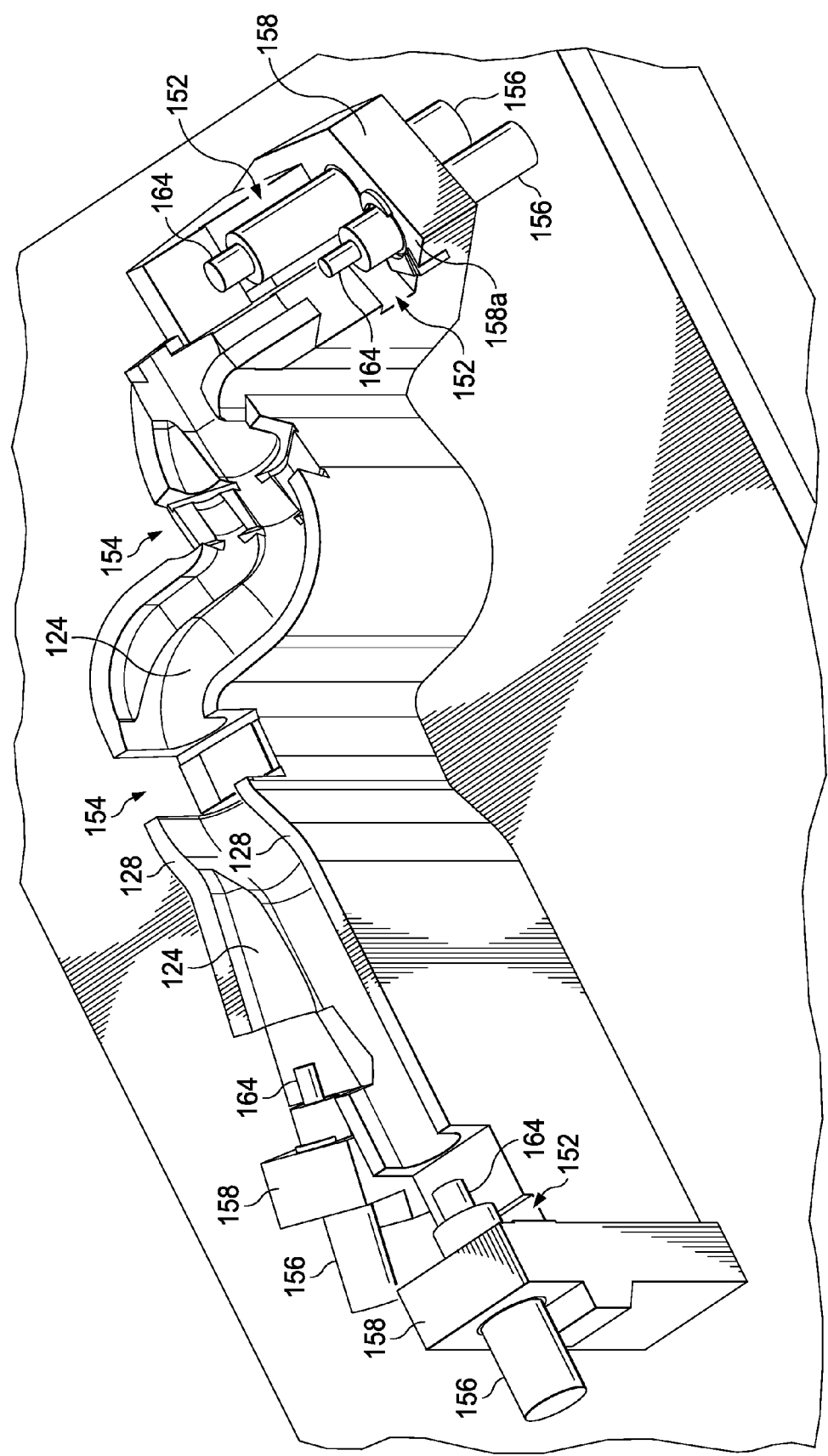
FIG. 27 is a perspective view of the gauge shown in FIGS. 25 and 26, with the tube assembly removed.
Figure 28:
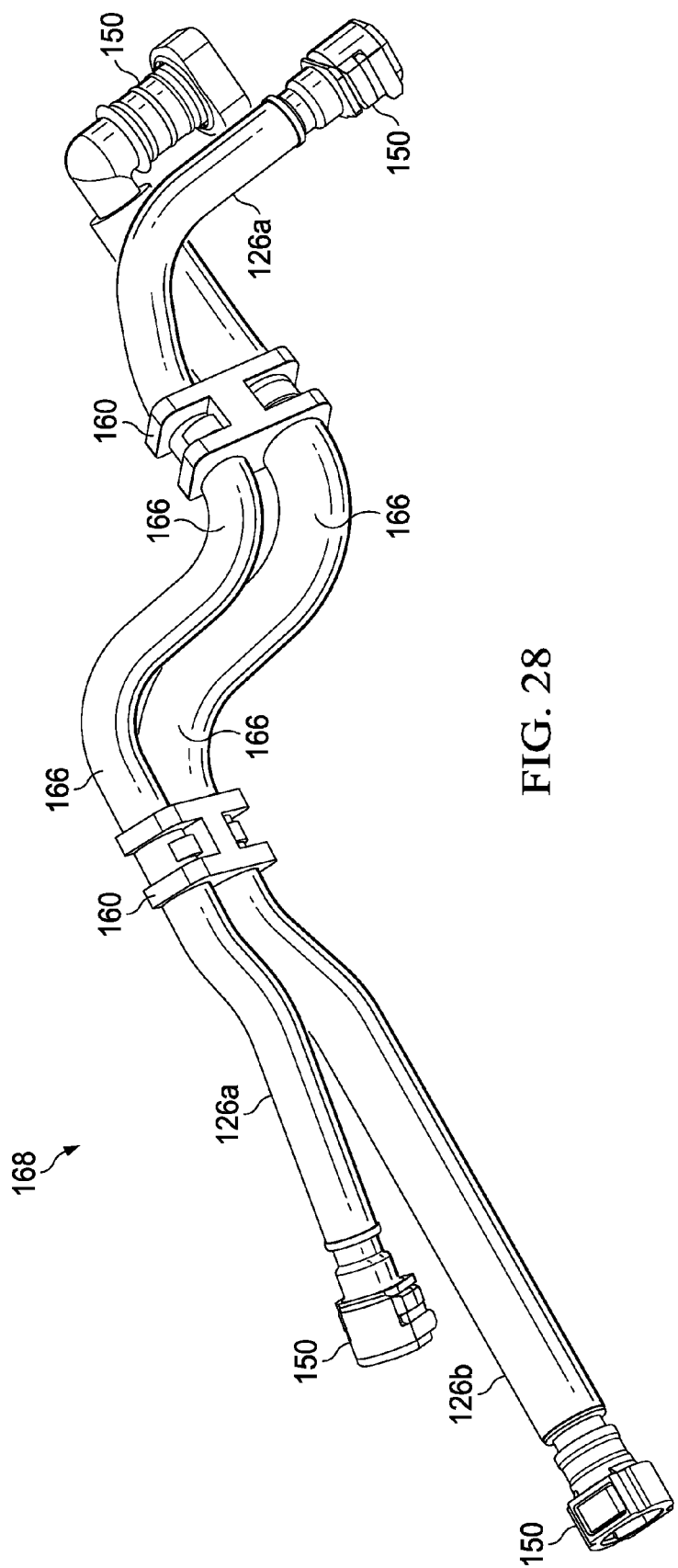
FIG. 28 is a perspective view of the 2 tube assembly shown in FIGS. 25 and 26.

In FIG. 16, the footprint of the gauge blocks to be built is shown at 142. With the base 118, including the base surface 120 having been fabricated, the gauge blocks 122 are then fabricated, layer-by-layer, as shown in FIGS. 17-24. As the gauge blocks 122 are being formed, the tube channels 124 are likewise formed, layer-by-layer. FIG. 19 illustrates the initial partial formation of a tube channel 124 in one of the gauge blocks 122. Since both the base 118 and the gauge blocks 122, including the tube channels 124 are digitally manufactured within a common reference system, the tube channels 124 are precisely located, sized and swept to match the 3-D CAD model of the tube 126, but with built-in tolerance boundaries.

Attention is now directed to FIGS. 25-30 which illustrate a typical gauge 116 fabricated using the additive manufacturing technique described above. The gauge 116 may be used to check conformance of a tube assembly 168 (see FIG. 28) with one or more reference standards related to feature location, bend point/angles 166, sweep angles, length etc. The tube assembly 168 comprises first and second tubes 126a, 126b each provided with end fittings 150 which adapt the tube to be coupled with other functional components (not shown). The tubes 120a, 126b may be held together in a desired relative orientation of by tube clips 160. In the illustrative example, the gauge 116 comprises a single gauge block 122 having multiple tube channels 124 for checking fit the individual tubes 126a, 126b. The gauge 116 includes tube centering end pins 156 which are longitudinally slidable through openings 162 (FIG. 25) in end pin support blocks 158 that are integrally formed with the gauge block 122, and which may be also integrally formed with the base 118. Each of the end pins 156 includes an ID locator which is marginally smaller than the inside diameter of a corresponding tube 126a, 126b. The end pins 156 function as reference stops to locate the ends of the tubes 126a, 126b, including the tube end fittings 150, as well as to center the ends of the tubes 126a, 126b within the tolerance boundaries provided within the tube channels 124.

Figure 29:
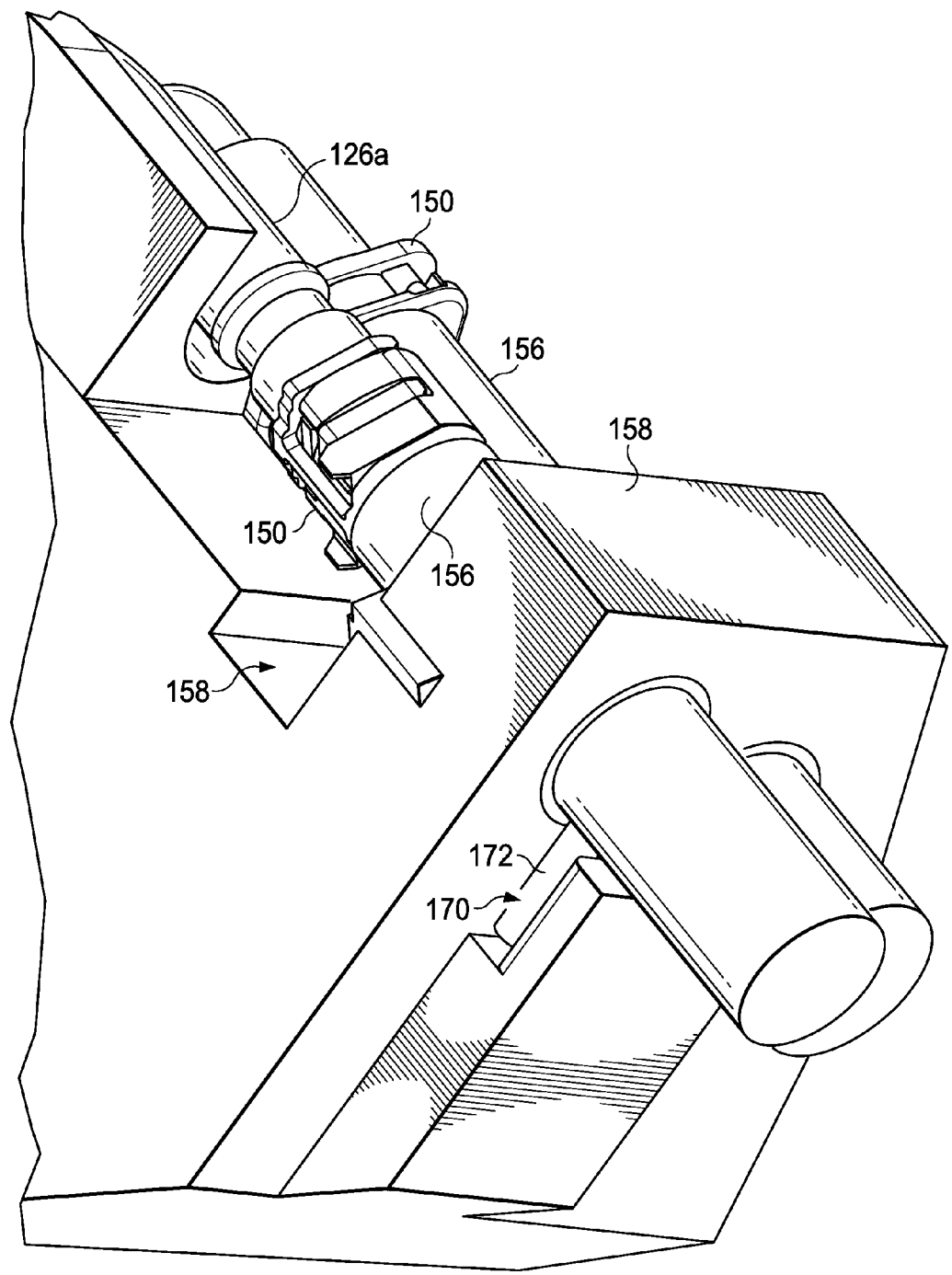
FIG. 29 is a perspective view of one end of the gauge shown in FIGS. 25-27, illustrating in more detail the relationship of the tubes and the tube centering pins.
Figure 30:
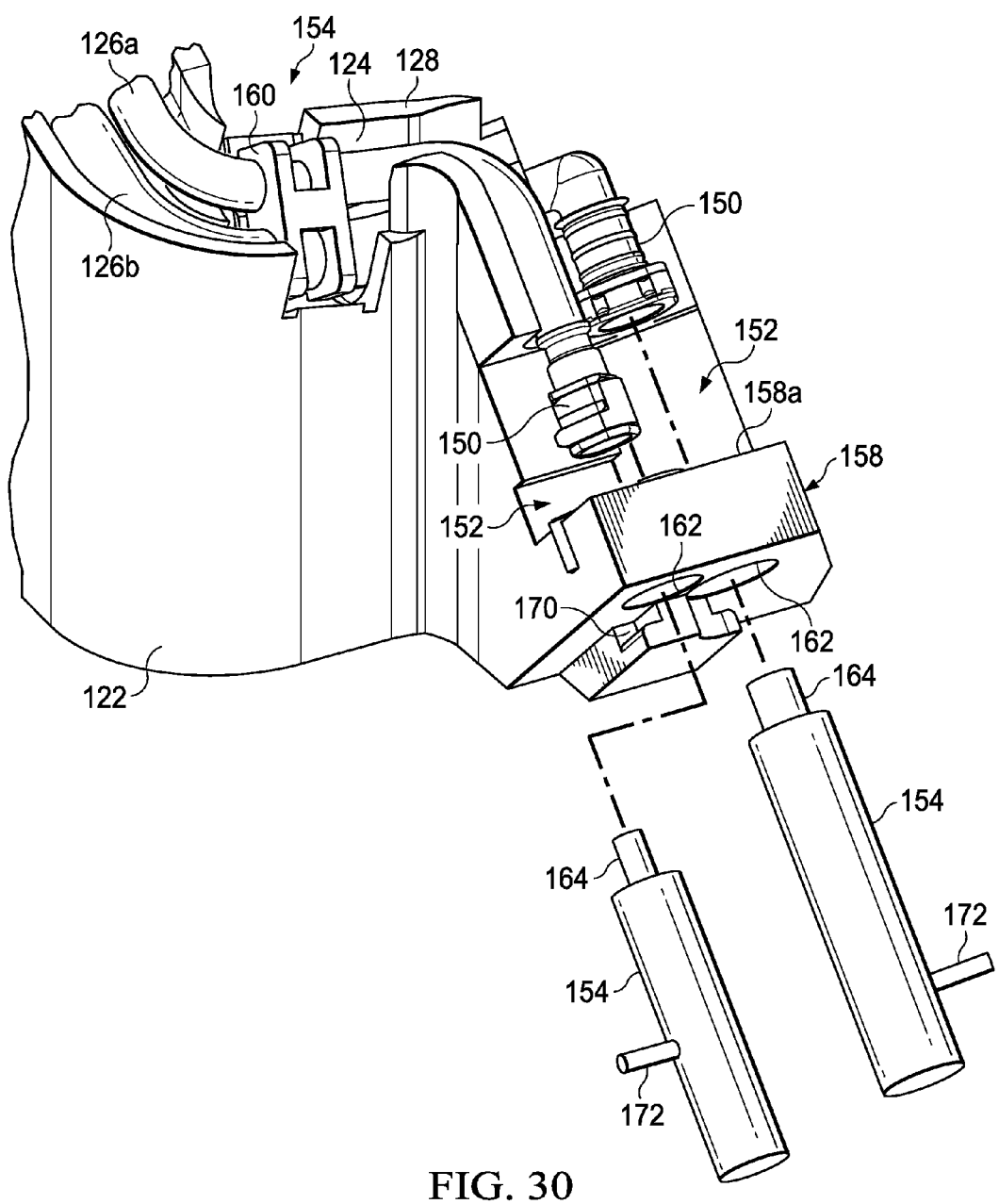
FIG. 30 is a perspective view of one end of the gauge shown in FIGS. 25-27 and 28, the tube centering pins exploded, and better revealing the tolerance markers.

As best seen in FIGS. 29 and 30, each of the end pins 156 includes a locking mechanism comprising a keeper arm 172 that is received within a corresponding slot 170 in a support block 158. Initially, the end pins 156 are retracted to provide clearance so that the tubes 126a, 126b can be placed in the tube channels 124. The ends of the tubes 126a, 126b, or in the illustrated example, the end fittings 150, engage the ends of the end pins 156 and may, at one extreme, rest against faces 158a of the support blocks 158. However, if either of the tubes 126a, 126b is too long and therefore out of tolerance, it will not be possible for inspector to place the tube assembly 168 in the gauge 116 because of interference of the ends of the tubes 126a, 126b with the support blocks 158. However, assuming that the tubes 126a, 126b are not too long, the tube assembly 168 is placed on the gauge 116, and the end pins 156 are then extended, causing the ID locators 164 to enter the inside diameter of the tubes 124a, 124b, and/or the end fittings 150, depending upon the configuration of the tubes 126 and thereby center the ends of the tubes 126a, 126b. With the ends of the end pins 156 engaging the ends of the tubes 126a, 126b, the end pins 156 are then rotated until the keeper arms 172 enter the corresponding slots 170, thereby locking the ends of the tubes 126a, 126b in place in a desired location and orientation.

A tolerance marker area 152, which may or may not be color-coded, is integrally formed with the gauge blocks 122, adjacent the support block faces 158a. The illustrative example, the tolerance marker area 152 comprises a visual recess in a portion of the gauge block 122. If the end of a tube 126 (or end fitting 150) lies within the marker area 152, then the length of the tube 126 is too long and an inspector can quickly visually determine that the tube is out of tolerance. However, if the longitudinal position of the end of the tube 126 (or the end fitting 150) lies outside of the marker area 152, then the tube 126 can be seen to be within the desired length tolerance.

One or more cutouts 154 may be provided in the sidewalls of the tube channels 124, either to provide lateral clearance for tube clips 160 and/or to allow an inspector to grasp the tube assembly 168 so that it can be removed from the gauge 116.

Figure 31:
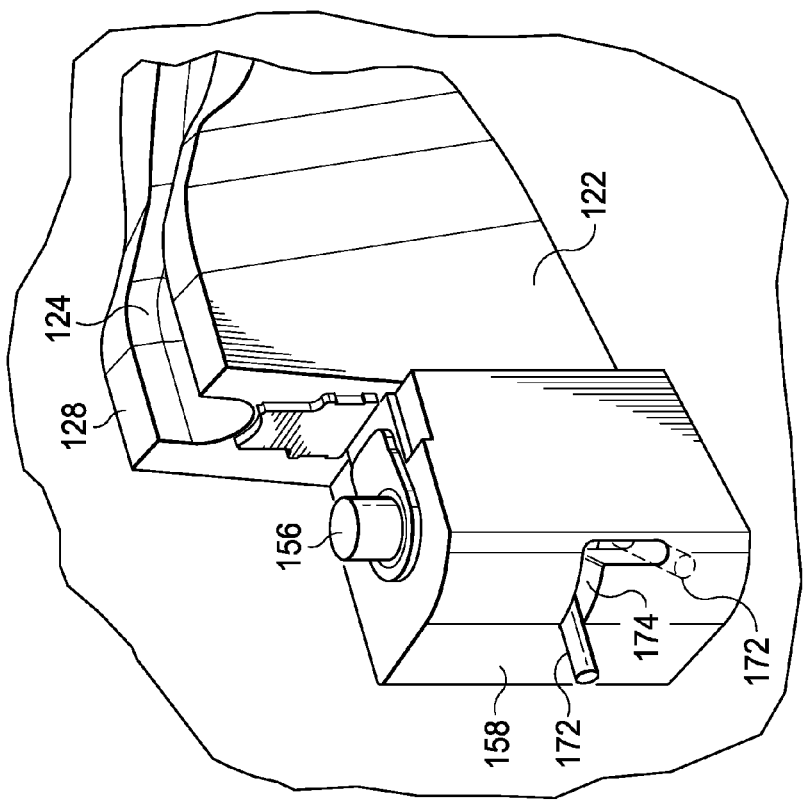
FIG. 31 is an exploded, perspective view of a tube centering pin and pin support block.
Figure 32:
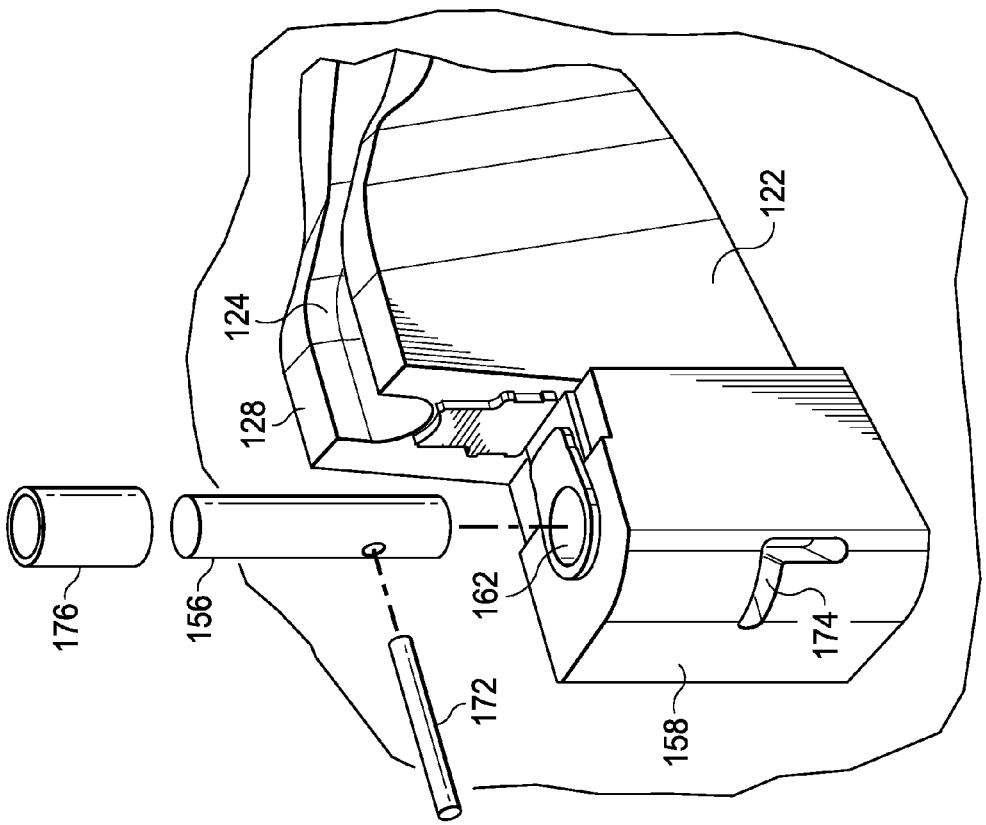
FIG. 32 is a perspective view of the centering pin and pin support block shown in FIG. 31, showing both locked and unlocked positions of the pin

FIGS. 31 and 32 to illustrate an alternate construction for locking the end pins 156 in place. In this example, an L-shaped slot 174 is formed integral with the support blocks 158 as the support blocks 158 are being fabricated layer-by-layer during the additive manufacturing process. In one position, the keeper arm 172 allows the end pin 156 to be retracted so that a tube 126 may be either placed in or removed from the tube channel 124. Once the tube 126 is in place in the tube channel 124, the keeper arm 172 is shifted longitudinally and laterally to the opposite end of the slot 174, thereby locking the end pin 156 in place.

Figure 33:
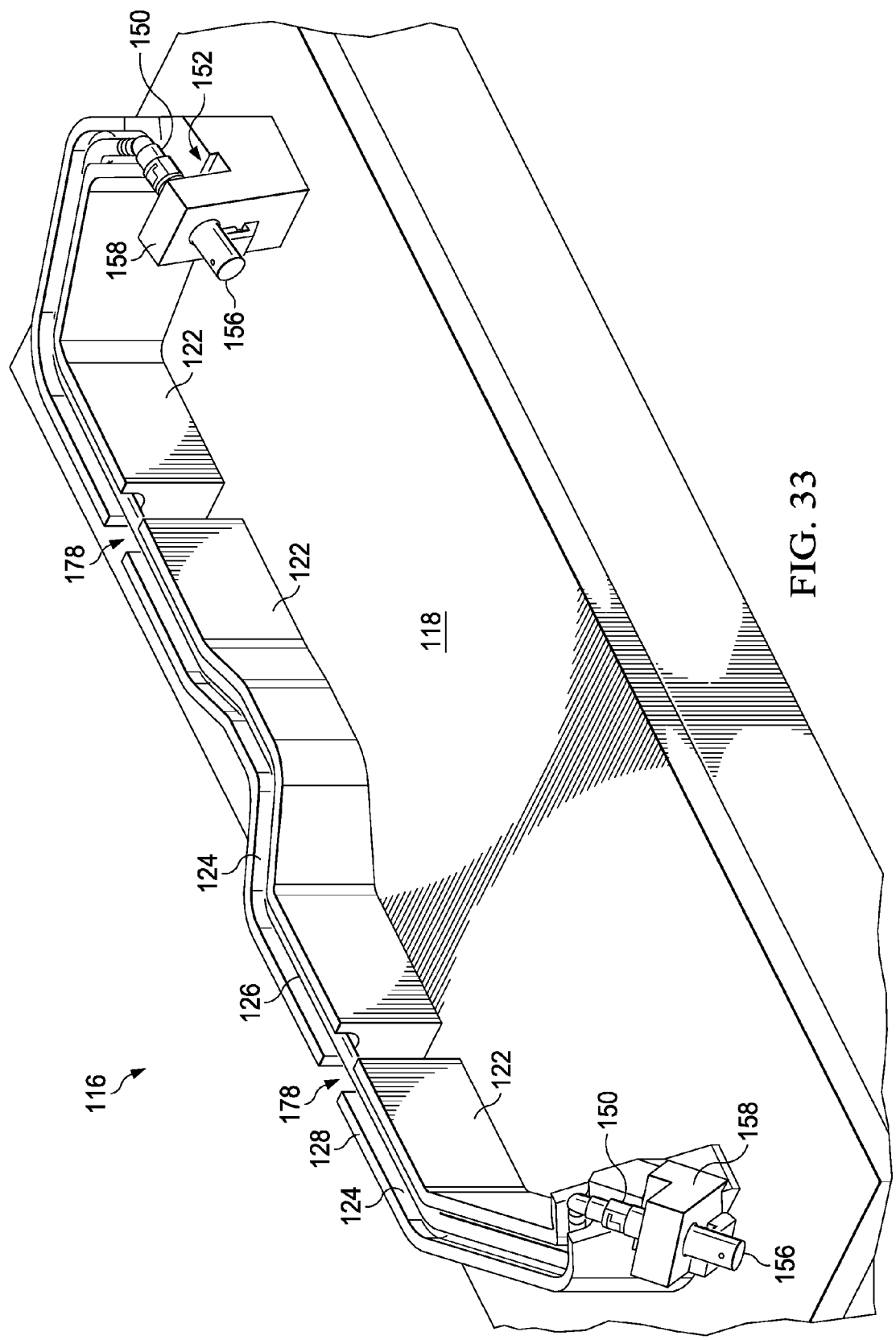
FIG. 33 is a perspective view of an alternate embodiment of the checking gauge having multiple gauge blocks for checking a single tube.
Figure 34:
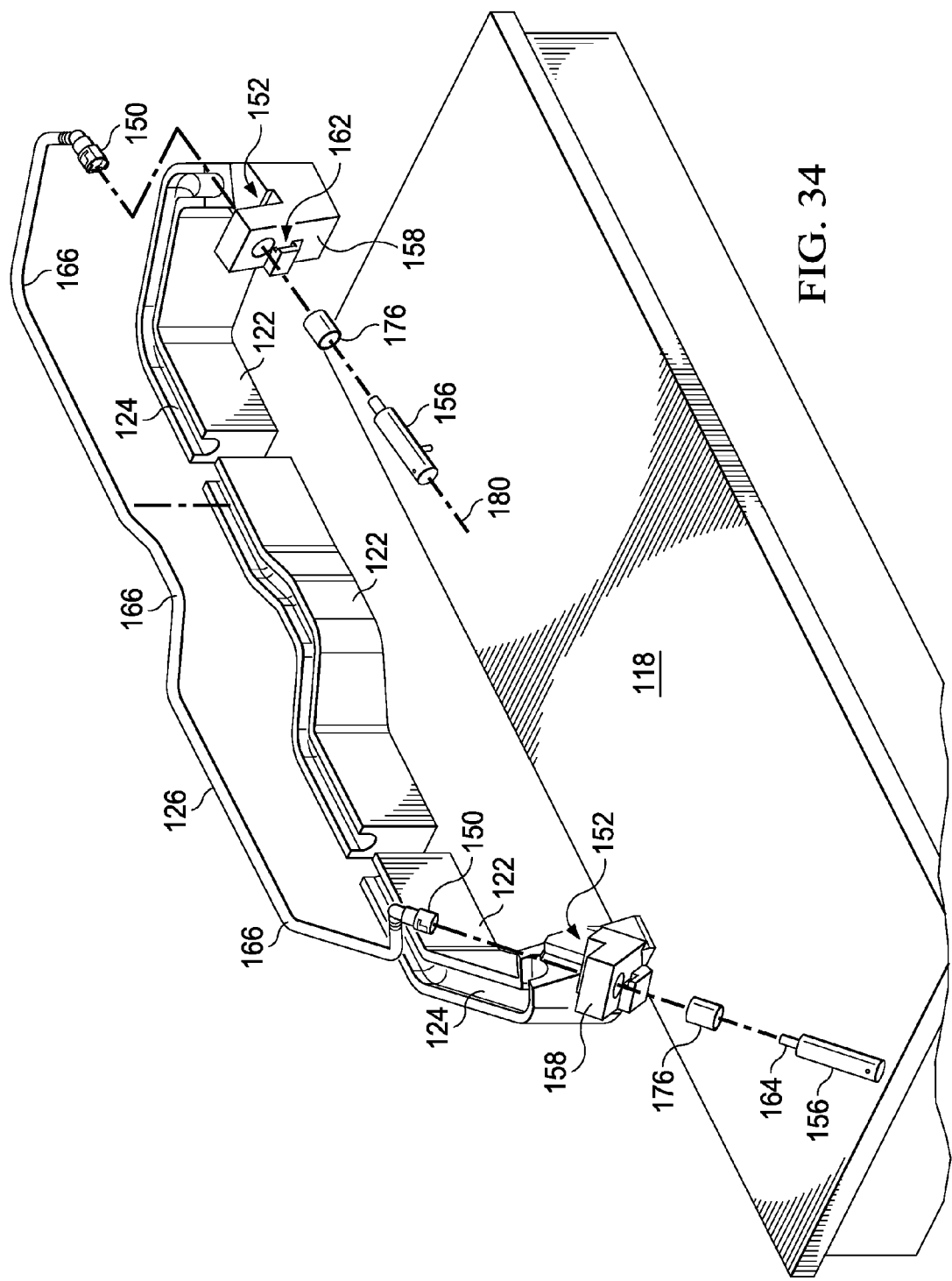
FIG. 34 is a perspective, exploded view of the gauge shown in FIG. 33.

FIGS. 33-34 illustrate another example of the disclosed the gauge 116 which comprises 3 gauge blocks 122 used to check a single tube 126. The gauge blocks 122 may be slightly spaced apart to form a gaps 178 therebetween which may facilitate grasping the tube 26 to remove it from the gauge 116 following a checking procedure. The gauge blocks 122 may be integrally fabricated with a base 118 during the additive manufacturing process such that they are precisely pre-positioned relative to each other and the tube channel 124 is precisely aligned within the gauge blocks 122 along the entire length of the gauge 116, in spite of the presence of gaps 178.

Figure 35:
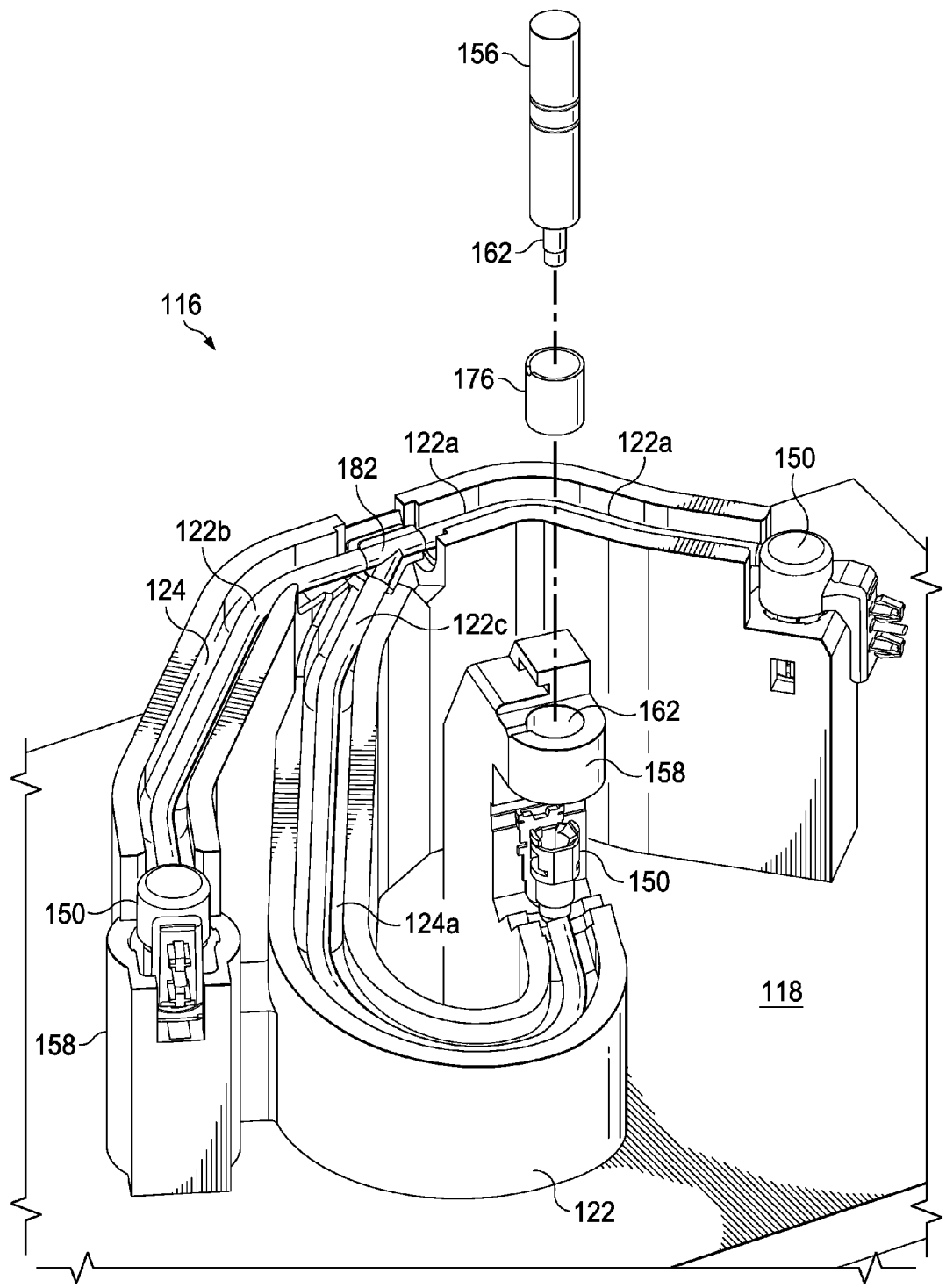
FIG. 35 is a perspective view of still another embodiment of the gauge for checking a tube assembly having multiple sections coupled by a connector.

FIG. 35 illustrates another embodiment of the disclosed gauge 116 in which a tube assembly may be checked which includes three tube sections 122a, 122b, 122c connected together by a tube coupler 182. The tube sections 122a, 122b, 122c are received within three corresponding tube channels 124 integrally formed in a single gauge block 122. In this example, a bushing 176 fixed within the pin opening 162 in support block 158 acts as a bearing surface for slidably receiving an end pin 156.

Figure 36:
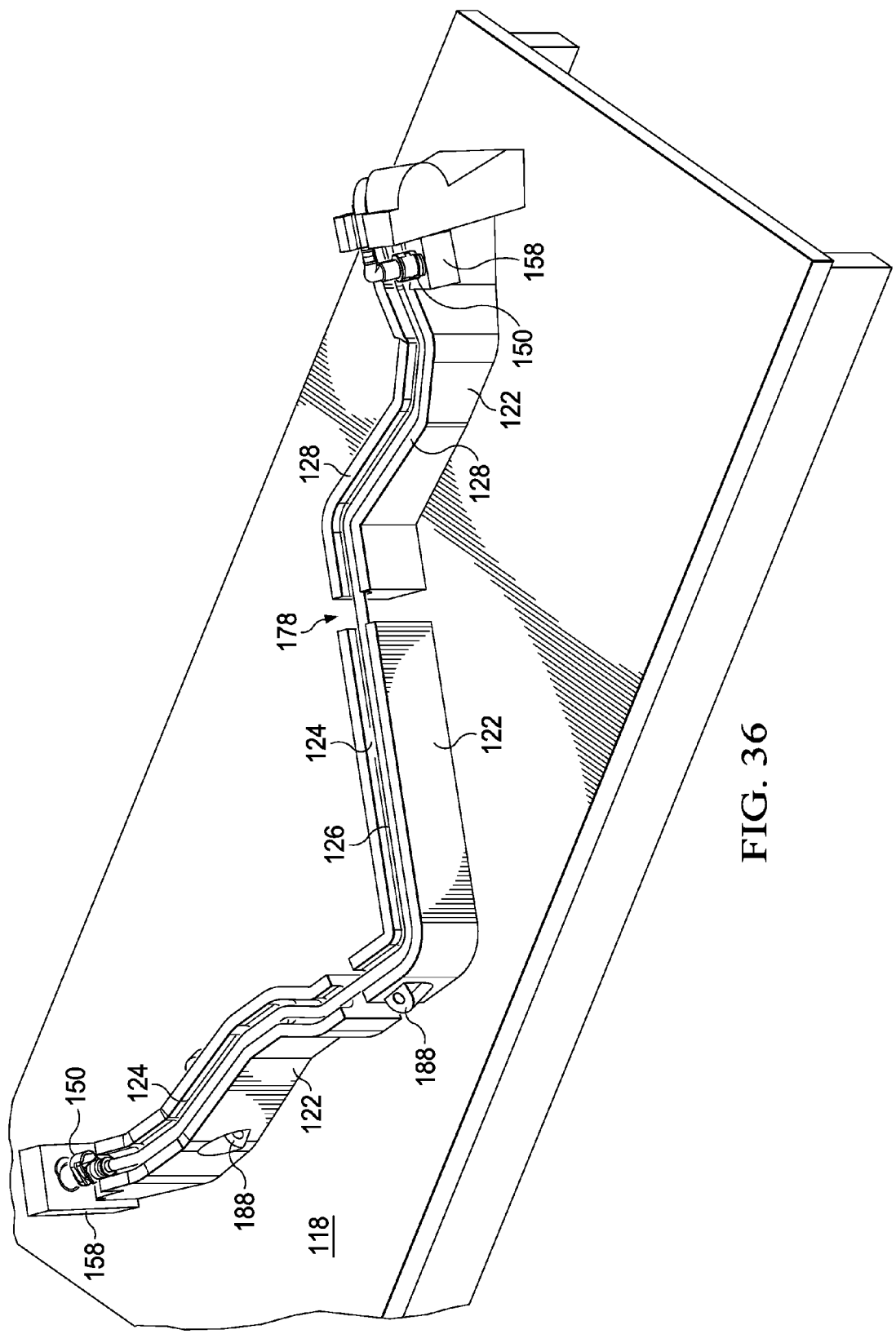
FIG. 36 is a perspective view of a gauge having multiple gauge blocks mechanically fastened to a separate base.
Figure 37:
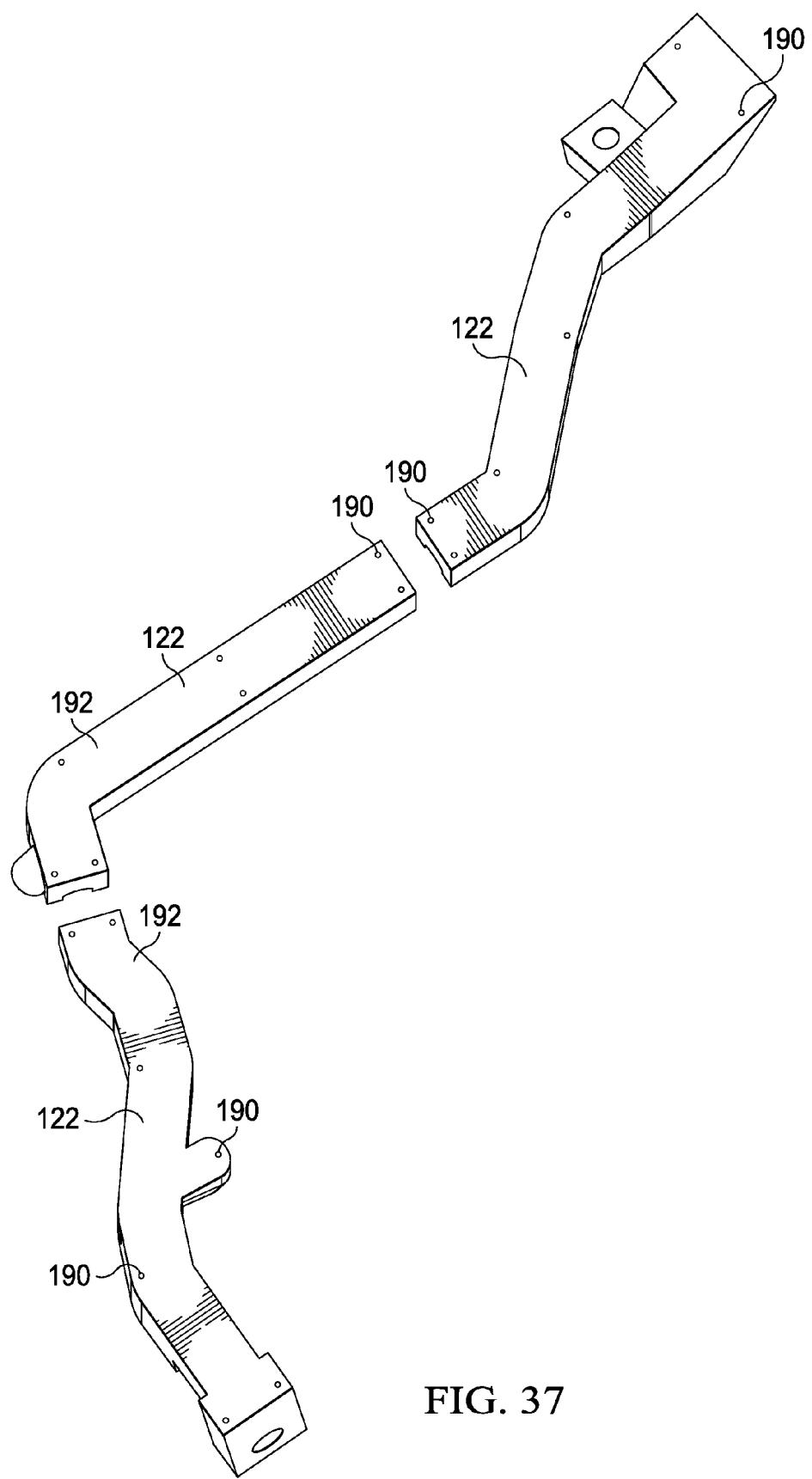
FIG. 37 is a perspective view of the gauge blocks shown in FIG. 36, illustrating the flat bottoms of the gauge blocks having mounting holes.

FIGS. 36 and 37 illustrate a further example of the disclosed gauge 116 which comprises three separate gauge blocks 122 that are mounted on a common base 118. In this example, each of the gauge blocks 122 is separately produced using the additive manufacturing process previously described, but each of the gauge blocks 122 is manufactured separately from, rather integrally with the base 118. This technique may be used where there may be limitations on the size of the parts that may be manufactured with the additive manufacturing machine 104. The base 18 may be made of any suitable material, which may be the same or different from the material from which the gauge blocks 122 are fabricated. Each of the gauge blocks 122 may be provided with integrally formed alignment touch points 188 that y be contacted, for example, using a coordinate measuring machine to aid in locating and positioning and aligning the gauge blocks 122 relative to each other on the base 118.

Figure 38:
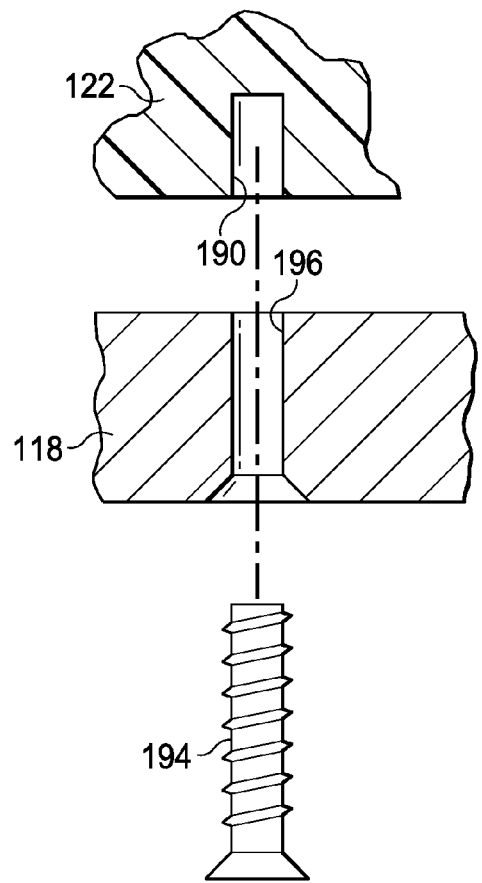
In FIG. 38 is a sectional view illustrating a method of attaching the gauge blocks shown in FIGS. 36 and 37 to the base using fasteners.

As shown in FIG. 37, the bottom of each of the gauge blocks 122 lies substantially flat, and may include mounting holes 190 that are integrally formed with the gauge blocks 122 during the additive manufacturing process, so that they are pre-aligned with respect to each other. Referring to FIG. 38, screws or similar fasteners 194 may be inserted through fastener openings 196 in the base 118. The fasteners 194 are received within the mounting holes 190 in the gauge blocks 122. The fastener openings 196 in the base 118 may be formed by automated equipment, such as a mill or drill that is controlled by the computer 106 which locates the fastener openings 196 in the locations necessary to effectively pre-align the gauge block segments 122 when they are installed and fastened to the base 118.

Figure 39:
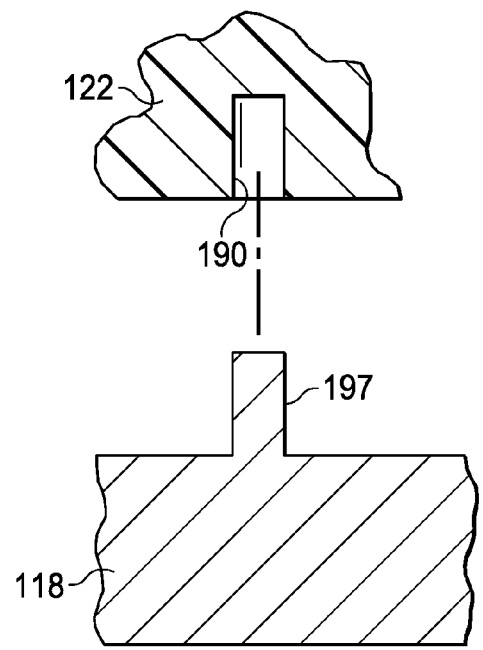
FIG. 39 is a sectional view illustrating a method of attaching the gauge blocks shown in FIGS. 36 and 37 to the base using integrally formed, mating dowels and mounting hole.

Other techniques may be employed to align and mount the gauge blocks 122 shown in FIG. 37 on the base 118. For example, referring to FIG. 39, dowels 197 may be integrally formed in the base 118 at the locations necessary to pre-align the gauge blocks 122 relative to each other. The gauge blocks 122 are assembled on the base 118 by aligning the mounting holes 190 with the dowels 197. In still other embodiments, it may be possible to form alignment marks (not shown) on the surface of the base 118 using, for example, a laser, which are used to locate and align the gauge blocks 122 on the base 118. With each of the gauge blocks 122 properly aligned on the base 118, the gauge blocks 122 may be glued to the base 118.

Figure 40:
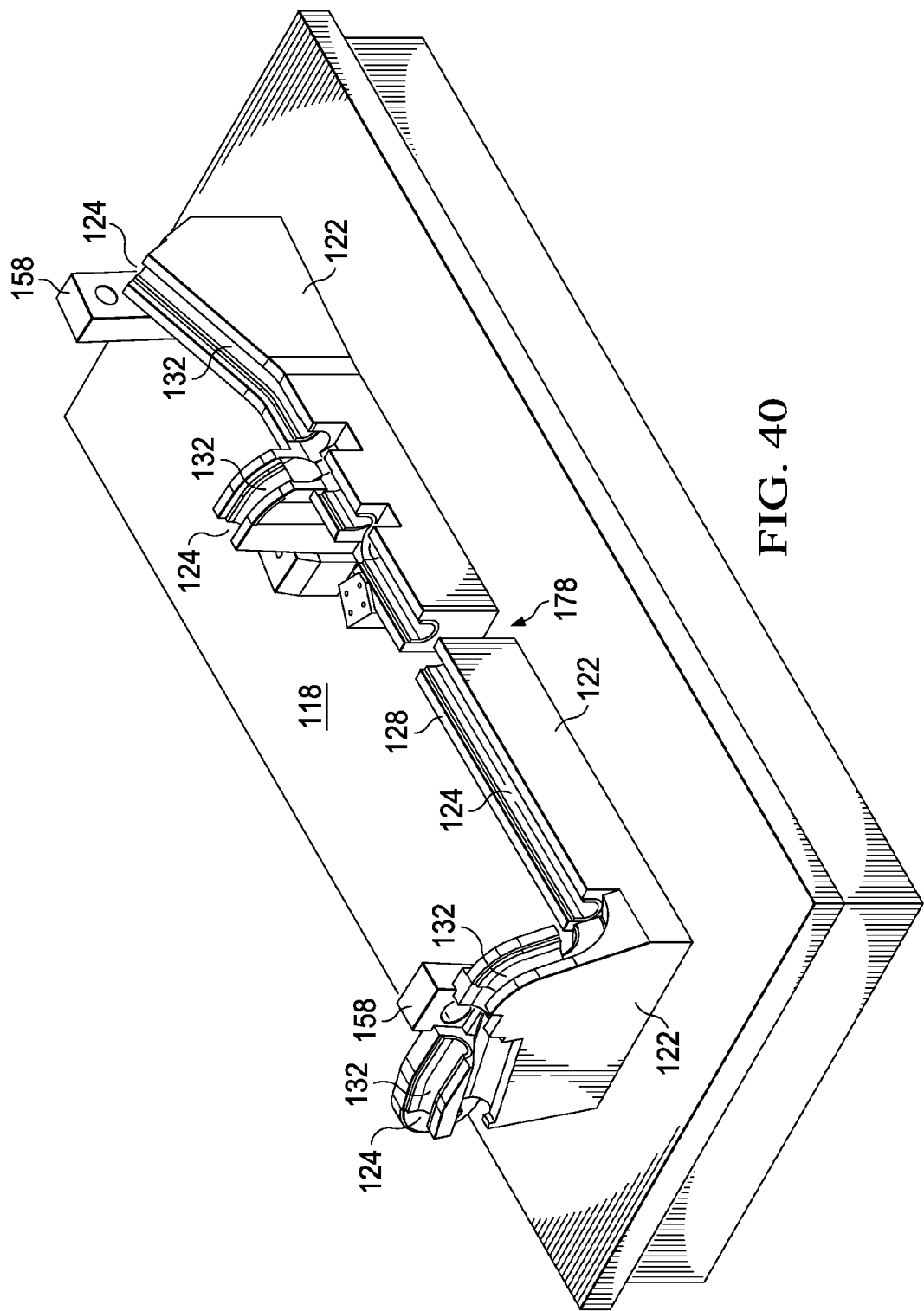
FIG. 40 is a perspective view of another embodiment of the gauge employing snap in, contoured shims.
Figure 41:
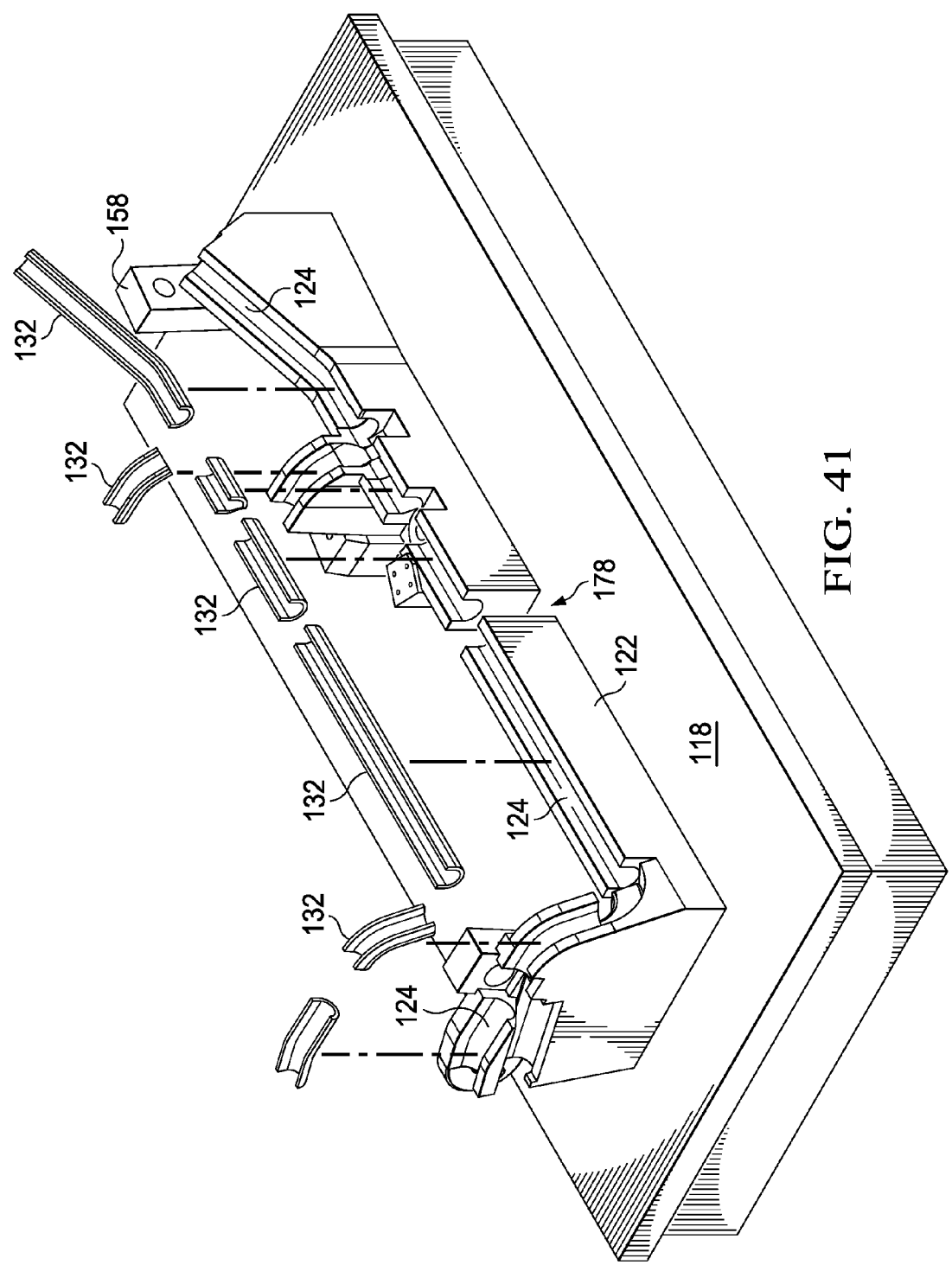
In FIG. 41 is a perspective view similar to FIG. 40, but with the shims exploded.
Figure 42:
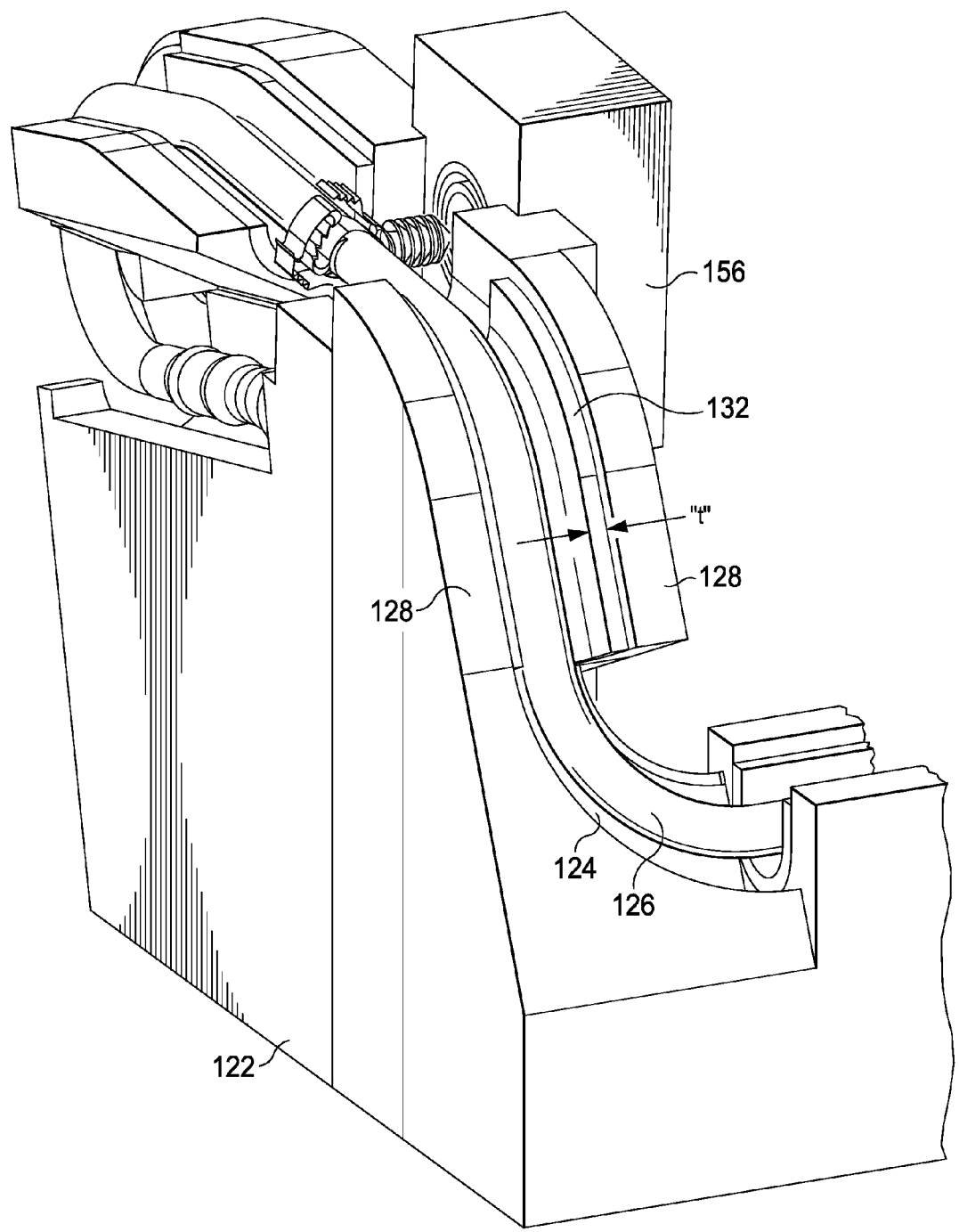
FIG. 42 is a perspective view better illustrating the details of one end of the gauge shown in FIGS. 40 and 41.

FIGS. 40-42 illustrate another embodiment of a gauge 116 that employs two individual gauge blocks 122 separated by a gap 178 and mounted on a base 118, In this example, the insertable shims 132 have contours that match contours in the tube channel 124. As in previous examples, the shims 132 possess a thickness "t" that reduces the tolerance boundary of the tube channel 124 along the inner side walls 127 and bottom 138 (see FIG. 4) of tube channel 124. The contoured shims 132 may be angled slightly outwardly so that they engage and grasp the inner sidewalls 127 of the tube channel 124. The contoured shims 132 may be formed of a material such as nylon, and are both removable and reusable.

Figure 43:
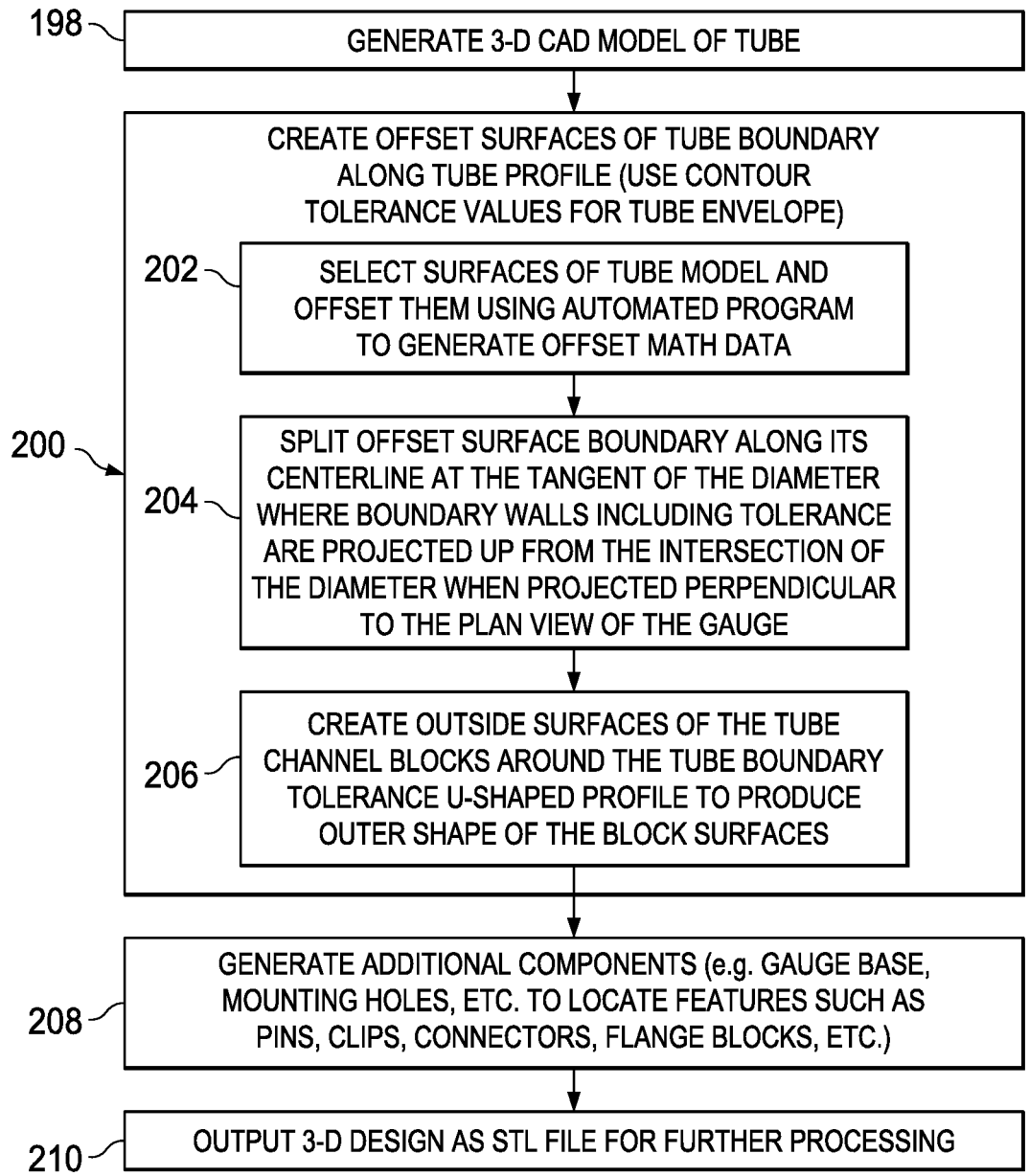
FIG. 43 is a flow diagram illustrating a method of fabricating the disclosed the gauge.

FIG. 43 illustrates certain steps of a method of generating a control program that may be used to digitally fabricate embodiments of the gauge 116 previously describe using additive manufacturing. Beginning at step 198, a 3-D CAD model of a tube 126 is generated. The CAD model may be generated using the computer 106 as part of the design of the tube 126, or may comprise digital data obtained by other means. At 200, a series of steps are carried out using one or more processors 108 of the computer 106 to automatically create offset surfaces of the tube boundary along with the profile of the tube 126. A set of contour tolerance values are generated by the computer 106 used to define the tube envelope.

At 202, surfaces of the 3-D CAD tube model are selected and are offset by the computer 106 using an automated program such as the conversion program 114, or manually to generate offset map data. At 204, the computer 106 splits the offset surface boundary along its centerline at the tangent of the diameter where boundary walls including tolerances are projected up from the intersection of the diameter when projected perpendicular to the plan view of the gauge when 16. At step 206, the computer 106 creates outside surfaces of the tube channel blocks. These outside surfaces are created around the U-shaped tube boundary tolerance profile to produce the outer shape of the gauge block surfaces.

At step 208, the computer 106 designs and generates control programs for fabricating additional components of the gauge, such as a gauge base, mounting holes, etc. in order to locate features such as pins, clips, connectors, flange blocks, etc. Finally, at step 210, a 3-D design is output as a STL file that may be used for further processing, such as to control the additive manufacturing machine 104 (FIG. 1).

Figure 44:
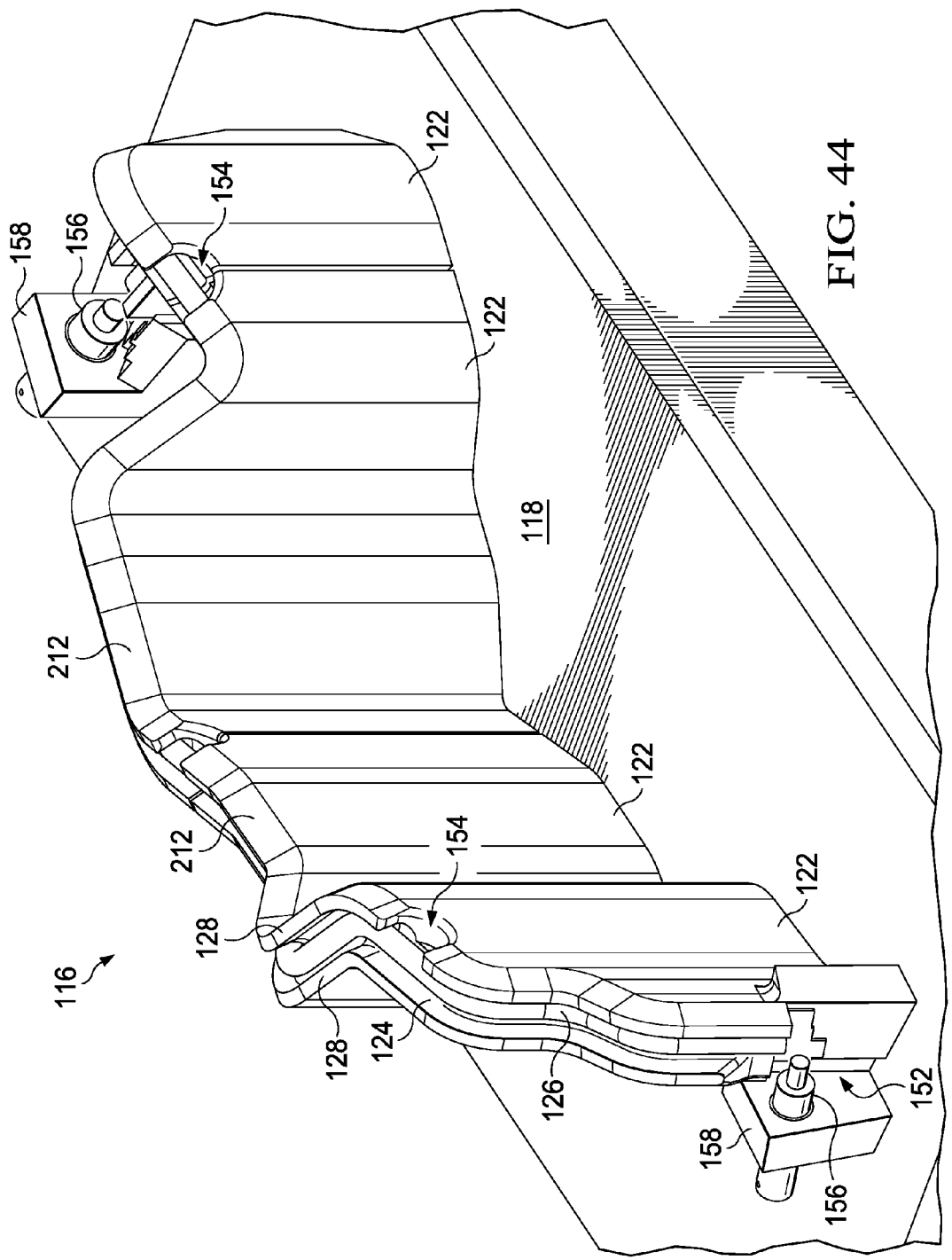
FIG. 44 is a perspective view of another embodiment of the disclosed gauge.

FIG. 44 illustrates a gauge 116, similar to those previously described, which includes multiple gauge block 122 mounted on a base 118 the gauge 116 shown in FIG. 44 may be produced using additive manufacturing techniques and the method previously described. The gauge 116 may include a chamfer 212 on each side of the tube tolerance channel 124, extending outwardly from the upper gauge block surfaces 128. The use of the chamfer 212 facilitates fabrication of the gauge blocks 122 and may aid an inspector in determining whether portions of a tube 126 are above the surfaces 128 and are therefore out of tolerance.

Figure 45:
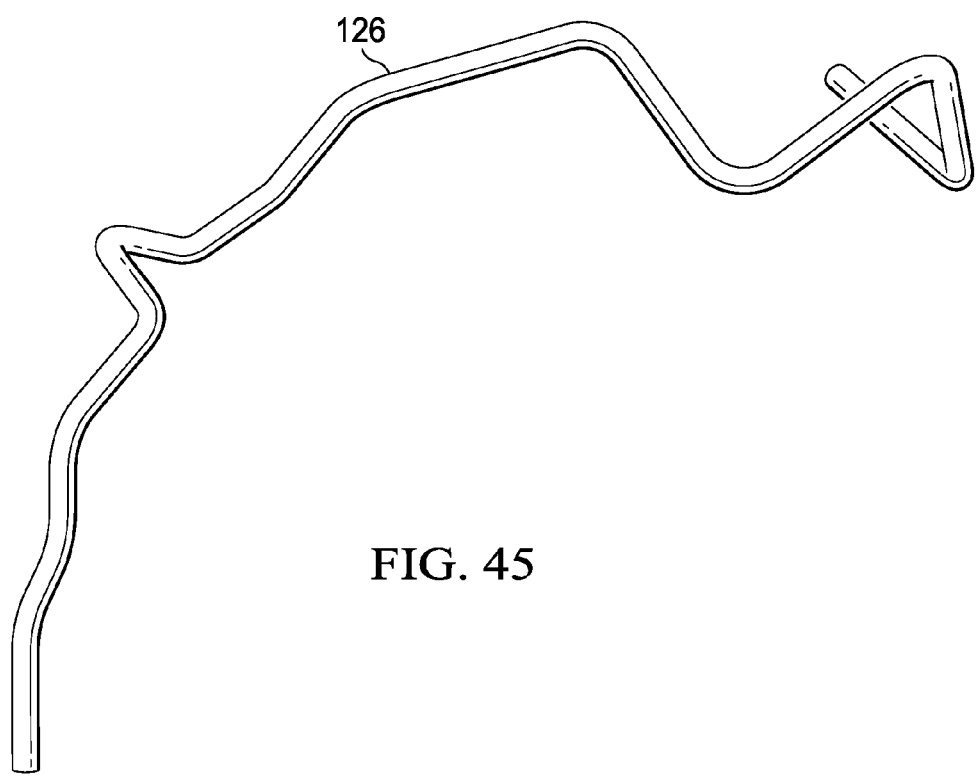
FIGS. 45-59 are perspective views useful in explaining a process for fabricating the gauge shown in FIG. 44.
Figure 46:
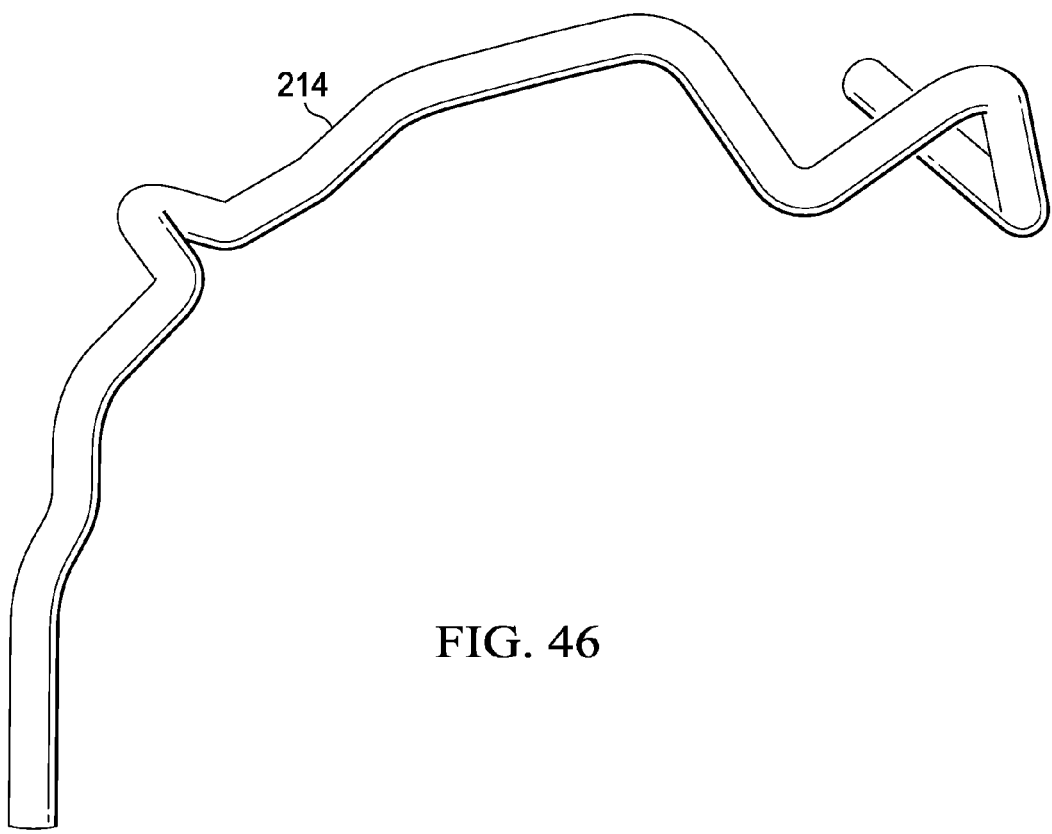
Figure 47:
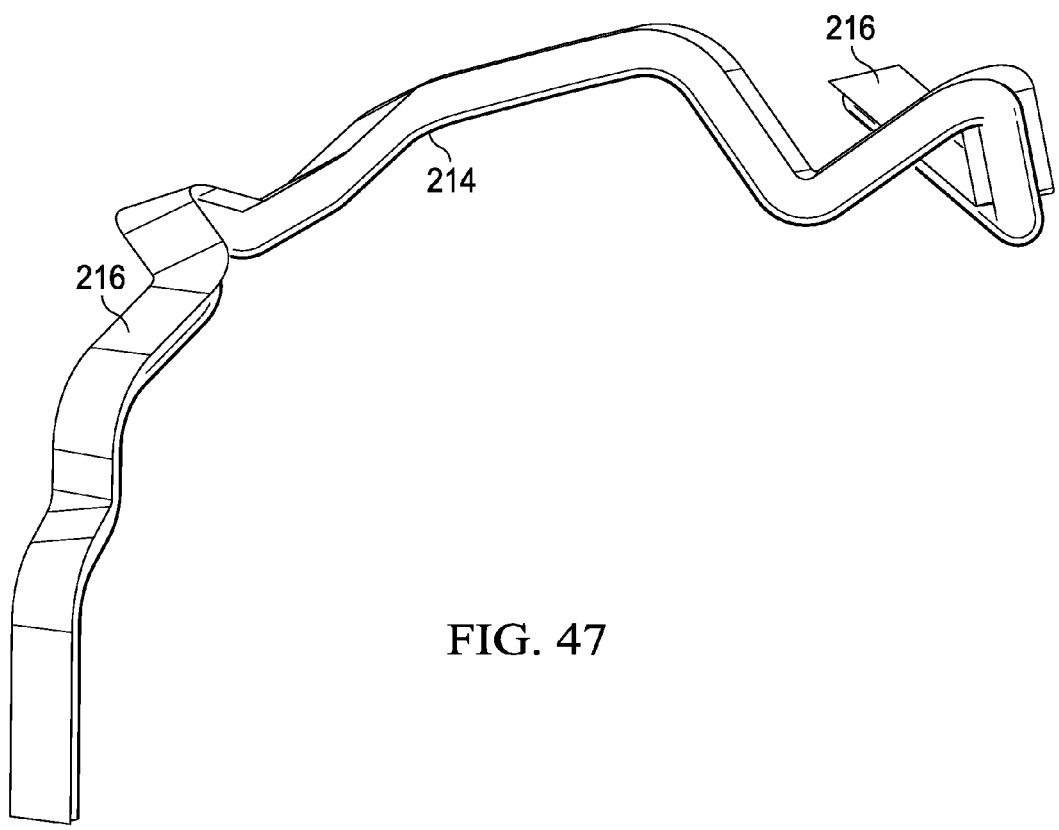

FIGS. 45-58 graphically illustrate the steps of a process of mathematically determining the shape and location of features of the gauge 116 shown in FIG. 44, and forms part of the method previously described in connection with FIG. 43. Referring to FIG. 45, 3-D data, such as a CAD file is produced or provided which defines the size and shape of the tube 126. Next, as shown in FIG. 46, a tolerance boundary 214 is offset around the shape of the tube 126. The tolerance boundary 214 represents the outer tolerance within which the tube 126 must conform. In FIG. 47, a plane 216 created along the top of the tube 126 that is oriented at an angle that is best suited for the start angle of the sweep of the tube 126. In the illustrated example, the plane 216 is tangent along the top of the tolerance boundary 214.

Figure 48:
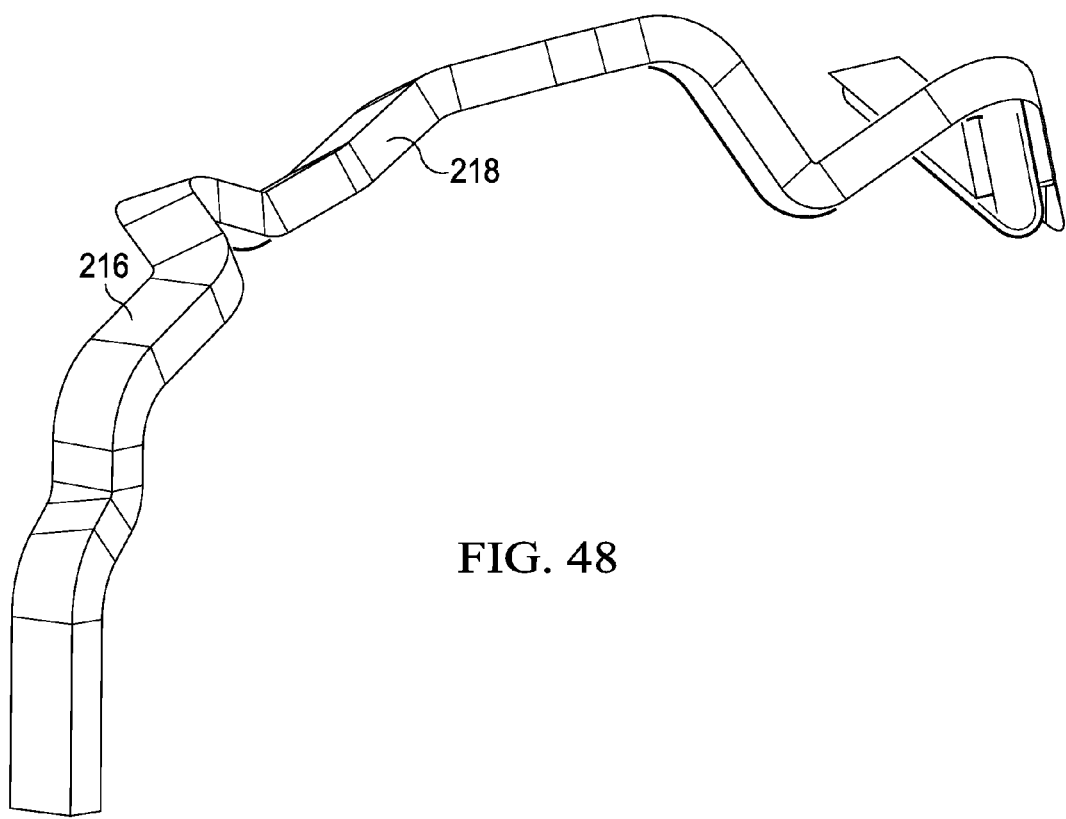
Figure 49:
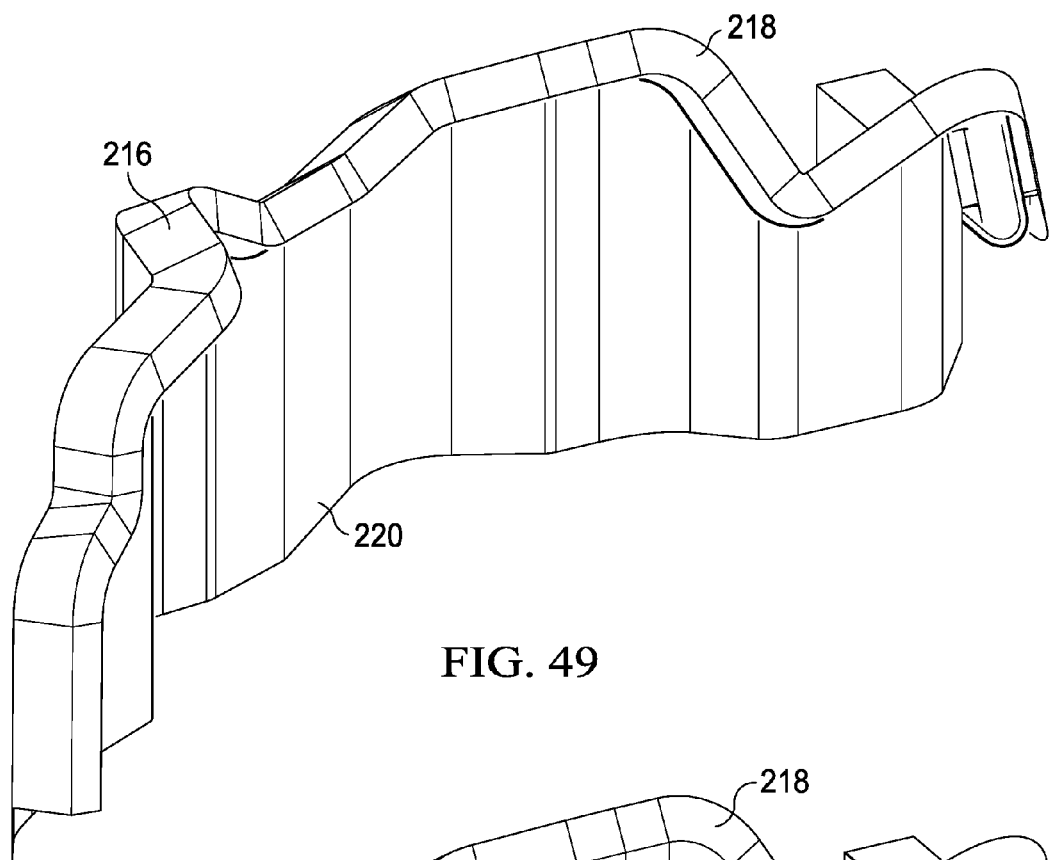
Figure 50:
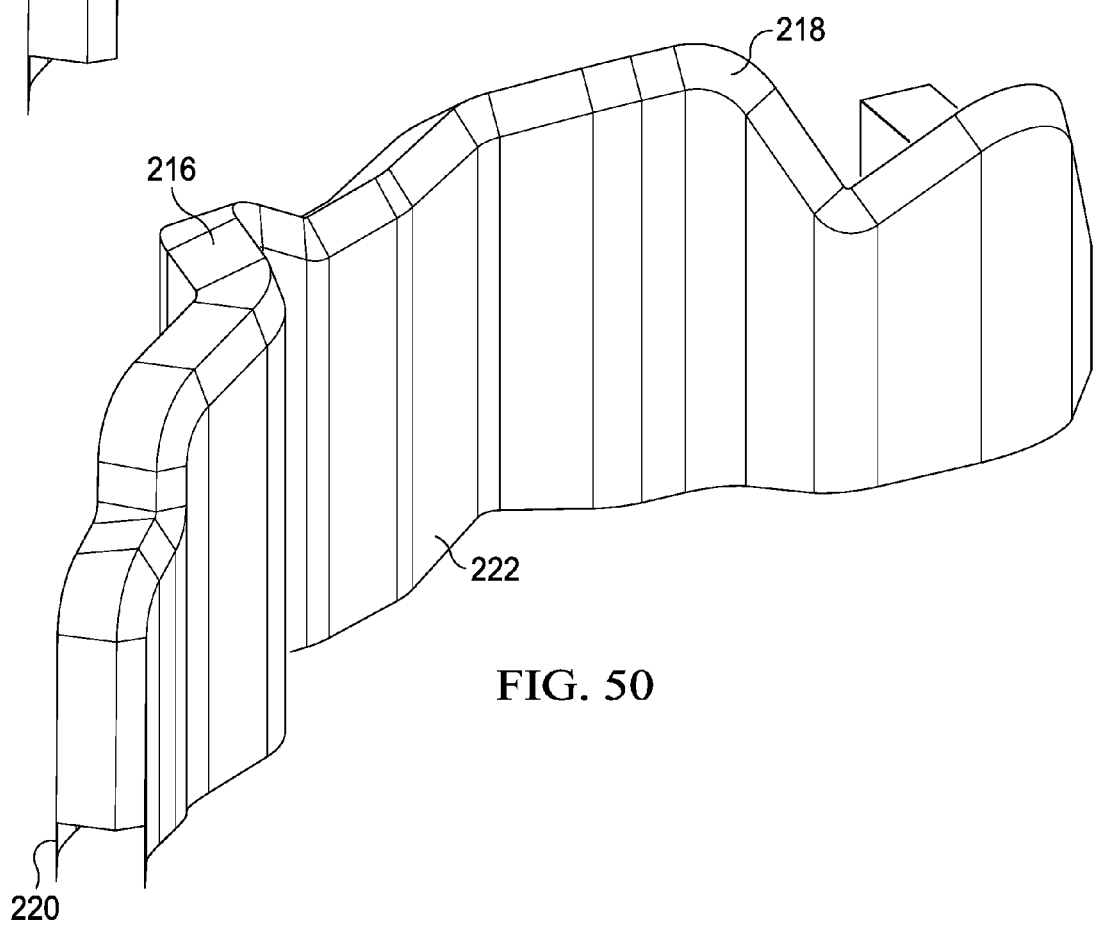
Figure 51:
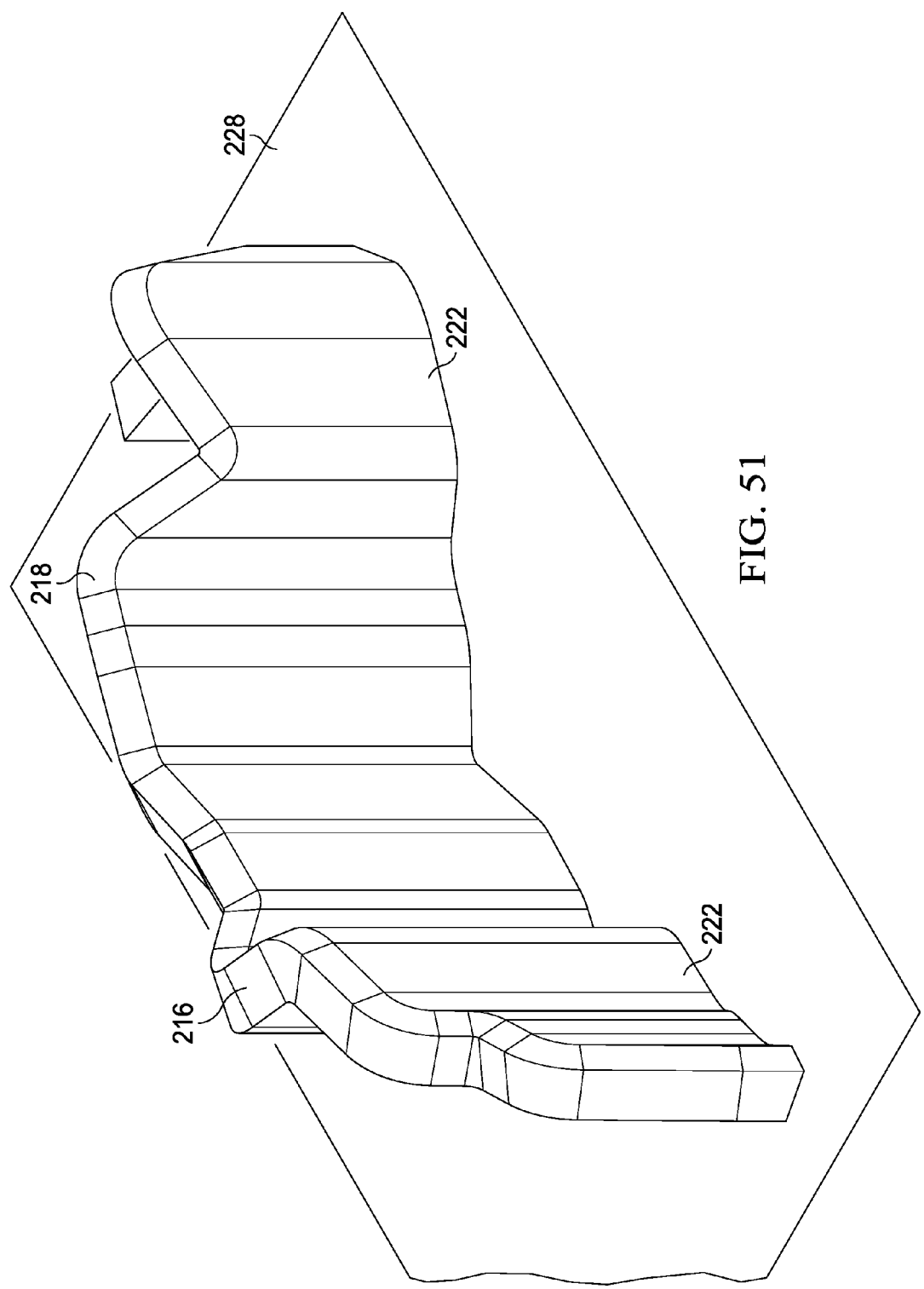
Figure 52:
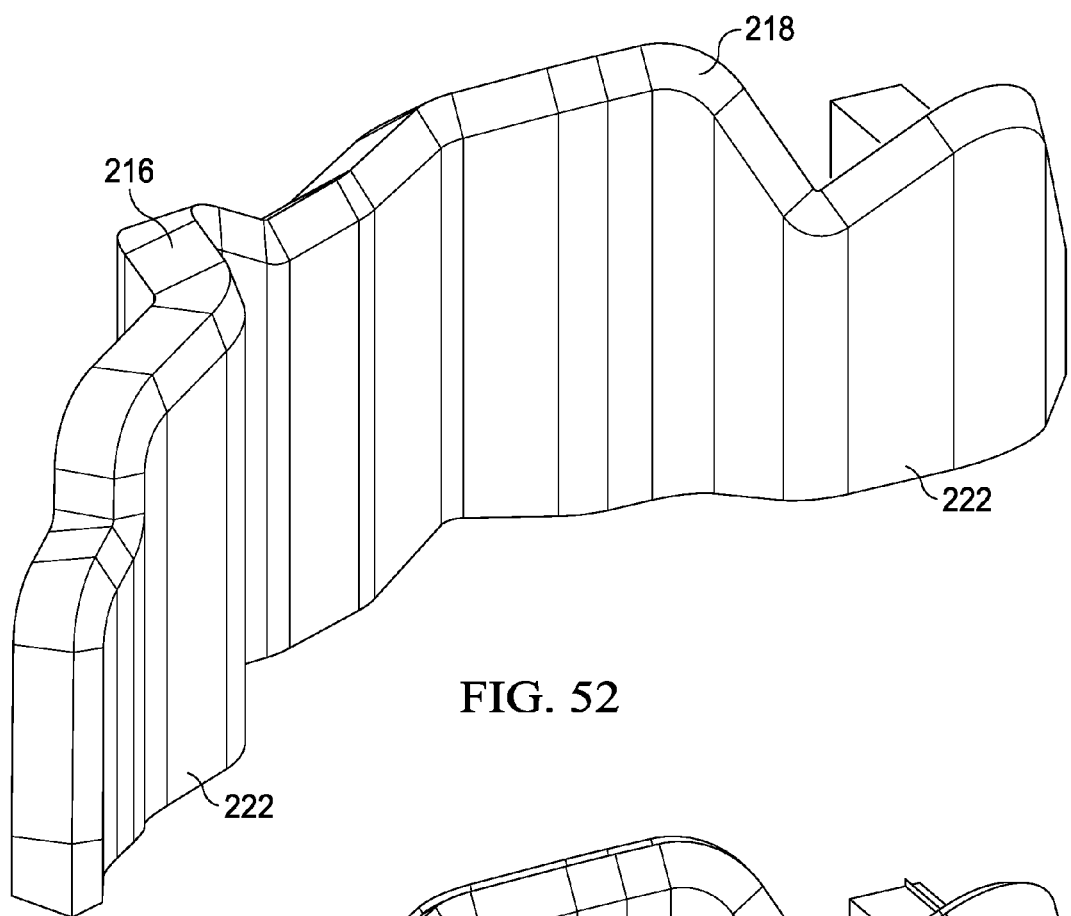

In FIG. 48, another plane 218 is generated along the sweep of the tube 126, which is essentially perpendicular to, and intersects plane 216. The plane 218 extends sufficiently below the tolerance boundary 214 to allow another plane to be generated which extends downwardly to the base 118. In FIG. 49, a plane 220 is generated which extends from one of the planes 218 downwardly to the base 118 (not shown in FIG. 49). Similarly, as shown in FIG. 50, an additional plane 222 is projected down from one of the planes 218, perpendicular to the base 118. Planes 220, 222, are closed at their ends in order to define the lateral surface boundaries of the tube channel segment blocks 122. Referring to FIG. 51, a flat surface 228 is generated along the bottom planes 220, 222 to create an enclosed volume, shown in FIG. 52 corresponding to the combined shape of the tube channel segment blocks 122.

Figure 53:
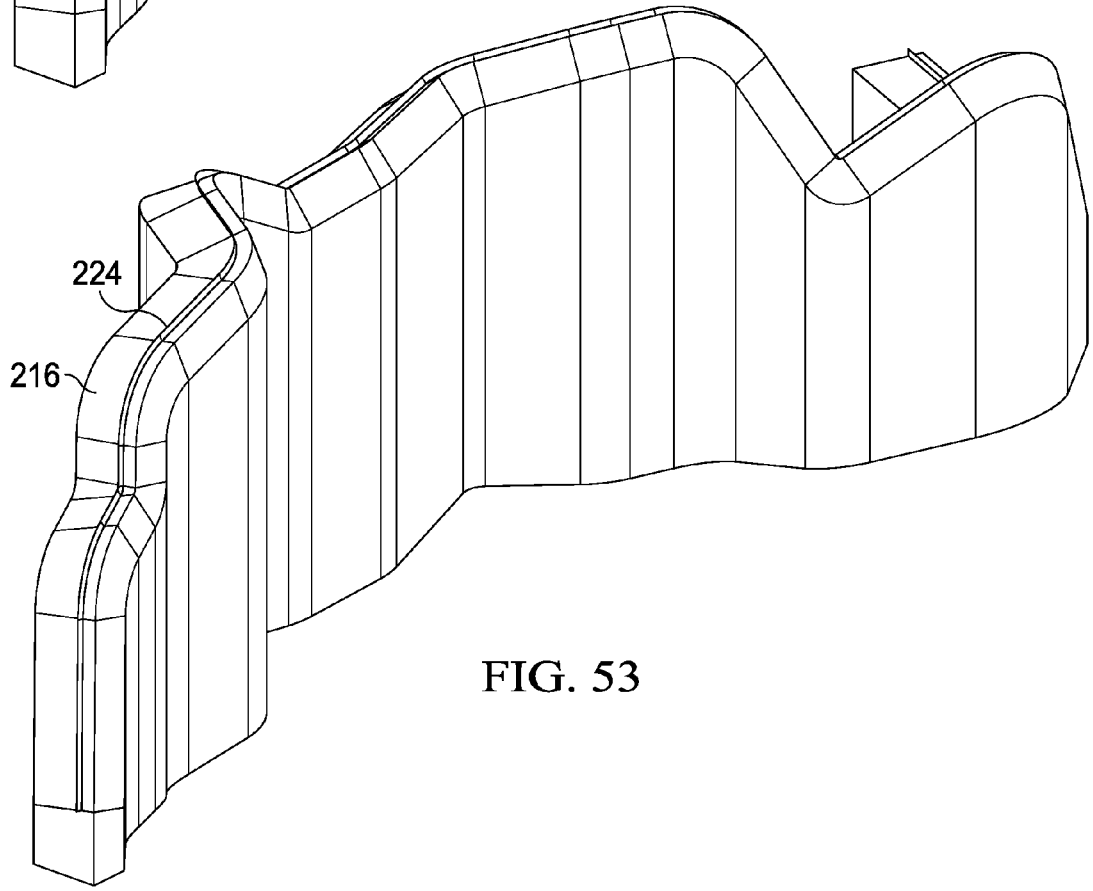
Figure 54:
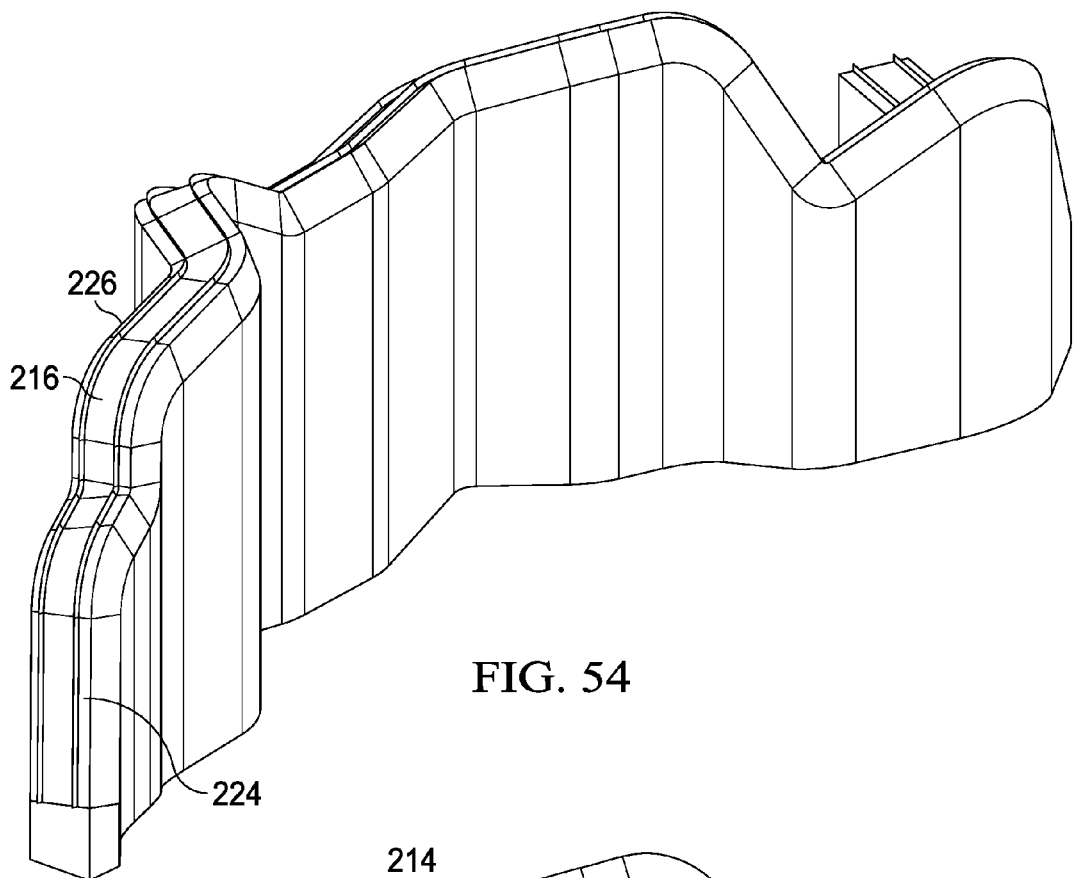
Figure 55:
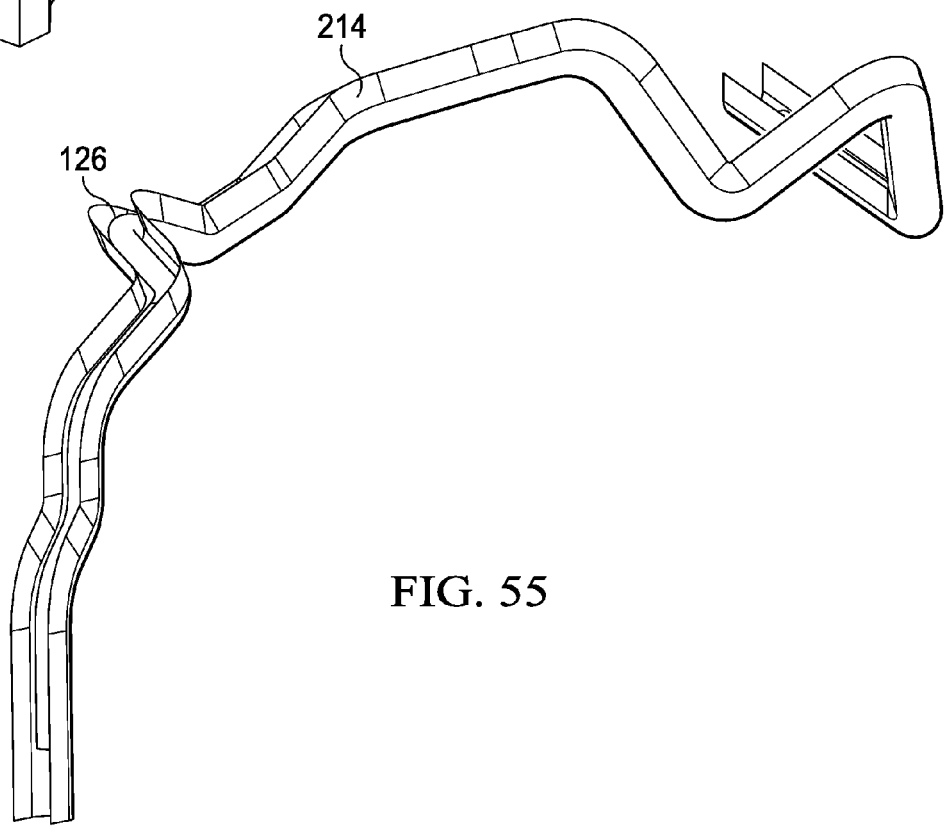
Figure 56:
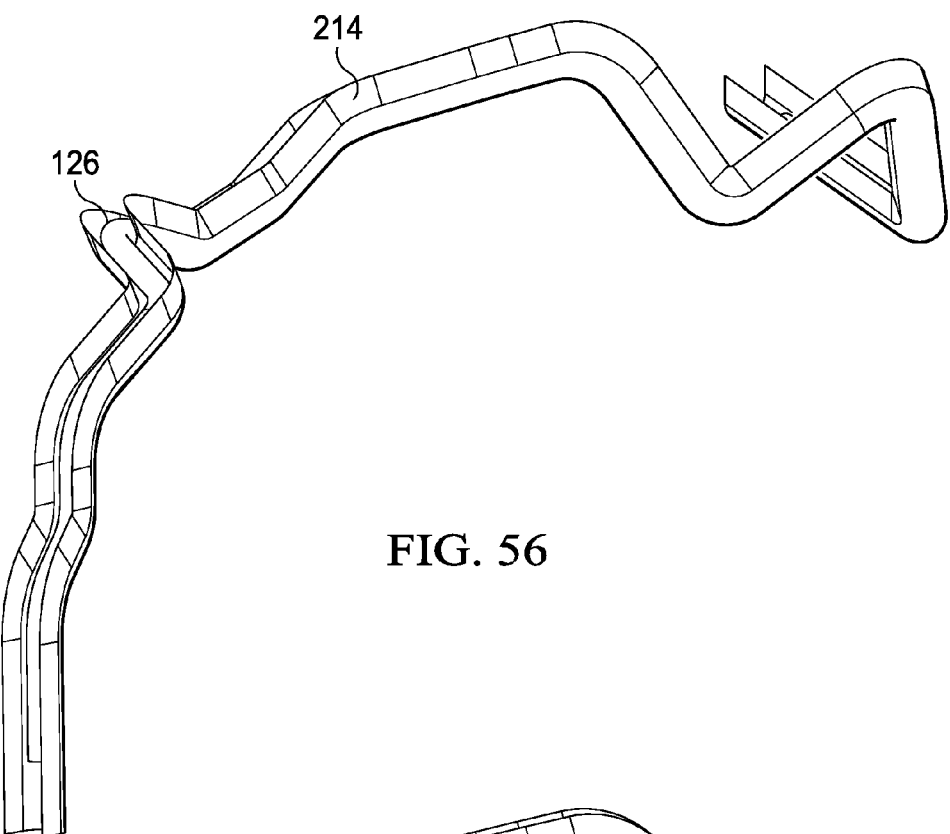
Figure 57:
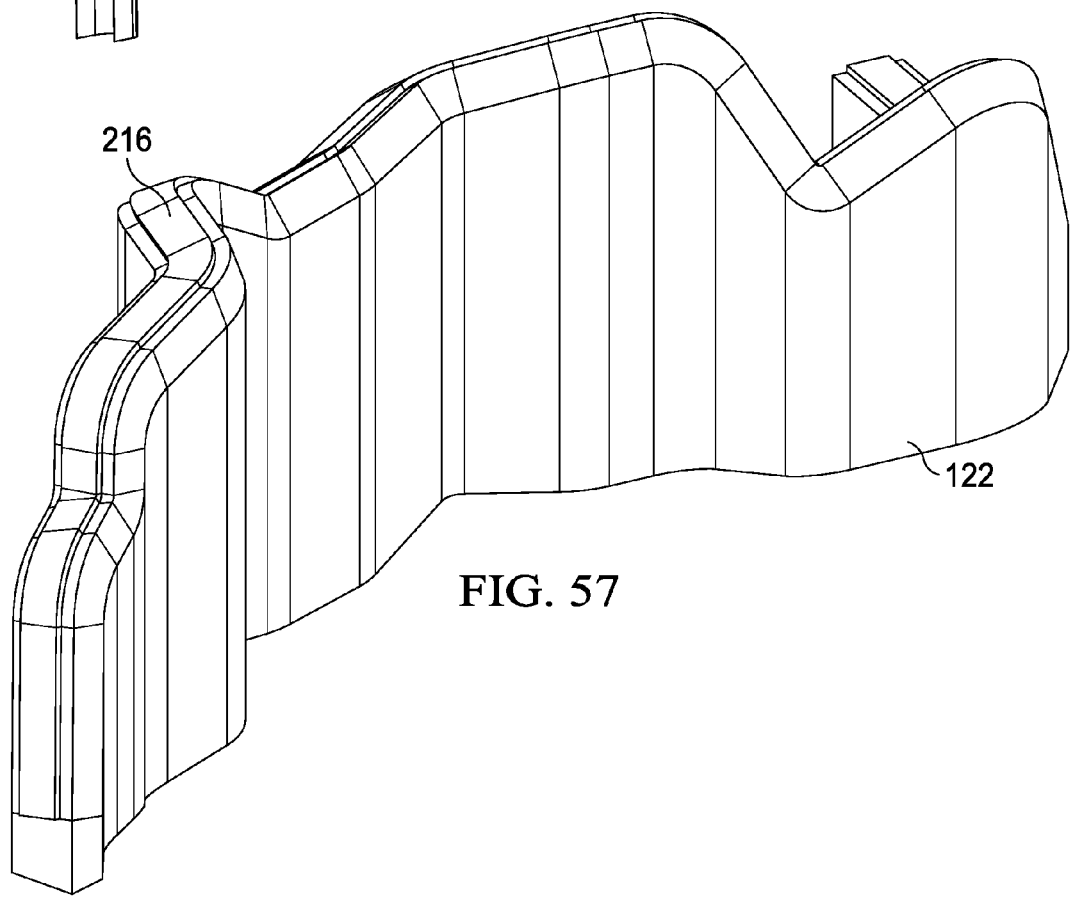
Figure 58:
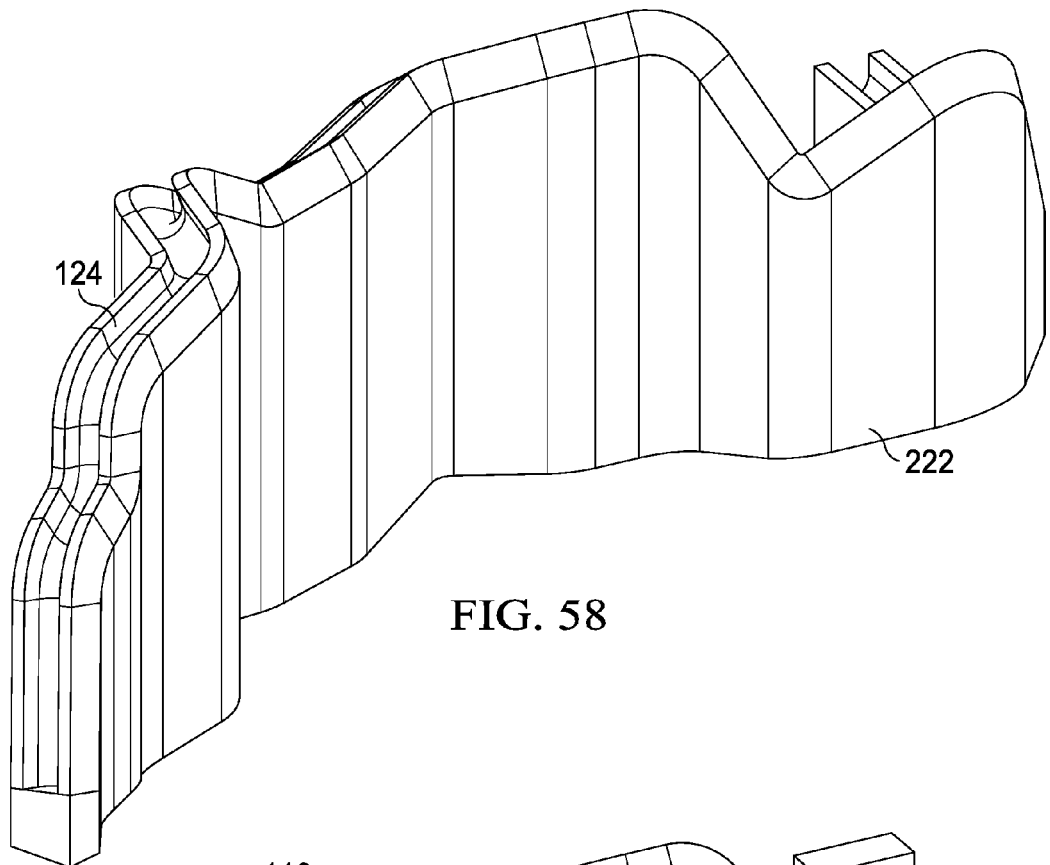
Figure 59:
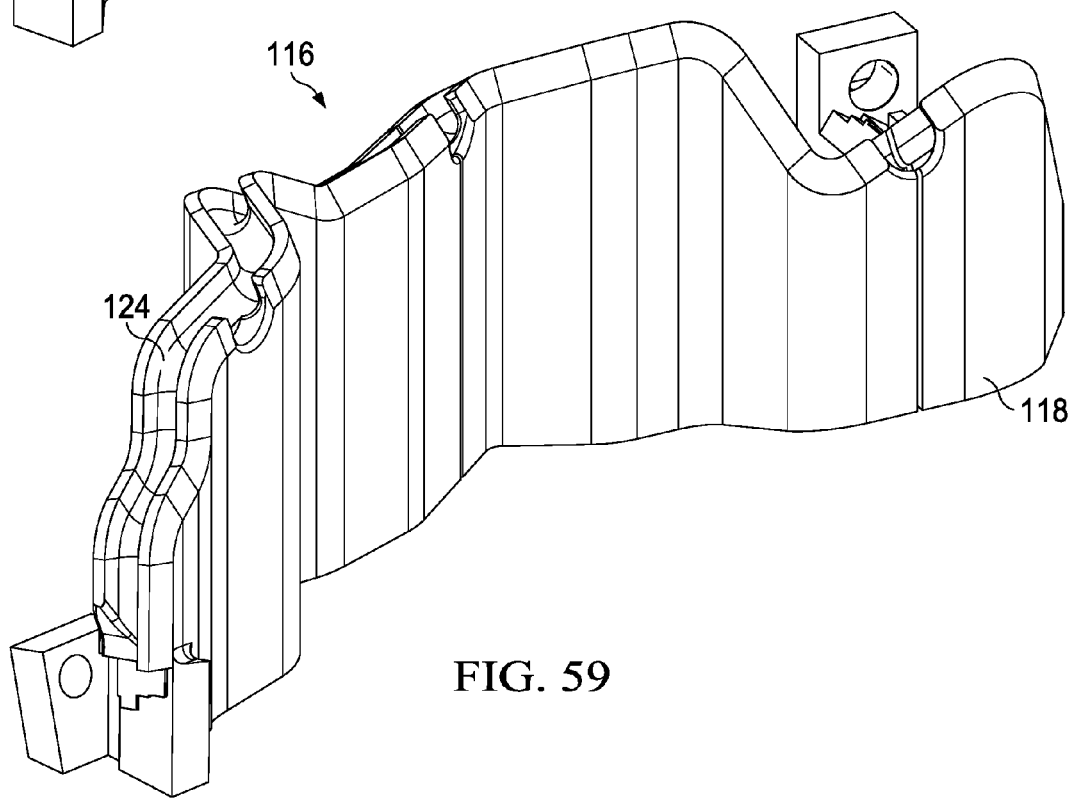
Figure 60:
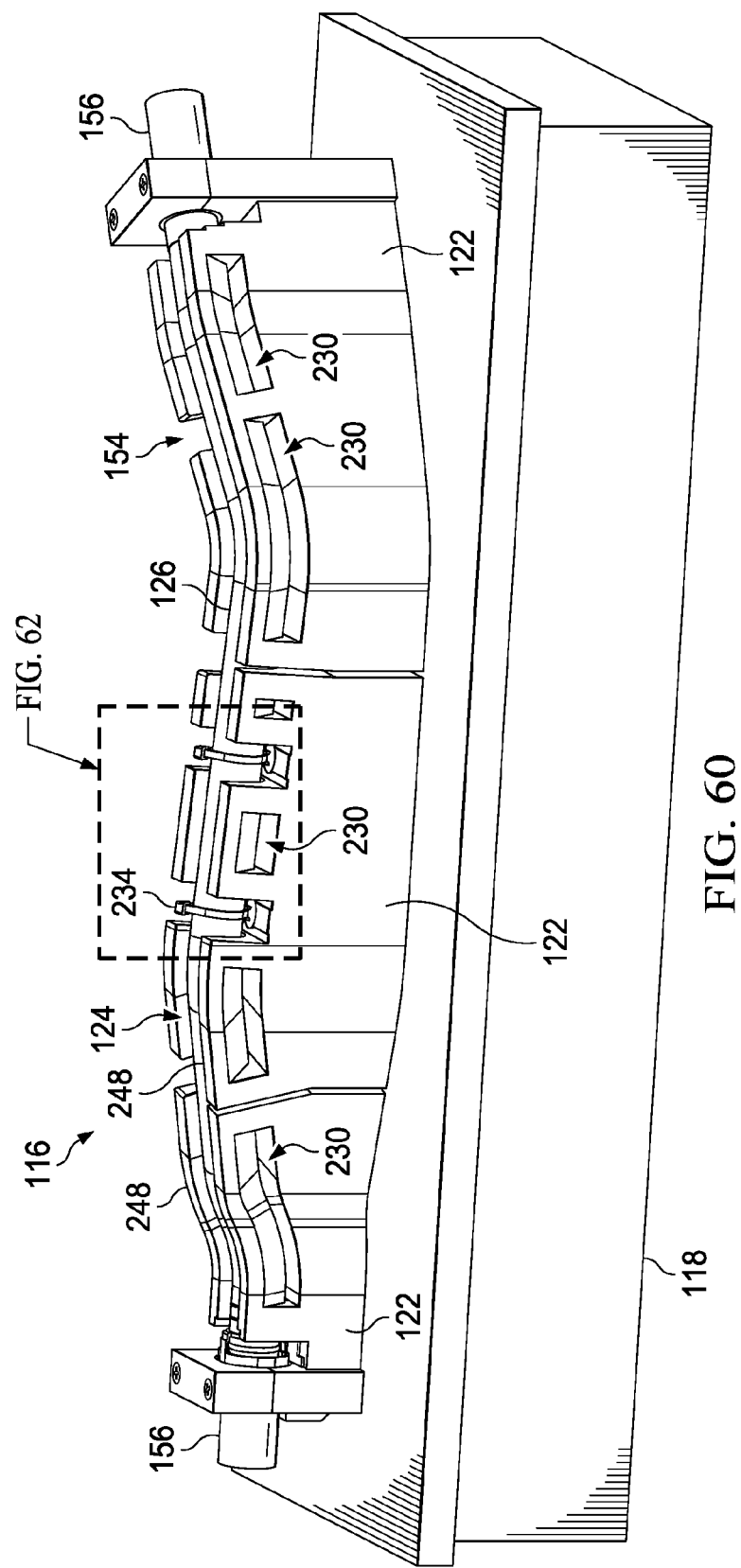
FIG. 60 is a perspective view of one side of an alternate embodiment of a checking gauge, a tube having been placed therein.
Figure 61:
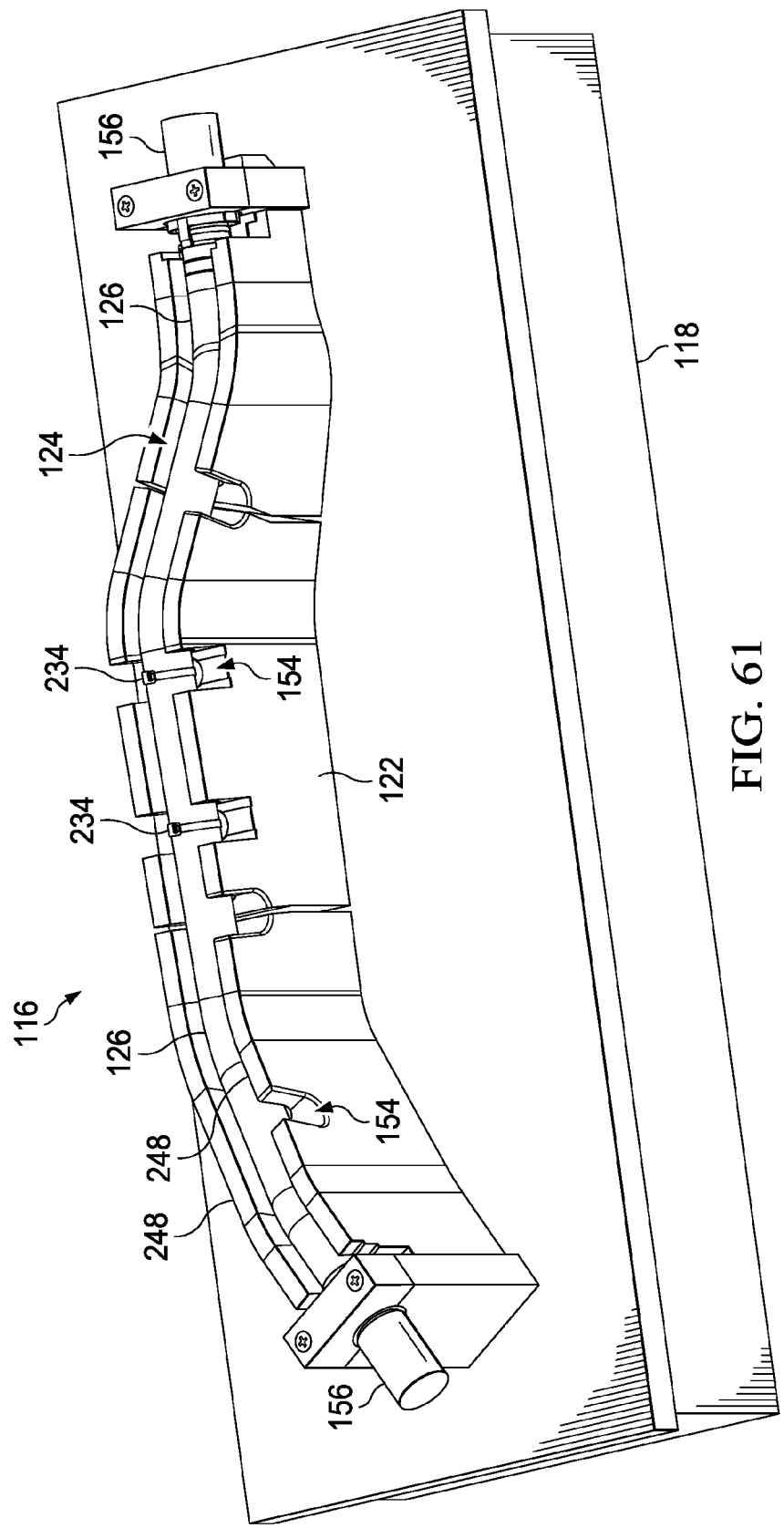
FIG. 61 is a perspective view of the other side of the checking gauge shown in FIG. 60.

Referring now to FIG. 53, next, a first line 224 is generated along plane 216 which corresponds to one side of the tolerance tube channel 124, along the upper surface 128. Then, as shown in FIG. 54, a second line 226 is also formed along plane 216 defining the other side of the tolerance tube channel 124. FIG. 55 is a view similar to FIG. 54, but the gauge blocks having been removed for clarity, and a portion of the tube tolerance channel 124 having been broken away to show the tube 126 positioned in the tube tolerance channel 124 defined by lines 224, 226. In FIG. 56, the top of the boundary is closed off, creating a profile representing the entire cross-sectional area of the tube tolerance channel 124 which is required to be removed from the gauge blocks 122. FIG. 57 is similar to FIG. 56 which shows the gauge blocks 122 having been added. Next, as shown in FIG. 58, the tube tolerance channel 124 is removed from the solid gauge blocks 122, leaving the tube tolerance channel 124. FIG. 59 shows the final gauge 116 produced by the process described above in connection with FIGS. 45-58, without the tube 126.

Attention is now directed to FIGS. 60, 61, 62, 62A and 63 which illustrate another embodiment of the checking gauge 116 that may be mounted on a base 118. As in the previously described embodiments, the embodiment of the checking gauge 116 shown in FIGS. 60-62 may comprise a plurality of fused layers of material produced by suitable additive manufacturing processes as previously described. End centering pins 156, similar to those previously discussed, releasably hold the ends of a tube 126 in indexed positions at each end of the gauge 116. Tie wraps 234 secured to the tube channel bottoms 138 may be wrapped around the tube 126 to draw the tube 126 down onto the tube channel bottom 138 at desired locations along the length of the gauge 116. Typically, the tie wraps 234 may be located at areas where cutouts 154 have been provided in the sidewalls of the gauge segment bocks 122.

Figure 62:
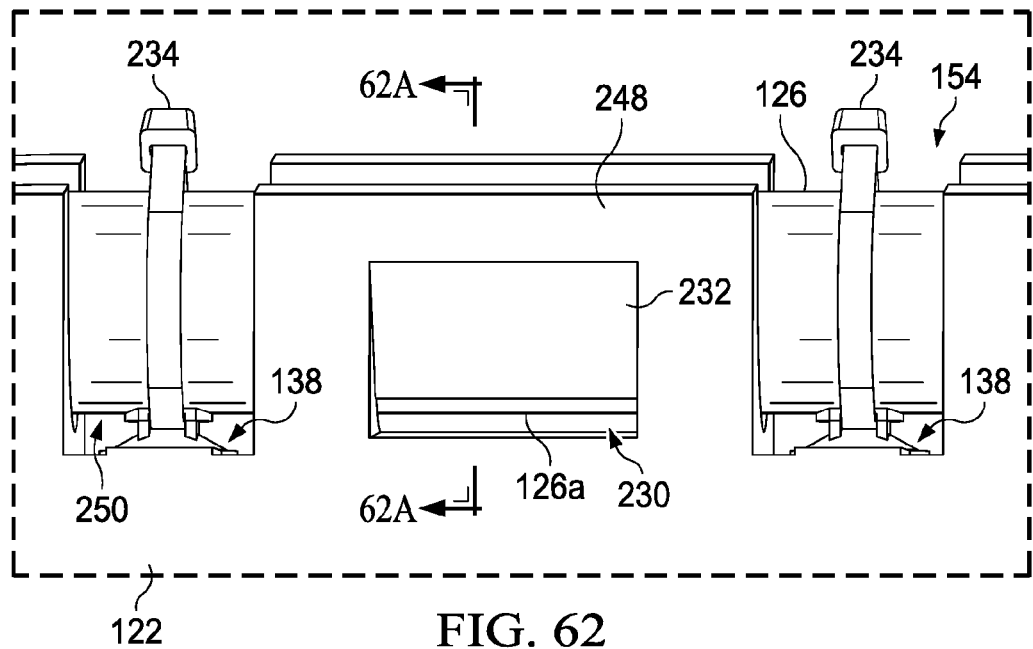
FIG. 62 is an elevational view of the area designated as "FIG. 62" in FIG. 60.
Figure 62A:
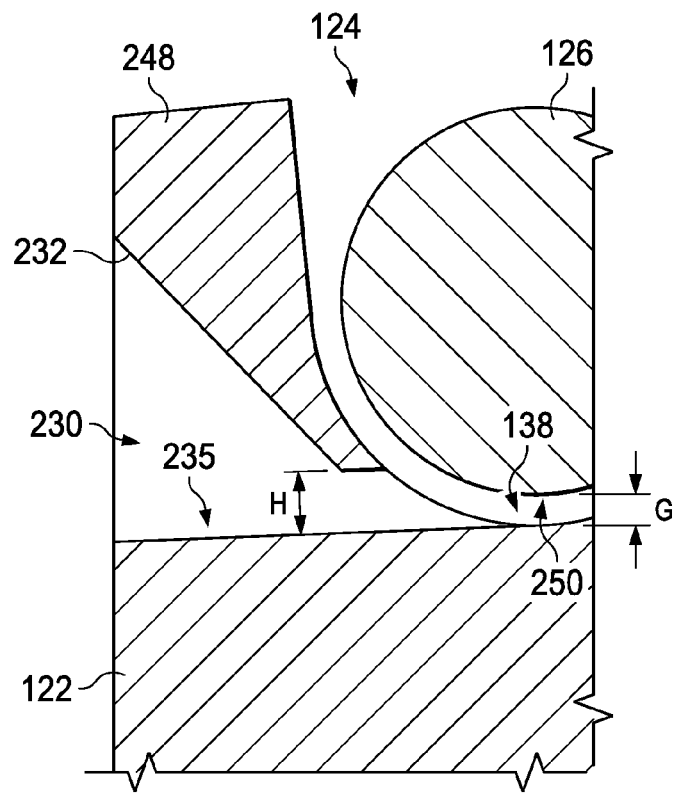
FIG. 62A is a sectional view taken along the line 62A-62A in FIG. 62.
Figure 63:
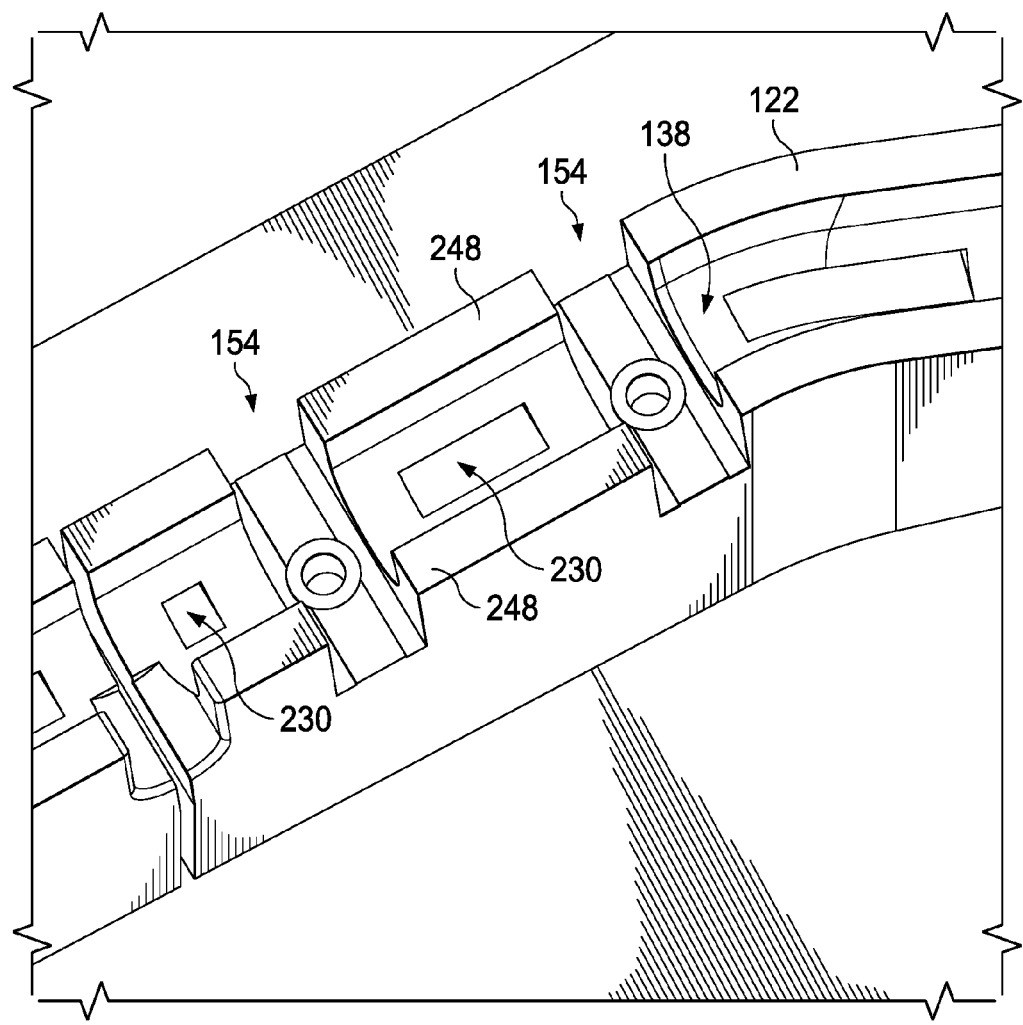
FIG. 63 is a perspective view of the top of the gauge shown in FIG. 60, with the tube removed for clarity.

A plurality of viewing windows 230 are provided in the sidewalls 248 of at least certain of the gauge blocks 122 at locations along the length of the tube channel 124 were the tolerance of the tube 126 is to be checked. The viewing windows 230 comprise openings which extend through at least one of the sidewalls 248 of the gauge blocks 122 and penetrate into the tube channel 124. In the disclosed embodiment, the bottom 235 of the viewing window 230 is aligned with the bottom 138 of the tube channel 124, such that the bottom 250 of the tube can be seen in relation to the bottom 138 of the tube channel 124. Depending upon the degree of curvature of the tube, and thus of the tube channel 124, the viewing windows 230 may have one or more curvatures that substantially match that of the tube channel 124. In some embodiments, viewing windows 230 may be provided in the sidewalls on both sides of the tube channel 124. The viewing windows 230 are configured to allow viewing of any gap "G" that may exist between the bottom 250 of the tube 126 and the bottom 138 of the tube channel 124. Referring particularly to FIG. 62A, each of the viewing windows 230 may have one or more tapered entry walls 232 that narrow the viewing window 230 to a height "H" at the location where the viewing window 230 penetrates through the sidewall 248 near the bottom 138 of the tube channel 124.

A tube 126 placed in the tube channel 124 may be out of tolerance such that the bottom of the tube 126 is spaced above the tube channel bottom 138, creating a gap "G" between the tube 126 and the tube channel bottom 138. The viewing windows 230 allow a user to view the bottom of a tube 126 in relation to the tube channel bottom 138 and thereby detect whether a gap "G" is present that may indicate that the tube 126 is out of tolerance at the location of the viewing window 230. The viewing window height "H" may vary with the application, and in some embodiments, may represent the maximum amount of gap "G" that may allowed for a tube that is within a specified tolerance. In this latter example, if the checker cannot see the bottom 250 of the tube 126, then the checker knows that the tube 126 is out of tolerance at the location of the viewing window 230, whereas if he/she can see at any portion of the bottom 250, then the checker knows the tube 126 is within tolerance at that location.

Figure 64:
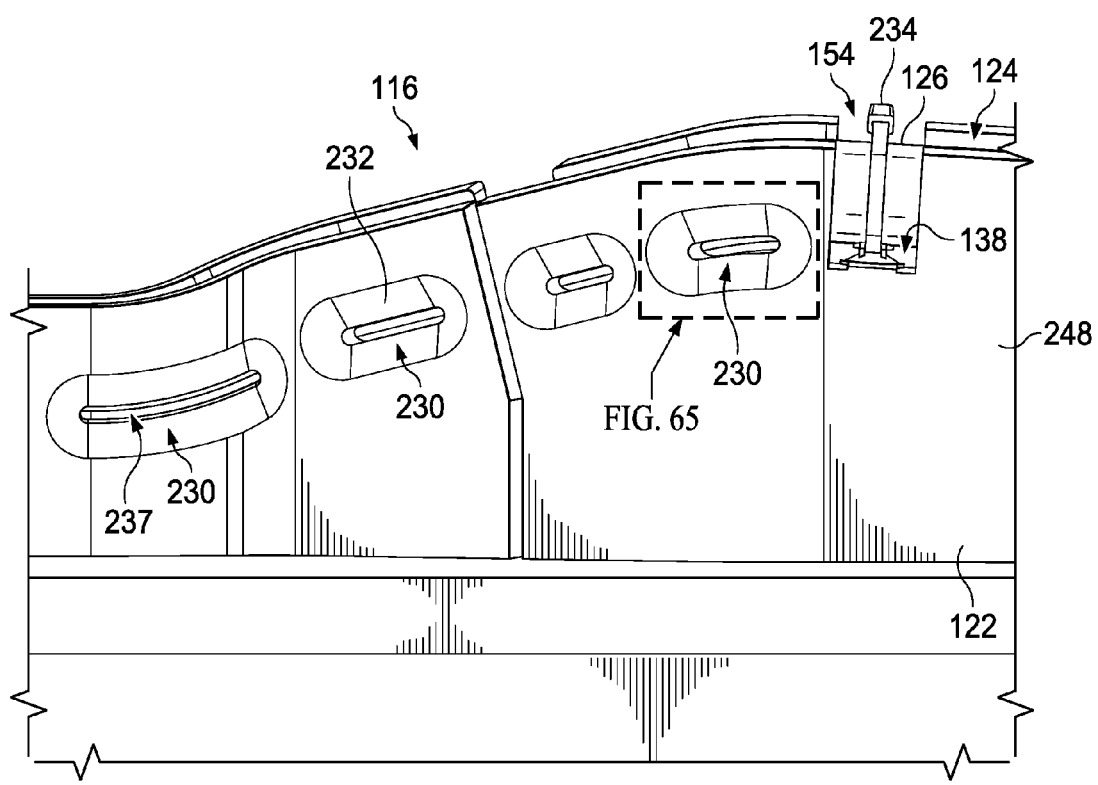
FIG. 64 is a side elevational view of an alternate form of the checking gauge shown in FIG. 60.
Figure 65:
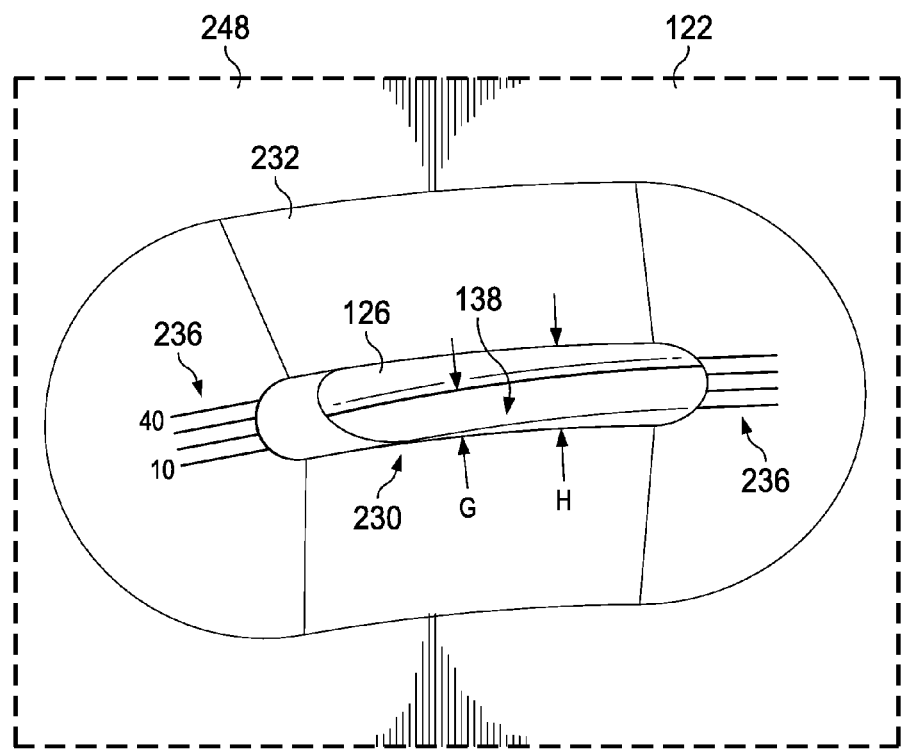
FIG. 65 is a view of the area designated as FIG. 65 in FIG. 64.
Figure 66:
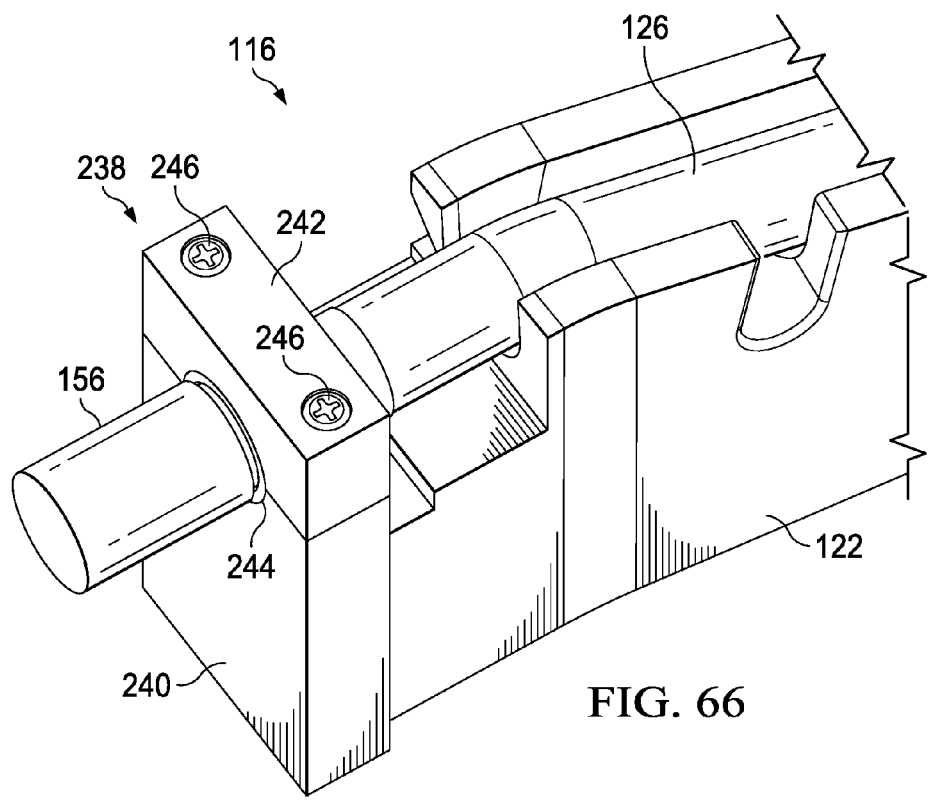
FIG. 66 is a fragmentary, perspective view of one end of the gauge, showing a centering pin mounting assembly.
Figure 67:
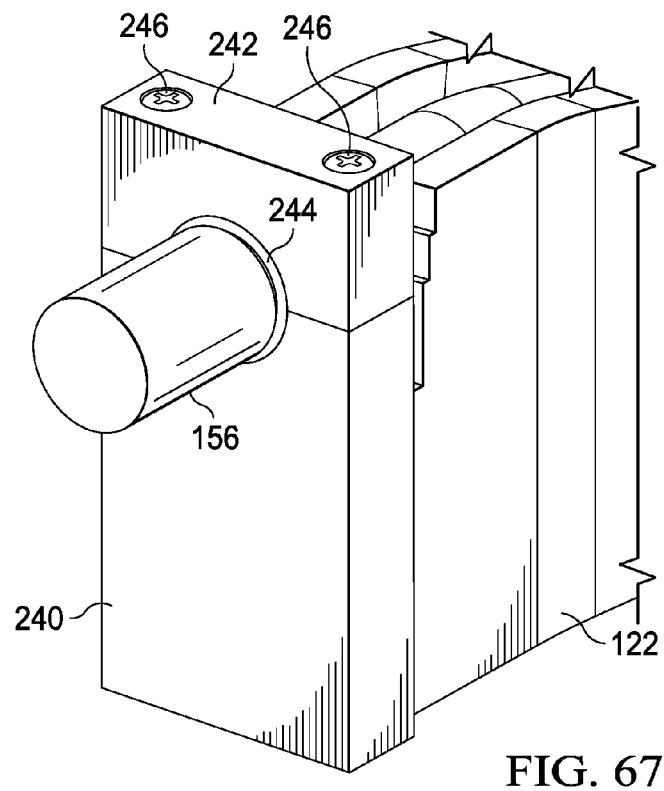
FIG. 67 is a perspective view of the mounting assembly shown in FIG. 66.
Figure 68:
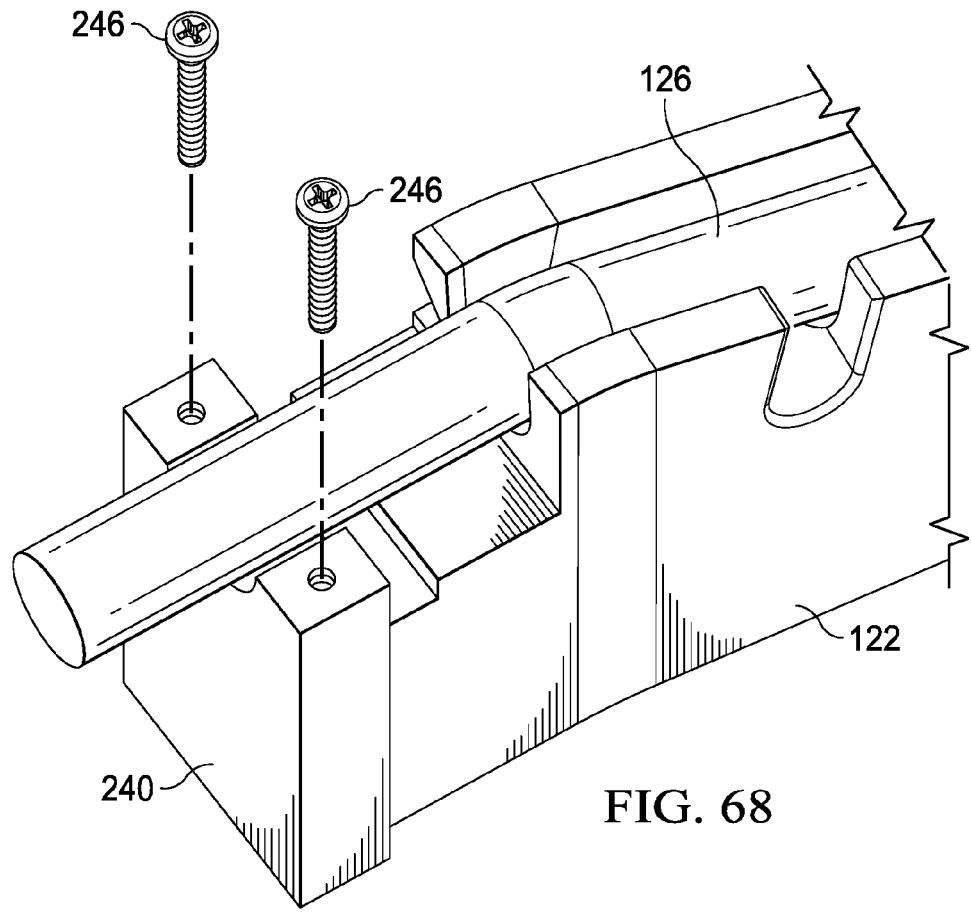
FIG. 68 is a perspective view of the mounting assembly, a bushing and upper clamp not shown for clarity.
Figure 69:
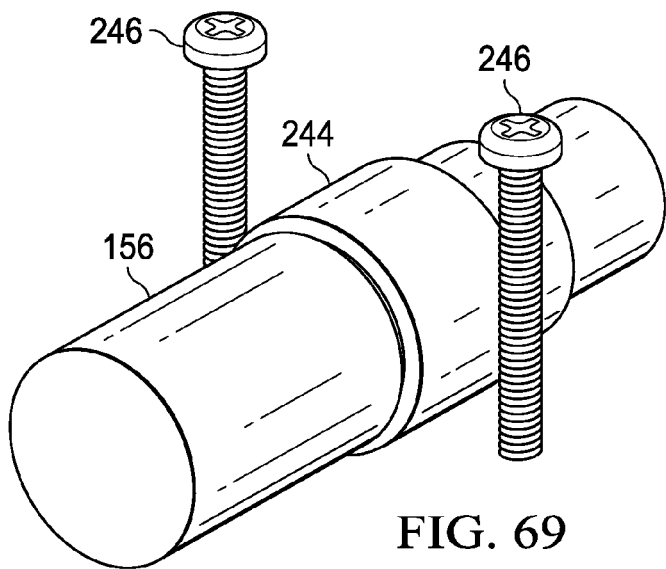
FIG. 69 is a perspective view of the end pin and screws forming part of the mounting assembly.

FIGS. 64 and 65 illustrate another embodiment of the gauge 116 that is provided with viewing windows 230 similar to those discussed above. In this example, the tapered sidewalls 232 substantially surround the entire viewing window 230, causing the viewing window 230 to taper to a desired height "H" which is sufficient to allow a user to quickly see whether a gap "G" is present between the tube at 126 and the bottom 138 of the tube channel 124. As previously mentioned, the presence of a gap "G" may indicate an out of tolerance condition at the location of the viewing window 230. Moreover, as previously pointed out, if the checker is unable to see any part of the bottom 250 of the tube 126 within the viewing window 230, then the checker knows that the bottom 250 of the tube is located somewhere in the channel 124 above the height "H" of the viewing window 230, and is therefore out-of-tolerance.

A plurality of visual indicia such as graduated tolerance marks 236 may be provided in the sides of the gauge blocks 122 immediately adjacent the viewing windows 230. The marks 236 may be graduated such that they can be correlated with the size of the gap "G" by a user to determine the degree to which a tube 126 may be within or out of tolerance at the location of the viewing window 230. The graduated marks 236 may be numbered or otherwise labeled to allow the user determine the size of gap "G" represented by each mark 236. In other words, the graduated marks are configured to represent the deviation of the position of the bottom 250 of the tube 126 relative to a reference is, which is an example, comprises the bottom 138 of the channel 124. The graduated marks 236 may be integrally formed in the gauge blocks 122 by the digital controlled additive manufacturing process that is used to produce the gauge blocks 122 themselves. Thus, the size and placement of the graduated marks 236 is integrated into the coordinate system 121 (FIG. 2) of the gauge 116, and is therefore keyed to the other the features and dimensions of the gauge 116.

FIGS. 66-69 illustrate a centering pin mounting assembly 238 which is adapted to removably mount the tube centering pins 156 on the ends of the gauge 116. The tube centering pins 156 mount the ends of the tube 126 at known locations in space within the three-dimensional coordinate system 121 (FIG. 2) of the gauge 116. The centering pin 156 is surrounded by a bushing 244. The bushing 244 is captured between a lower clamping block 240, and an upper clamping block 242. Both the lower end upper clamping blocks 240, 242 include arcuate cutouts therein which, together, form a circular opening within which the bushing 244 is received. The upper clamping block 242 is fastened to the lower end block 240 by a pair of screws 246. Tightening screws 246 results in clamping pressure being applied by the upper clamping block 242 to the bushing 244, thereby clamping the bushing 244 against the lower clamping block 240, and fixing the centering pin 156 against longitudinal movement within the mounting assembly 238. In order to release the centering pin 156 from the tube 126 following a checking operation, the screws 246 may be loosened to reduce the clamping pressure to the point that the centering pins 156 can be slid longitudinally within the bushing 244, thereby allowing the centering pins 156 to be retracted from the end of the tube 126. The arrangement of the centering pin mounting assembly 238 allows the end of the tube 126 to extend longitudinally beyond the outer ends of the segment blocks 122.

In accordance with the disclosed embodiments, the bushing 244, lower clamping block 240, upper clamping block 242 and screws 246 are formed from materials having substantially the same coefficient of thermal expansion (CTE). Moreover, these latter mentioned components may have CTE's that are substantially the same as the material from which the gauge blocks 122 is formed. For example, and without limitation, where the gauge blocks 122 are formed from an ABS plastic such as ABS-M30, the bushing 244, lower clamping block 240 upper clamping block 242 and screws 246 may he formed of a nylon or similar material having a CTE that substantially matches that of the ABS plastic from which the gauge blocks 122 are formed. The use of a nylon bushing 244 assures that the inside diameter of the bushing is both smooth and consistent in diameter. Further a bushing 244 formed of nylon or a similar material assists in absorbing stresses that may be created from tension that is applied when the centering pin 156 is deflected under a side load.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A gauge for checking a tolerance of a tube, comprising:
    at least one gauge block having a channel in which the tube may be placed for checking the tolerance of the tube; and
    at least one opening in a side of the gauge block allowing a position of the tube within the channel to be viewed, wherein the opening has a dimension representing the tolerance.

2. The gauge of claim 1, wherein the opening has a height representing a maximum deviation of the position of the tube from a reference position.

3. The gauge of claim 2, wherein the height of the opening is less than a maximum cross-sectional dimension of the tube.

4. The gauge of claim 1, wherein the opening is located to allow viewing of a bottom of the tube.

5. The gauge of claim 1, wherein the opening is inwardly tapered toward the channel.

6. The gauge of claim 1, wherein gauge block includes graduations adjacent the opening representing deviation of a position of the tube from a reference position.

7. The gauge of claim 6, wherein the graduations are configured to represent a deviation of position of a bottom of the tube relative to a bottom of the channel.

8. The gauge of claim 6, wherein the graduations include lines on the side of the gauge block adjacent the opening.

9. The gauge of claim 1, wherein the gauge has a plurality of openings therein along a length of the gauge allowing the tolerance of the tube to be checked at a plurality of locations along the length of the gauge respectively corresponding to the plurality of openings.

10. The gauge of claim 1, further comprising:
a bushing;
a pin slidable within the bushing, the pin being configured to support an end of the tube in a preselected position on the gauge; and
a pair of clamping members between which the bushing is clamped.

11. The gauge of claim 1, wherein the gauge block is formed of a plurality of fused layers.

12. A gauge for checking a tolerance of a tube against a reference standard, comprising:
at least one gauge block having two opposite sides and a channel between the two opposite sides in which the tube may be placed for checking; and
a viewing window in at least one of the two opposite sides, the viewing window being positioned to allow viewing of the bottom of the tube within the channel.

13. The gauge of claim 12, wherein the viewing window includes an opening in the at least one side, the opening having a height dimension corresponding a maximum allowable position tolerance for the tube at a location of the opening.

14. The gauge of claim 13, wherein the opening is inwardly tapered toward the channel.

15. The gauge of claim 12, wherein:
the viewing window is curved to match a curvature of the tube.

16. A gauge for checking conformance of a bent tube with a reference standard, comprising:
at least one gauge block having a channel therein in which the tube may be placed for checking; and
a viewing window in the gauge block aligned with a bottom of the channel and configured to allow viewing a gap between the bottom of the tube and the bottom of the channel.

17. The gauge of claim 16, wherein:
the gauge block has at least one side, and
the viewing window extends through the one side.

18. The gauge of claim 16, wherein a bottom of the viewing window extends along the bottom of the channel.

19. The gauge of claim 16 wherein the viewing window has a curvature matching a curvature of the tube.

20. The gauge of claim 16, wherein the gauge block is formed of a plurality of fused layers.

* * * * *